United States Patent
Mennell et al.

(10) Patent No.: US 10,167,437 B2
(45) Date of Patent: *Jan. 1, 2019

(54) SYSTEMS AND APPARATUS FOR PRODUCTION OF HIGH-CARBON BIOGENIC REAGENTS

(71) Applicant: Carbon Technology Holdings, LLC, Oakdale, MN (US)

(72) Inventors: James A. Mennell, Dellwood, MN (US); Daniel J. Despen, Minneapolis, MN (US)

(73) Assignee: Carbon Technology Holdings, LLC, Oakdale, MN (US)

(*) Notice: Subject to any disclaimer, the term of this patent is extended or adjusted under 35 U.S.C. 154(b) by 0 days.

This patent is subject to a terminal disclaimer.

(21) Appl. No.: 15/180,763

(22) Filed: Jun. 13, 2016

(65) Prior Publication Data
US 2017/0037334 A1 Feb. 9, 2017

Related U.S. Application Data

(63) Continuation of application No. 14/111,281, filed as application No. PCT/US2012/033628 on Apr. 13, 2012, now Pat. No. 9,388,355.
(Continued)

(51) Int. Cl.
*C10L 5/44* (2006.01)
*C10B 49/02* (2006.01)
(Continued)

(52) U.S. Cl.
CPC .............. *C10L 5/447* (2013.01); *B01J 21/18* (2013.01); *C01B 32/30* (2017.08); *C01B 32/312* (2017.08);
(Continued)

(58) Field of Classification Search
CPC .... C10L 5/447; C10L 5/04; C10L 5/36; C10L 5/363; C10L 5/365; C10L 5/366;
(Continued)

(56) References Cited

U.S. PATENT DOCUMENTS 2,289,917 A 7/1942 Lambiotte
2,475,767 A 7/1949 Williams et al.
(Continued)

FOREIGN PATENT DOCUMENTS

CA 2740225 5/2010
CN 101693848 A 4/2010
(Continued)

OTHER PUBLICATIONS

Andi Supangat et al., Method for producing activated carbon from combustion of e.g. bamboo, involves naturally removing and colling furnace material which is separate module of furnace fuel, but closing exhaust holes, when burning process is not sufficient, Mar. 1, 2012, ID 20121099A.
(Continued)

*Primary Examiner* — Cephia D Toomer
(74) *Attorney, Agent, or Firm* — Perkins Coie LLP

(57) ABSTRACT

This invention provides processes and systems for converting biomass into highcarbon biogenic reagents that are suitable for a variety of commercial applications. Some embodiments employ pyrolysis in the presence of an inert gas to generate hot pyrolyzed solids, condensable vapors, and non-condensable gases, followed by separation of vapors and gases, and cooling of the hot pyrolyzed solids in the presence of the inert gas. Additives may be introduced during processing or combined with the reagent, or both. The biogenic reagent may include at least 70 wt %, 80 wt %, 90 wt %, 95 wt %, or more total carbon on a dry basis. The biogenic reagent may have an energy content of at least
(Continued)

FIG. 1

12,000 Btu/lb, 13,000 Btu/lb, 14,000 Btu/lb, or 14,500 Btu/lb on a dry basis. The biogenic reagent may be formed into fine powders, or structural objects.

21 Claims, 15 Drawing Sheets

Related U.S. Application Data

(60) Provisional application No. 61/476,025, filed on Apr. 15, 2011, provisional application No. 61/476,043, filed on Apr. 15, 2011, provisional application No. 61/475,930, filed on Apr. 15, 2011, provisional application No. 61/475,937, filed on Apr. 15, 2011, provisional application No. 61/475,943, filed on Apr. 15, 2011, provisional application No. 61/475,946, filed on Apr. 15, 2011, provisional application No. 61/475,949, filed on Apr. 15, 2011, provisional application No. 61/476,956, filed on Apr. 15, 2011, provisional application No. 61/475,959, filed on Apr. 15, 2011, provisional application No. 61/475,968, filed on Apr. 15, 2011, provisional application No. 61/475,971, filed on Apr. 15, 2011, provisional application No. 61/475,973, filed on Apr. 15, 2011, provisional application No. 61/475,977, filed on Apr. 15, 2011, provisional application No. 61/475,981, filed on Apr. 15, 2011, provisional application No. 61/475,991, filed on Apr. 15, 2011, provisional application No. 61/475,996, filed on Apr. 15, 2011, provisional application No. 61/475,049, filed on Apr. 15, 2011.

(51) Int. Cl.
| | | |
|---|---|---|
| C10B 53/02 | (2006.01) | |
| C10B 57/02 | (2006.01) | |
| C10L 5/04 | (2006.01) | |
| C10B 47/30 | (2006.01) | |
| C10L 5/36 | (2006.01) | |
| C22B 4/02 | (2006.01) | |
| H01B 1/04 | (2006.01) | |
| C21B 5/00 | (2006.01) | |
| C10B 39/02 | (2006.01) | |
| C10B 41/00 | (2006.01) | |
| C10B 57/06 | (2006.01) | |
| C10B 57/10 | (2006.01) | |
| C10B 45/00 | (2006.01) | |
| C01B 32/30 | (2017.01) | |
| B01J 21/18 | (2006.01) | |
| C10B 39/00 | (2006.01) | |
| C10B 43/02 | (2006.01) | |
| C21C 5/52 | (2006.01) | |
| C01B 32/318 | (2017.01) | |
| C01B 32/312 | (2017.01) | |
| C21B 13/00 | (2006.01) | |

(52) U.S. Cl.
CPC ............ *C01B 32/318* (2017.08); *C10B 39/00* (2013.01); *C10B 39/02* (2013.01); *C10B 41/00* (2013.01); *C10B 43/02* (2013.01); *C10B 45/00* (2013.01); *C10B 47/30* (2013.01); *C10B 49/02* (2013.01); *C10B 53/02* (2013.01); *C10B 57/02* (2013.01); *C10B 57/06* (2013.01); *C10B 57/10* (2013.01); *C10L 5/04* (2013.01); *C10L 5/36* (2013.01); *C10L 5/363* (2013.01); *C10L 5/365* (2013.01); *C10L 5/366* (2013.01); *C10L 5/442* (2013.01); *C21B 5/007* (2013.01); *C21C 5/52* (2013.01); *C22B 4/02* (2013.01); *H01B 1/04* (2013.01); *C10L 2200/0204* (2013.01); *C10L 2200/025* (2013.01); *C10L 2200/0469* (2013.01); *C10L 2290/02* (2013.01); *C10L 2290/06* (2013.01); *C10L 2290/08* (2013.01); *C10L 2290/145* (2013.01); *C10L 2290/28* (2013.01); *C10L 2290/30* (2013.01); *C10L 2290/50* (2013.01); *C10L 2290/52* (2013.01); *C10L 2290/58* (2013.01); *C10L 2290/60* (2013.01); *C21B 13/0066* (2013.01); *Y02E 50/10* (2013.01); *Y02E 50/14* (2013.01); *Y02E 50/30* (2013.01); *Y02E 50/32* (2013.01); *Y02P 10/143* (2015.11); *Y02P 20/129* (2015.11); *Y02P 20/145* (2015.11); *Y02W 10/30* (2015.05); *Y02W 10/37* (2015.05)

(58) Field of Classification Search
CPC ............ C10L 5/442; C10L 2200/0204; C10L 2200/025; C10L 2200/0469; C10L 2290/02; C10L 2290/06; C10L 2290/08; C10L 2290/28; C10L 2290/30; C10L 2290/52; C10L 2290/145; C10L 2290/50; C10L 2290/58; C10L 2290/60; C10L 2200/22; C01B 31/02; C01B 31/08; C10B 49/02; C10B 53/02; C10B 57/02; C10B 39/00; C10B 47/30; C10B 43/02; C10B 39/02; C10B 41/00; C10B 57/06; C10B 57/10; C10B 45/00; Y02E 50/10; Y02E 50/14; Y02E 50/32; Y02E 50/30; B01J 21/18; C21C 5/52; C22B 4/02; C21B 5/007; H01B 1/04; Y02P 20/145; Y02P 20/129; Y02P 10/143; Y02W 10/30; Y02W 10/37

See application file for complete search history.

(56) References Cited

U.S. PATENT DOCUMENTS

| | | | |
|---|---|---|---|
| 3,088,983 | A | 5/1963 | Rosenthal |
| 3,290,894 | A | 12/1966 | Tsao |
| 3,650,711 | A | 3/1972 | Unick et al. |
| 3,852,048 | A | 12/1974 | Pyle |
| 3,853,498 | A | 12/1974 | Bailie |
| 4,011,129 | A | 3/1977 | Tomlinson |
| 4,015,951 | A | 4/1977 | Gunnetman |
| 4,026,678 | A | 5/1977 | Livingston |
| 4,082,694 | A | 4/1978 | Wennerberg |
| 4,102,653 | A | 7/1978 | Simmons et al. |
| 4,149,994 | A | 4/1979 | Murty |
| 4,152,119 | A | 5/1979 | Schulz |
| 4,210,423 | A | 7/1980 | Yan |
| 4,236,897 | A | 12/1980 | Johnston |
| 4,248,839 | A | 2/1981 | Toomey |
| 4,308,033 | A | 12/1981 | Gunnennan |
| 4,324,561 | A | 4/1982 | Dean et al. |
| 4,385,905 | A | 5/1983 | Tucker |
| 4,395,265 | A | 7/1983 | Reilly et al. |
| 4,398,917 | A | 8/1983 | Reilly |
| 4,405,331 | A | 9/1983 | Blaustein et al. |
| 4,494,962 | A | 1/1985 | Christie et al. |
| 4,500,327 | A | 2/1985 | Nishino |
| 4,529,407 | A | 7/1985 | Johnston et al. |
| 4,553,978 | A | 11/1985 | Yvan |
| 4,561,860 | A | 12/1985 | Gulley et al. |
| 4,632,731 | A | 12/1986 | Bodle et al. |
| 4,652,433 | A | 3/1987 | Ashworth et al. |
| 4,679,268 | A | 7/1987 | Gurries et al. |
| 4,810,255 | A | 3/1989 | Fay, III et al. |
| 4,810,446 | A | 3/1989 | Sylvest |
| 4,828,573 | A | 5/1989 | Jelks |
| 4,834,777 | A | 5/1989 | Endebrock |
| 4,886,519 | A | 12/1989 | Hayes et al. |

(56) References Cited

U.S. PATENT DOCUMENTS

| | | |
|---|---|---|
| 5,141,526 A | 8/1992 | Chu |
| 5,153,242 A | 10/1992 | Timm et al. |
| 5,167,797 A | 12/1992 | Ou |
| 5,187,141 A | 2/1993 | Jha et al. |
| 5,248,413 A | 9/1993 | Stencel |
| 5,336,835 A | 8/1994 | McNamara |
| 5,338,441 A | 8/1994 | LeViness |
| 5,342,418 A | 8/1994 | Jesse |
| 5,346,876 A | 9/1994 | Ichimura et al. |
| 5,352,252 A | 10/1994 | Tolmie |
| 5,431,702 A | 7/1995 | Schulz |
| 5,458,803 A | 10/1995 | Oehr |
| 5,513,755 A | 5/1996 | Heavilon et al. |
| 5,584,970 A | 12/1996 | Schmalfeld et al. |
| 5,643,342 A | 7/1997 | Andrews |
| 5,725,738 A | 3/1998 | Brioni et al. |
| 5,910,440 A | 6/1999 | Grossman et al. |
| 5,916,826 A | 6/1999 | White |
| 5,976,373 A | 11/1999 | Trocciola et al. |
| 5,980,595 A | 11/1999 | Andrews |
| 6,039,774 A | 3/2000 | MCMullen et al. |
| 6,057,262 A | 5/2000 | Derbyshire et al. |
| 6,342,129 B1 | 1/2002 | Vaughn et al. |
| 6,447,437 B1 | 9/2002 | Lee et al. |
| 6,506,223 B2 | 1/2003 | White |
| 6,524,354 B2 | 2/2003 | Sinha et al. |
| 6,698,724 B1 | 3/2004 | Traeger et al. |
| 6,712,606 B2 | 3/2004 | Hagstrom et al. |
| 6,719,816 B2 | 4/2004 | Barford |
| 6,818,027 B2 | 11/2004 | Murcia |
| 7,241,321 B2 | 7/2007 | Murcia |
| 7,314,002 B2 | 1/2008 | Dupuis |
| 7,326,263 B2 | 2/2008 | Andersen |
| 7,404,262 B2 | 7/2008 | Jurkovich et al. |
| 7,438,785 B2 | 10/2008 | Meier et al. |
| 7,879,136 B2 | 2/2011 | Mazyck |
| 8,048,528 B2 | 11/2011 | Matviya |
| 8,080,088 B1 | 12/2011 | Srinivasachar |
| 8,309,052 B2 | 11/2012 | Jones |
| 8,328,887 B2 | 12/2012 | Yang et al. |
| 8,361,186 B1 | 1/2013 | Shearer et al. |
| 8,425,633 B2 | 4/2013 | Banasiak |
| 8,449,724 B2 | 5/2013 | Stromberg et al. |
| 8,519,205 B2 | 8/2013 | Frey |
| 8,637,055 B2 | 1/2014 | Maor |
| 9,388,046 B2 * | 7/2016 | Mennell .................. C01B 31/02 |
| 2001/0009125 A1 | 7/2001 | Monereau et al. |
| 2002/0038058 A1 | 3/2002 | Holtzapple et al. |
| 2002/0048144 A1 | 4/2002 | Sugo et al. |
| 2002/0050094 A1 | 5/2002 | Taulbee |
| 2002/0194779 A1 | 12/2002 | Barford |
| 2003/0154858 A1 | 8/2003 | Kleut et al. |
| 2003/0221363 A1 | 12/2003 | Reed |
| 2004/0045215 A1 | 3/2004 | Guilfoyle |
| 2004/0079262 A1 | 4/2004 | Hornung et al. |
| 2004/0178052 A1 | 9/2004 | Antal |
| 2005/0095183 A1 | 5/2005 | Rehmat et al. |
| 2005/0142250 A1 | 6/2005 | Garwood |
| 2005/0258093 A1 | 11/2005 | Cueman et al. |
| 2005/0274068 A1 | 12/2005 | Morton et al. |
| 2006/0048646 A1 | 3/2006 | Olson et al. |
| 2006/0093713 A1 | 5/2006 | Jurkovich et al. |
| 2006/0120934 A1 | 6/2006 | Lanier et al. |
| 2006/0130396 A1 | 6/2006 | Werner |
| 2006/0228282 A1 | 10/2006 | Zhou et al. |
| 2006/0280669 A1 | 12/2006 | Jones |
| 2007/0006526 A1 | 1/2007 | Cullen |
| 2007/0028510 A1 | 2/2007 | Dupuis |
| 2007/0034126 A1 | 2/2007 | Chen et al. |
| 2007/0140941 A1 | 6/2007 | Comrie |
| 2007/0168213 A1 | 7/2007 | Comrie |
| 2007/0209923 A1 | 9/2007 | Flottvik |
| 2007/0220805 A1 | 9/2007 | Leveson et al. |
| 2007/0261295 A1 | 11/2007 | Tolmie |
| 2007/0266623 A1 | 11/2007 | Paoluccio |
| 2008/0087165 A1 | 4/2008 | Andersen |
| 2008/0153143 A1 | 6/2008 | Schorken et al. |
| 2008/0172933 A1 | 7/2008 | Drisdelle et al. |
| 2008/0197012 A1 | 8/2008 | Berruti et al. |
| 2008/0207442 A1 | 8/2008 | Pfeifer et al. |
| 2009/0056205 A1 | 3/2009 | Gauthier et al. |
| 2009/0084029 A1 | 4/2009 | Bergman |
| 2009/0126433 A1 | 5/2009 | Piskorz et al. |
| 2009/0139851 A1 | 6/2009 | Freel |
| 2009/0151251 A1 | 6/2009 | Manzer et al. |
| 2009/0188160 A1 | 7/2009 | Liu et al. |
| 2009/0205546 A1 | 8/2009 | Kluko |
| 2009/0221866 A1 | 9/2009 | Stone et al. |
| 2009/0314185 A1 | 12/2009 | Whellock |
| 2009/0317320 A1 | 12/2009 | Srinivasachar |
| 2010/0059449 A1 | 3/2010 | Grass et al. |
| 2010/0101141 A1 | 4/2010 | Shulenberger et al. |
| 2010/0112242 A1 | 5/2010 | Medoff |
| 2010/0139155 A1 | 6/2010 | Mennell et al. |
| 2010/0139156 A1 | 6/2010 | Mennell et al. |
| 2010/0178624 A1 | 7/2010 | Srinivasachar |
| 2010/0228062 A1 * | 9/2010 | Babicki .................. C01B 3/56 585/240 |
| 2010/0257775 A1 | 10/2010 | Cheiky |
| 2010/0273899 A1 | 10/2010 | Winter |
| 2011/0002086 A1 | 1/2011 | Feaver et al. |
| 2011/0011721 A1 | 1/2011 | Champagne |
| 2011/0041392 A1 | 2/2011 | Stromberg et al. |
| 2011/0071022 A1 | 3/2011 | Bandosz et al. |
| 2011/0132737 A1 | 6/2011 | Jadhav |
| 2012/0021123 A1 | 1/2012 | Leveson et al. |
| 2012/0125064 A1 | 5/2012 | Joseph et al. |
| 2012/0172216 A1 | 7/2012 | Boehringer et al. |
| 2012/0174475 A1 | 7/2012 | Mennell et al. |
| 2012/0174476 A1 | 7/2012 | Mennell et al. |
| 2012/0285080 A1 | 11/2012 | Despen et al. |
| 2013/0145684 A1 | 6/2013 | Mennell et al. |
| 2013/0152461 A1 | 6/2013 | Mennell et al. |
| 2014/0075832 A1 | 3/2014 | Mennell et al. |
| 2014/0075834 A1 | 3/2014 | Mennell et al. |
| 2014/0101992 A1 | 4/2014 | Mennell et al. |
| 2014/0110240 A1 | 4/2014 | Mennell et al. |
| 2014/0338576 A1 | 11/2014 | Mennell et al. |
| 2015/0075326 A1 | 3/2015 | Despen et al. |
| 2015/0126362 A1 | 5/2015 | Mennell et al. |
| 2015/0144831 A1 | 5/2015 | Mennell et al. |
| 2015/0196893 A1 | 7/2015 | Mennell et al. |
| 2015/0196896 A1 | 7/2015 | Mennell et al. |
| 2015/0197424 A1 | 7/2015 | Mennell et al. |
| 2016/0114308 A1 | 4/2016 | Despen et al. |
| 2016/0280554 A1 | 9/2016 | Despen et al. |
| 2017/0037333 A1 | 2/2017 | Mennell et al. |
| 2017/0037334 A1 | 2/2017 | Mennell et al. |

FOREIGN PATENT DOCUMENTS

| | | |
|---|---|---|
| CN | 101805626 A | 8/2010 |
| DE | 202009010612 | 10/2009 |
| EP | 0930091 | 7/1999 |
| GB | 1412407 | 11/1975 |
| JP | 06-88077 | 3/1994 |
| JP | 10-208985 | 8/1998 |
| JP | 2000-212568 | 8/2000 |
| JP | 2000-265186 | 9/2000 |
| JP | 2001-300497 | 10/2001 |
| JP | 2002-211911 | 7/2002 |
| JP | 2002-226865 | 8/2002 |
| JP | 2002-255796 | 9/2002 |
| JP | 2002-289683 | 10/2002 |
| JP | 2003-213273 | 7/2003 |
| JP | 2003-238136 | 8/2003 |
| JP | 2003-286021 | 10/2003 |
| JP | 2005-263547 | 9/2005 |
| JP | 2005-298602 | 10/2005 |
| JP | 2006-315899 | 11/2006 |
| JP | 2008-037931 | 2/2008 |
| JP | 2008-222901 | 9/2008 |
| JP | 2009-125070 | 6/2009 |
| JP | 2010-194502 | 9/2010 |

(56) References Cited

FOREIGN PATENT DOCUMENTS

| | | |
|---|---|---|
| JP | 2010-202298 | 9/2010 |
| JP | 2010-222474 | 10/2010 |
| WO | WO 2002/069351 | 9/2002 |
| WO | WO 2005/049530 | 6/2005 |
| WO | WO 2006/122405 | 11/2006 |
| WO | WO 2007/147244 | 12/2007 |
| WO | WO 2008/022461 | 2/2008 |
| WO | WO 2008/076944 | 6/2008 |
| WO | WO 2008/144416 | 11/2008 |
| WO | WO 2009/018469 | 2/2009 |
| WO | WO 2009/105441 | 8/2009 |
| WO | WO 2010/110470 | 9/2010 |
| WO | WO 2010/128055 | 11/2010 |
| WO | WO 2010/132970 | 11/2010 |
| WO | WO 2011/053668 | 5/2011 |
| WO | WO 2011/119961 | 9/2011 |
| WO | WO 2011/162727 | 12/2011 |
| WO | WO 2012/142486 | 10/2012 |
| WO | WO 2012/142488 | 10/2012 |
| WO | WO 2012/142489 | 10/2012 |
| WO | WO 2012/142491 | 10/2012 |
| WO | WO 2013/169803 | 11/2013 |
| WO | WO 2013/169806 | 11/2013 |
| WO | WO 2013/169811 | 11/2013 |
| WO | WO 2013/187940 | 12/2013 |
| WO | WO 2015/061701 | 4/2015 |
| WO | WO 2015/109206 | 7/2015 |
| WO | WO 2015/127460 | 8/2015 |
| WO | WO 2016/065357 | 4/2016 |

OTHER PUBLICATIONS

Antal et al., "The Art, Science and Technology of Charcoal Production," Ind. Eng. Chem. Res., 42:1619-1640 (2003).
Ayanda et al., "Activated Carbon-Fly Ash-Nanometal Oxide Composite Materials: Preparation, Characterization, and Tributyltin Removal Efficiency," Journal of Chemistry. vol. 2013 (2013).
Baldock, "Chemical composition and bioavailability of thermally altered *Pinus resinosa* (Red pine) wood," Org. Geochem., vol. 33(9), pp. 1093-1109 (2002).
Brodowski, "Morphological and Chemical Properties of Black Carbon in Physical Soil Fractions as Revealed by Scanning Electron Microscopy and Energy-Dispersive X-ray Spectroscopy," Geoderma, vol. 128, pp. 116-129 (2005).
Cheng et al., "Oxidatin of black carbon by biotic and abiotic processes," Organic Geochemistry 37:1477-1488 (2006).
Demirbas, "Effects of Temperature and Particle Size on Bio-Char Yield from Pyrolysis of Agricultural Residues," J. Anal. Appl. Pyrolysis, vol. 72, pp. 243-248 (2004).
Di Felice et al., "Biomass Gasification with Catalytic Tar Reforming: A Model Study into Activity Enhancement of Calcium- and Magnesium-Oxide-Based Catalytic Materials by Incorporation of Iron," Energy Fuels 2010, vol. 24, pp. 4034-4045.
Du, "Some Thoughts on the Chemical Compositions of Fly Ash: ICAR's 17th Annual Symposium. The University of Texas at Austin," (2009).
Edgehill et al. (1998, Adsorption Characteristics of Carbonized Bark for Phenal and Pentachlorophenol).
Freese et al. (2000, Powdered Activated Carbon: Can This Be Effectively Assessed in the Laboratory).
Gupta et al., "Utilisation of bagasse fly ash (a sugar industry waste) for the removal of copper and zinc from wasterwater," Separation and Purification Technology Journal. vol. 18, Issue 2, pp. 131-140 (2000).
Hamer, "Interactive Priming of Black Carbon and Glucose Mineralisation," Org. Geochem., vol. 35, pp. 823-830 (2004).
Hardman et al., "Studies of Spontaneous Combustion in Beds of Activated Carbon," Fuel, IPC Science and Technology Press, vol. 59, No. 3, pp. 151-156 (Mar. 1980).
Hung, "The Production of Activated Carbon from Coconut Shells Using Pyrolysis and Fluidized Bed Reactors. A Thesis Submitted to the Honors College." The University of Arizona, May 2012, [retrieved on May 4, 2015][retrieved from the internet] <URL:http://arizona/openrepository.com/arizona/bitstream/10150/243968/1/azu_etd_mr_2012_0079_sip1_m.pdf> Abstract, pp. 8, 9, 12, 31-33.
Hwang et al., "Characterization of char derived from various types of solid wastes from the standpoint of fuel recovery and pretreatment before landfilling.," Waste Management (Aug. 22, 2006) 27(9):1155-1166.
Iqbaldin et al., "Properties of coconut shell activated carbon," Journ. Tropical Forest Science, 25(4):497-503 (2013).
Jha et al., "Sorption properties of the activated carbon-zeolite composite prepared from coal fly ash for Ni(2+), Cu(2+), Cd(2+) and Pb(2+)," Journal of Hazardous Materials. vol. 160, Issue 1 (2008).
Kuzyakov, "Black Carbon Decomposition and Incorporation Into Soil Microbial Biomass Estimated by 14C Labeling," Soil Bio & Biochem., vol. 4, pp. 210-219 (2009).
Lakdawala et al., "The effect of low cost material Bagasse Fly ash to the removal of COD Contributing component of combined waste water of Sugar Industry," Scholars Research Library (2012).
Lehmann, "Bio-energy in the black," Front. Ecol. Enviorn., vol. 5(7), pp. 381-387 (2007).
Mackay, "The Dependence of Char and Carbon Yield on Lignocellulosic Precursor Composition," Carbon, col. 20(2), pp. 87-94 (1982).
Martin et al., "Gasification and Production of Biochar from Wastewater Grown Algae," Water New Zealand Annual Conference, Sep. 22-24, 2010, XP055337229, Retrieved from the Internet: URL:https://www.waternz.org.nz/Attachment?Action=Download&Attachment_id=1127 [retrieved on Jan. 20, 2017].
Novack, "Impact of Biochar Amendment on Fertility of a Southeastern Coastal Plain Soil," Soil Sci., vol. 174(2), pp. 105-112 (Feb. 2009).
PCT/US2009/069133 International Search Report and Written Opinion dated Jul. 26, 2011.
PCT/US2009/069403 International Search Report and Written Opinion dated Jul. 26, 2011.
PCT/US2012/033624 International Search Report dated Sep. 17, 2012.
PCT/US2012/033627 International Search Report dated Jul. 13, 2012.
PCT/US2012/033628 International Search Report dated Jul. 6, 2012.
PCT/US2012/033630 International Search Report dated Aug. 21, 2012.
PCT/US2012/033630 Written Opinion dated Aug. 21, 2012.
PCT/US2013/039981 International Search Report dated Oct. 22, 2013.
PCT/US2013/039986 International Search Report dated Oct. 26, 2013.
PCT/US2013/039991 International Search Report dated Dec. 16, 2013.
PCT/US2014/062202 International Search Report and Written Opinion dated Feb. 3, 2015.
PCT/US2015/011787 International Search Report dated Jun. 11, 2015.
PCT/US2015/017351 International Search Report dated May 15, 2015.
PCT/US2015/57370 International Search Report dated Jan. 8, 2016.
Purnomo et al., "Preparation and characterization of activated carbon from bagasse fly ash," Journal of Analytical and Applied Pyrolysis. vol. 91 (2011).
Saravanakumar et al., "Experimental investigations of long stick wood gasification in a bottom lit updraft fixed bed gasifier," Fuel Processing Technology, 88:617-622 (2007).
Shinogi et al., "Pyrolysis of plant, animal and human waste: physical and chemical characterization of the pyrolytic products," Bioresource Technology 90:241-247 (2003).
Tay et al., "Preparation and characterization of activated carbon from waste biomass," Journal of Hazardous Materials ND (Jun. 15, 2009) 165(1-3):481-485.

(56) References Cited

OTHER PUBLICATIONS

Ueda, Shigeru et al., "Improvement of Reactivity of Carbon Iron Ore Composite with Biomass Char for Blast Furnace" ISIJ International (2009) 49(10)1505-1512.
Yan et al., "Thermal Pretreatment of Lignocellulosic Biomass," Environmental Progress and Sustainable Energy, vol. 28, No. 3, pp. 435-440, Oct. 2009.

\* cited by examiner

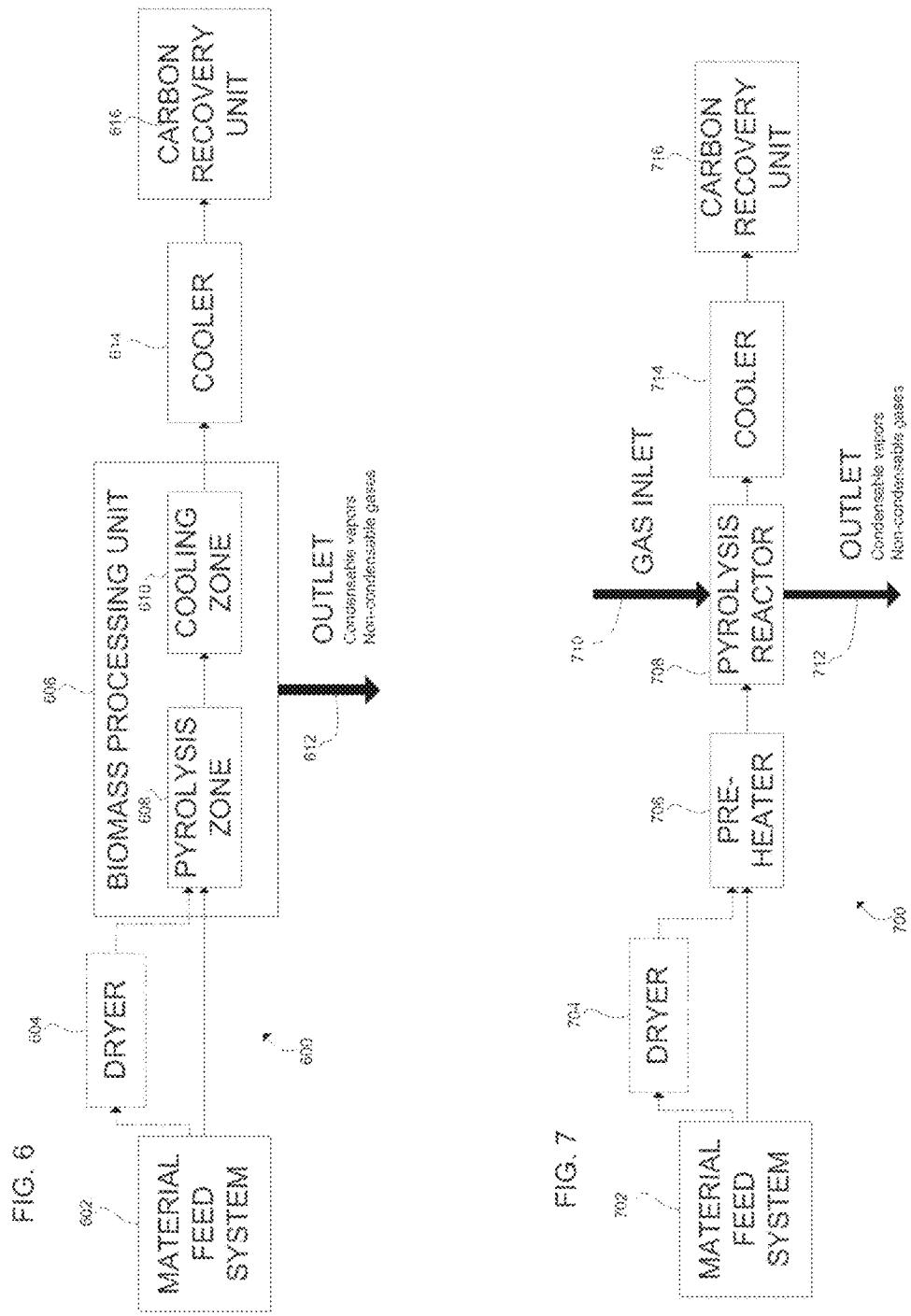

SYSTEMS AND APPARATUS FOR PRODUCTION OF HIGH-CARBON BIOGENIC REAGENTS

PRIORITY CLAIM

This application is a continuation of U.S. patent application Ser. No. 14/111,281, filed on Dec. 4, 2013, which is a 371 U.S. National Stage application of International PCT Application No. PCT/US 12/33628, filed Apr. 13, 2012, which claims the benefit of priority to U.S. Provisional Application Nos. 61/476,025 filed Apr. 15, 2011, 61/476,043 filed Apr. 15, 2011, 61/475,930 filed Apr. 15, 2011, 61/475,937 filed Apr. 15, 2011, 61/475,943 filed Apr. 15, 2011, 61/475,946 filed Apr. 15, 2011, 61/475,949, filed Apr. 15, 2011, 61/476,956 filed Apr. 15, 2011, 61/475,959 filed Apr. 15, 2011, 61/475,968 filed Apr. 15, 2011, 61/475,971 filed Apr. 15, 2011, 61/475,973 filed Apr. 15, 2011, 61/475,977 filed Apr. 15, 2011, 61/475,981 filed Apr. 15, 2011, 61/475,991 filed Apr. 15, 2011, 61/475,996 filed Apr. 15, 2011, and 61/476,049 filed Apr. 15, 2011, the entirety of which is incorporated herein by reference.

FIELD OF THE INVENTION

The present invention generally relates to processes, systems, and apparatus for the production of high-carbon biogenic reagents, and compositions, products, and uses related thereto.

BACKGROUND OF THE INVENTION

Carbon is a platform element in a wide variety of industries and has a vast number of chemical, material, and fuel uses Carbon is a good fuel to produce energy, including electricity Carbon also has tremendous chemical value for various commodities and advanced materials, including metals, metal alloys, composites, carbon fibers, electrodes, and catalyst supports. For metal making, carbon is useful as a reactant, for reducing metal oxides to metals during processing; as a fuel, to provide heat for processing; and as a component of the final metal alloy. Carbon is a very important element in steel since it allows steel to be hardened by heat treatment.

Carbon-based reagents can be produced, in principle, from virtually any material containing carbon. Carbonaceous materials commonly include fossil resources such as natural gas, petroleum, coal, and lignite; and renewable resources such as lignocellulosic biomass and various carbon-rich waste materials.

Biomass is a term used to describe any biologically produced matter, or biogenic matter. The chemical energy contained in biomass is derived from solar energy using the natural process of photosynthesis. This is the process by which plants take in carbon dioxide and water from their surroundings and, using energy from sunlight, convert them into sugars, starches, cellulose, hemicellulose, and lignin. Of all the renewable energy sources, biomass is unique in that it is, effectively, stored solar energy. Furthermore, biomass is the only renewable source of carbon.

By utilizing biogenic carbon for fuel, CO2 emissions associated with the combustion do not contribute to net life-cycle carbon emissions because carbon is recycled to grow more biomass. Also, use of biogenic carbon as a fuel will typically cause lower emissions of sulfur dioxide and mercury, compared to use of coal or other solid fossil fuels for energy production.

For chemical and material applications in which the carbon will not be immediately combusted, by utilizing biogenic carbon, the carbon can be effectively sequestered for long periods of time (e.g., when carbon is added to steel for permanent structures). In this way, the net carbon emissions are actually negative-CO2 from the atmosphere is used to grow biogenic feedstocks and then the carbon is sequestered in biogenic products.

Converting biomass to high-carbon reagents, however, poses both technical as well as economic challenges arising from feedstock variations, operational difficulties, and capital intensity. There exist a variety of conversion technologies to turn biomass feedstocks into high-carbon materials. Most of the known conversion technologies utilize some form of pyrolysis.

Pyrolysis is a process for thermal conversion of solid materials in the complete absence of oxidizing agent (air or oxygen), or with such limited supply that oxidation does not occur to any appreciable extent. Depending on process conditions and additives, biomass pyrolysis can be adjusted to produce widely varying amounts of gas, liquid, and solid. Lower process temperatures and longer vapor residence times favor the production of solids. High temperatures and longer residence times increase the biomass conversion to syngas, while moderate temperatures and short vapor residence times are generally optimum for producing liquids. Recently, there has been much attention to pyrolysis and related processes for converting biomass into high-quality syngas and/or to liquids as precursors to liquid fuels.

On the other hand, there has been less focus on improving pyrolysis processes specifically for optimizing yield and quality of the solids as high-carbon reagents. Historically, slow pyrolysis of wood has been performed in large piles, in a simple batch process, with no emissions control. Traditional charcoal-making technologies are energy-inefficient as well as highly polluting. Clearly, there are economic and practical challenges to scaling up such a process for continuous commercial-scale production of high-quality carbon, while managing the energy balance and controlling emissions.

SUMMARY OF THE INVENTION

In some variations, the present invention provides a process for producing a high-carbon biogenic reagent, the process comprising:

(a) providing a carbon-containing feedstock comprising biomass;

(b) optionally drying the feedstock to remove at least a portion of moisture contained within the feedstock;

(c) optionally deaerating the feedstock or the dried feedstock to remove at least a portion of interstitial oxygen, if any, contained with the feedstock;

(d) in a pyrolysis zone, pyrolyzing the feedstock in the presence of a substantially inert gas for at least about 10 minutes and with a pyrolysis temperature selected from about 250° C. to about 700° C., to generate hot pyrolyzed solids, condensable vapors, and non-condensable gases;

(e) separating at least a portion of the condensable vapors and at least a portion of the non-condensable gases from the hot pyrolyzed solids;

(f) in a cooling zone, cooling the hot pyrolyzed solids, in the presence of the substantially inert gas for at least about 5 minutes and with a cooling-zone temperature less than the pyrolysis temperature, to generate warm pyrolyzed solids;

(g) in an optional cooler that is separate from the cooling zone, further cooling the warm pyrolyzed solids to generate cool pyrolyzed solids; and (h) recovering a high-carbon biogenic reagent comprising at least a portion of the warm or cool pyrolyzed solids.

The term "reactor" herein refers to a discrete unit in which atmospheric and temperature conditions can be controlled and in which a physical and/or chemical reaction can take place. The term "zone" in the present context refers to an area within a reactor in which temperature conditions and atmospheric conditions can be controlled relative to other zones within the reactor.

The term "biomass processing unit" herein refers to a reactor that includes a plurality of zones as discussed in more detail below. In various embodiments, the biomass processing unit ("BPU") includes a plurality of output passageways configured to transfer the raw material or feedstock at different stages of processing, gases, condensate byproducts, and heat from various reactors and zones to any one or more of the other reactors or zones, the material feed system, the carbon recovery unit, and any other contemplated components of the system described herein. In one embodiment, after the raw material has passed through each of the zones of the BPU, the raw material is carbonized.

The term "carbonization" herein means increasing the carbon content in a given amount of biomass Carbonization can illustratively be accomplished by reducing non-carbon containing material from the biomass, adding carbon atoms to the biomass or both to form a "high-carbon biogenic reagent."

As discussed below, various multi-zone BPU embodiments include a reactor and various multi-zone BPU embodiments could also include more than one separate reactor. It should be appreciated that other embodiments discussed below multiple separate reactors, each reactor having at least one zone. For the purposes of this disclosure, the properties, principles, processes, alternatives, and embodiments discussed with respect to all single reactor multi-zone BPU embodiments apply equally to all multiple separate reactor embodiments, and vice-versa.

In some embodiments, the process comprises drying the feedstock to remove at least a portion of moisture contained within the feedstock. In these or other embodiments, the process comprises deaerating the feedstock to remove at least a portion of interstitial oxygen contained with the feedstock.

The process may further include preheating the feedstock, prior to step (d), in a preheating zone in the presence of the substantially inert gas for at least 5 minutes and with a preheating temperature selected from about 80° C. to about 500° C., or from about 300° C. to about 400° C.

In some embodiments, the pyrolysis temperature is selected from about 400° C. to about 600° C. In some embodiments, pyrolysis in step (d) is carried out for at least 20 minutes. The cooling-zone temperature may be selected from about 150° C. to about 350° C., for example.

Pyrolysis conditions may be selected to maintain the structural integrity or mechanical strength of the high-carbon biogenic reagent relative to the feedstock, when it is desired to do so for a certain product application.

In some embodiments, each of the zones is located within a single reactor or a BPU. In other embodiments, each of the zones is located in separate BPUs or reactors. It should be appreciated that some embodiments include one or more BPUs, each including at least one zone.

The substantially inert gas may be selected from the group consisting of $N_2$, Ar, CO, $CO_2$, $H_2$, $CH_4$, and combinations thereof. Some of the substantially inert gas may include one or more non-condensable gas species (e.g., CO and CO2) recycled from step (e). In some embodiments, the pyrolysis zone and the cooling zone each comprise a gas phase containing less than 5 wt. % oxygen, such as about 1 wt % oxygen or less.

The process may be continuous, semi-continuous, or batch. In some continuous or semi-continuous embodiments, the inert gas flows substantially countercurrent relative to the direction of solids flow. In other continuous or semi-continuous embodiments, the inert gas flows substantially cocurrent relative to the direction of solids flow In some embodiments, the process includes monitoring and controlling the process with at least one reaction gas probe, such as two or more reaction gas probes. Monitoring and controlling the process can improve process energy efficiency. Monitoring and controlling the process can also improve a product attribute associated with the high-carbon biogenic reagent, such as (but not limited to) carbon content, energy content, structural integrity, or mechanical strength.

The process may further include thermal oxidation (i.e., combustion) of at least a portion of the condensable and non-condensable vapors with an oxygen-containing gas. The thermal oxidation may be assisted with combustion of natural gas. Heat produced from the thermal oxidation may be utilized, at least in part, for drying the feedstock. Additionally, heat produced from the thermal oxidation may be utilized, at least in part, to heat the substantially inert gas before entering one of the zones or reactors, such as the pyrolysis zone.

The process may further include combining at least a portion of the vapors with the cooled pyrolyzed solids, to increase the carbon content of the high-carbon biogenic reagent. Alternatively, or additionally, the process may further include combining at least a portion of the condensable vapors with the warm pyrolyzed solids, to increase the carbon content of the high-carbon biogenic reagent.

Condensable vapors may thus be used for either energy in the process (such as by thermal oxidation) or in carbon enrichment, to increase the carbon content of the high-carbon biogenic reagent. Certain non-condensable gases, such as CO or $CH_4$ may be utilized either for energy in the process, or as part of the substantially inert gas for the pyrolysis step.

In some embodiments, the process further comprises introducing at least one additive selected from acids, bases, or salts thereof. The additive may be selected from (but not limited to) the group consisting of sodium hydroxide, potassium hydroxide, magnesium oxide, hydrogen bromide, hydrogen chloride, sodium silicate, potassium permanganate, and combinations thereof.

In some embodiments, the process further comprises introducing at least one additive selected from the group consisting of a metal, a metal oxide, a metal hydroxide, a metal halide, and combinations thereof. The additive may be selected from (but not limited to) the group consisting of magnesium, manganese, aluminum, nickel, chromium, silicon, boron, cerium, molybdenum, phosphorus, tungsten, vanadium, iron halide, iron chloride, iron bromide, magnesium oxide, dolomite, dolomitic lime, fluorite, fluorospar, bentonite, calcium oxide, lime, and combinations thereof.

Additives may be added before, during, or after any one or more steps of the process, including into the feedstock itself at any time, before or after it is harvested. Additives may be introduced prior to or during step (b), prior to or during step (d), during step (f), during step (g), between steps (f) and (g), or after step (g), for example. An additive may be introduced to the warm pyrolyzed solids. For example, an additive may be introduced in an aqueous solution, vapor, or aerosol to assist with cooling of the warm pyrolyzed solids in step (g). In these or other embodiments, an additive is introduced to the cool pyrolyzed solids to form the high-carbon biogenic reagent containing the additive.

In some embodiments, the process further comprises introducing at least a portion of the cool pyrolyzed solids to a separate unit for additional pyrolysis, in the presence of a substantially inert gas for at least about 30 minutes and with a pyrolysis temperature selected from about 200° C. to about 600° C., to generate a solid product having higher carbon content than the cool pyrolyzed solids.

In some embodiments, the process further comprises operating a cooler to cool the warm pyrolyzed solids with steam, thereby generating the cool pyrolyzed solids and superheated steam; wherein the drying is carried out, at least in part, with the superheated steam derived from the external cooler. Optionally, the cooler may be operated to first cool the warm pyrolyzed solids with steam to reach a first cooler temperature, and then with air to reach a second cooler temperature, wherein the second cooler temperature is lower than the first cooler temperature and is associated with a reduced combustion risk for the warm pyrolyzed solids in the presence of the air.

In some variations, the invention provides a process for producing a high-carbon biogenic reagent, the process comprising:

(a) providing a carbon-containing feedstock comprising biomass (optionally with some or all moisture removed);

(b) in a pyrolysis zone, pyrolyzing the feedstock in the presence of a substantially inert gas for at least 10 minutes and with a pyrolysis temperature selected from about 250° C. to about 700° C., to generate hot pyrolyzed solids, condensable vapors, and non-non-condensable gases;

(c) separating at least a portion of the condensable vapors and at least a portion of the non-condensable gases from the hot pyrolyzed solids;

(d) in a cooling zone, cooling the hot pyrolyzed solids, in the presence of the substantially inert gas for at least about 5 minutes and with a cooling temperature less than the pyrolysis temperature, to generate warm pyrolyzed solids;

(e) in an optional cooler that is separate from the cooling zone, further cooling the warm pyrolyzed solids to generate cool pyrolyzed solids; and (f) recovering a high-carbon biogenic reagent comprising at least a portion of the warm or cool pyrolyzed solids.

In some variations, the invention provides a process for producing a high-carbon biogenic reagent, the process comprising:

(a) providing a carbon-containing feedstock comprising biomass;

(b) optionally drying the feedstock to remove at least a portion of moisture, if any, contained within the feedstock;

(c) optionally deaerating the feedstock to remove at least a portion of interstitial oxygen, if any, contained with the feedstock;

(d) in a preheating zone, preheating the feedstock in the presence of a substantially inert gas for at least about 5 minutes and with a preheating temperature selected from about 80° C. to about 500° C.;

(e) in a pyrolysis zone, pyrolyzing the feedstock in the presence of a substantially inert gas for at least about 10 minutes and with a pyrolysis temperature selected from about 250° C. to about 700° C., to generate hot pyrolyzed solids, condensable vapors, and non-condensable gases;

(f) separating at least a portion of the condensable vapors and at least a portion of the non-condensable gases from the hot pyrolyzed solids;

(g) in a cooling zone, cooling the hot pyrolyzed solids, in the presence of a substantially inert gas for at least 5 minutes and with a cooling temperature less than the pyrolysis temperature, to generate warm pyrolyzed solids;

(h) in an optional cooler that is separate from the cooling zone, cooling the warm pyrolyzed solids to generate cool pyrolyzed solids; and (i) recovering a high-carbon biogenic reagent comprising at least a portion of the warm or cool pyrolyzed solids, the process further comprising introducing at least one additive somewhere in the process (i.e., at any one or more locations or times).

In some variations, the invention provides a process for producing a high-carbon biogenic reagent, the process comprising:

(a) providing a carbon-containing feedstock comprising biomass;

(b) optionally drying said feedstock to remove at least a portion of moisture contained within said feedstock;

(c) optionally deaerating said feedstock to remove at least a portion of interstitial oxygen, if any, contained with said feedstock or said dried feedstock;

(d) in a pyrolysis zone, pyrolyzing said feedstock in the presence of a substantially inert gas for at least about 10 minutes and with a pyrolysis temperature selected from about 250° C. to about 700° C., to generate hot pyrolyzed solids, condensable vapors, and non-condensable gases;

(e) separating at least a portion of said condensable vapors and at least a portion of said non-condensable gases from said hot pyrolyzed solids;

(f) in an optional cooling zone, further cooling said hot pyrolyzed solids, in the presence of said substantially inert gas for at least 5 minutes and with a cooling-zone temperature less than said pyrolysis temperature, to generate warm pyrolyzed solids;

(g) in a cooler that is separate from said cooling zone, cooling said warm or cool pyrolyzed solids to generate cool pyrolyzed solids;

(h) recovering a high-carbon biogenic reagent comprising at least a portion of said cool pyrolyzed solids, and (i) forming a fine powder from said high-carbon biogenic reagent, wherein the process optionally includes introducing at least one additive to the process prior to step (i), during step (i), or after step (i).

The high-carbon biogenic reagent may contain at least 35% of the carbon contained in the feedstock, such as at least 50% or at least 70% of the carbon contained in the feedstock. In some embodiments, the high-carbon biogenic reagent contains between about 40% and about 70% of the carbon contained in the feedstock.

In certain embodiments, an additive is introduced to the dried feedstock prior to or during step (d), and wherein the presence of the additive in the process increases the carbon content of the high-carbon biogenic reagent compared to an otherwise-identical process without introduction of the additive.

The high-carbon biogenic reagent may contain at least 55 wt % carbon on a dry basis, such as at least 55 wt. %, 60 wt. %, 65 wt. %, 70 wt. %, 75 wt. %, 80 wt %, 90 wt %, 95 wt %, or more carbon on a dry basis. The total carbon includes fixed carbon and may also include carbon from volatile matter. In some embodiments, the high-carbon biogenic reagent contains at least 90 wt % or at least 95 wt % fixed carbon on a dry basis.

The high-carbon biogenic reagent may have an energy content of at least 11,000 Btu/lb on a dry basis, such as at least 12,000 Btu/lb, at least 13,000 Btu/lb, at least 14,000 Btu/b, at least 14,500 Btu/lb, or at least 14,700 Btu/lb on a dry basis.

The high-carbon biogenic reagent may be formed into a fine powder by particle-size reduction. Alternatively, or sequentially, the high-carbon biogenic reagent may be formed into a structural object by pressing, binding, pelletizing, or agglomeration. In some embodiments, the high-carbon biogenic reagent is in the form of structural objects whose structure and/or strength substantially derive from the feedstock. In certain embodiments, the high-carbon biogenic reagent is in substantially the same structural form as the feedstock.

Other variations of the present invention provide a high-carbon biogenic reagent production system, the system comprising:

(a) a material feed system configured to introduce a carbon-containing feedstock;

(b) an optional dryer, disposed in operable communication with the material feed system, configured to remove moisture contained within a carbon-containing feedstock;

(c) a biomass processing unit, disposed in operable communication with the material feed system or the dryer (if present), wherein the biomass processing unit contains at least one pyrolysis zone disposed in operable communication with a spatially separated cooling zone, and wherein the biomass processing unit is configured with an outlet to remove condensable vapors and non-condensable gases from solids, (d) a cooler, disposed in operable communication with the biomass processing unit; and (e) a high-carbon biogenic reagent recovery unit, disposed in operable communication with the cooler.

The dryer, if present, may be configured as a drying zone within the BPU. In some embodiments, the system further comprises a purging system for removing oxygen from the system. The purging system may comprise one or more inlets to introduce a substantially inert gas, and one or more outlets to remove the substantially inert gas and displaced oxygen from the system. The purging system may be a deaerater disposed between the material feed system (or the dryer, if present) and the BPU.

Optionally, the system may include a preheating zone, disposed in operable communication with the pyrolysis zone.

Each of the at least one pyrolysis zone, the cooling zone, and the preheating zone (if present) may be located within a single unit, or in separate units. The material feed system may be physically integrated with the BPU. In some embodiments, the cooler is disposed within the BPU.

The system may further include one or more additive feeders for introducing additive(s) into the system, such as any of the above-described additives. In some embodiments, an additive feeder is configured to combine the additive with the carbon-containing feedstock. An additive feeder may be interposed between the material feed system (for biomass) and the BPU. An additive feeder may be disposed in operable communication with the BPU. An additive feeder may be disposed in operable communication with the cooler. An additive feeder may be interposed between the cooler and the carbon recovery unit. An additive feeder may disposed in operable communication with the carbon recovery unit, including downstream of the recovery unit itself.

The BPU may be configured with a first gas inlet and a first gas outlet. The first gas inlet and the first gas outlet may be disposed in communication with different zones, or the same zone. In various embodiments, the BPU is configured with any one or more of a second gas inlet, a second gas outlet, a third gas inlet, a third gas outlet, a gas inlet, and a fourth gas outlet. Optionally, each zone present in the BPU is configured with a gas inlet and a gas outlet. Gas inlets and outlets allow not only introduction and withdrawal of vapor or gas, but also allow precise process monitoring and control across various stages of the process, resulting in yield and efficiency improvements.

In some embodiments, the cooling zone is configured with a gas inlet, and the pyrolysis zone is configured with a gas outlet, to generate substantially countercurrent flow of the gas phase relative to the solid phase (e.g., the feedstock). In other embodiments, the cooling zone is configured with a gas inlet, and the preheating zone is configured with a gas outlet, to generate substantially countercurrent flow of the gas phase relative to the solid phase. In these or other embodiments, the cooling zone is configured with a gas inlet, and the drying zone is configured with a gas outlet, to generate substantially countercurrent flow of the gas phase relative to the solid phase.

The system may further comprise a first reaction gas probe disposed in operable communication with the pyrolysis zone and with a gas-monitoring device, such as (but not limited to) GC, MS, GC-MS, or FTIR. In some embodiments, the system further comprises a second reaction gas probe disposed in operable communication with the cooling zone and with the gas-monitoring device or a second gas-monitoring device which may be a different type of instrument. The system may include additional reaction gas probes disposed in operable communication with the drying zone (if present) and/or the preheating zone (if present), and with a gas-monitoring device. When reaction gas probes are included, the system may further include at least one computer-programmed controller executable to utilize output from the gas-monitoring device to adjust a system set point (such as pyrolysis temperature or inert gas flow rate).

In some embodiments, the system further comprises a process gas heater disposed in operable communication with the outlet to remove condensable vapors and non-condensable gases, wherein the process gas heater is configured to introduce a separate fuel and an oxidant into a combustion chamber, adapted for combustion of the fuel and at least a portion of the condensable vapors.

The system may include a heat exchanger disposed between the process heater and the dryer, configured to utilize at least some of the heat of the combustion for dryer. Alternatively, or additionally, the system may include a heat exchanger disposed between the process gas heater and a gas inlet for the BPU, configured to utilize at least some of the heat of the combustion for preheating a substantially inert gas prior to introduction into the BPU.

In some embodiments, the system further comprises a carbon-enrichment unit, disposed in operable communication with the cooler or the BPU, configured for combining vapors, including noncondensable vapors and/or condensable vapors in fully or at least partially condensed form, with the solids to increase the carbon content of the high-carbon biogenic reagent obtained from the carbon recovery unit.

In various embodiments, the system is configured for extracting and reusing gases from the BPU and/or extracting and reusing gases from the carbon recovery unit.

In some embodiments, the system further comprises a separate pyrolysis unit adapted to further pyrolyze the high-carbon biogenic reagent to further increase its carbon content.

Other variations provide a high-carbon biogenic reagent production system, the system comprising:

(a) a material feed system configured to introduce a carbon-containing feedstock;

(b) an optional dryer, disposed in operable communication with the material feed system, configured to remove moisture contained within a carbon-containing feedstock;

(c) a preheater, disposed in operable communication with the material feed system or the dryer (if present), configured to heat and/or mildly pyrolyze the feedstock;

(d) a pyrolysis reactor, disposed in operable communication with the preheater, configured to pyrolyze the feedstock;

(e) a cooler, disposed in operable communication with the pyrolysis reactor, configured to cool pyrolyzed solids; and (f) a high-carbon biogenic reagent recovery unit, disposed in operable communication with the cooler, wherein the system is configured with at least one gas inlet for introducing a substantially inert gas into the reactor, and at least one gas outlet for removing condensable vapors and non-condensable gases from the reactor.

This system may include a deaerater disposed between the material feed system or the dryer (if present) and the preheater. The system may be configured with at least two gas inlets and at least two gas outlets, if desired In some embodiments, the pyrolysis reactor and/or the cooler is configured with gas inlet(s), and the dryer (if present) and/or the preheater is configured with gas outlet(s), to generate substantially countercurrent flow of the gas phase relative to the solid phase.

The system further includes a process gas heater, in some embodiments, disposed in operable communication with the at least one gas outlet to remove condensable vapors and non-condensable gases. The process gas heater can be configured to introduce a separate fuel and an oxidant into a combustion chamber, adapted for combustion of the fuel and at least a portion of the condensable vapors.

The system may include a heat exchanger disposed between the process gas heater and the dryer, configured to utilize at least some of the heat of the combustion for the dryer. The system may include a heat exchanger disposed between the process gas heater and a gas inlet for the BPU, configured to utilize at least some of the heat of the combustion for preheating a substantially inert gas prior to introduction into the pyrolysis reactor. Certain variations provide a biomass-pyrolysis continuous reactor comprising a feedstock inlet, a plurality of spatially separated reactors configured for separately controlling the temperature and mixing within each of the reactors, and a carbonaceous-solids outlet, wherein one of the reactors is configured with a first gas inlet for introducing a substantially inert gas into the reactor, and wherein one of the reactors is configured with a first gas outlet.

In some embodiments, the BPU includes at least two, three, or four zones.

Each of the zones may be disposed in communication with separately adjustable indirect heating means, each independently selected from the group consisting of electrical heat transfer, steam heat transfer, hot-oil heat transfer, waste-heat transfer, and combinations thereof.

The BPU may be configured for separately adjusting gas-phase composition and gas-phase residence time of at least two zones. In some embodiments, the BPU is configured for separately adjusting gas-phase composition and gas-phase residence time of all zones present in the BPU In some embodiments, the BPU is configured with a second gas inlet a second gas outlet. In certain embodiments, the BPU is configured with a gas inlet in zone and/or a gas outlet in each zone. In some embodiments, the BPU is a countercurrent reactor.

The material feed system may comprise a feed mechanism selected from the group consisting of a screw, an auger, a drop chamber, and a drum material feed system. The carbonaceous-solids outlet may comprise an output mechanism selected from the group consisting of a screw, an auger, a drop chamber, and a drum material feed system. The BPU may include a single auger disposed throughout each of the zones.

In some embodiments, each of the reactors is configured with flights disposed on internal walls, to provide agitation of solids. The flights may be separately adjustable in each of the zones. The BPU is an axially rotatable BPU, in some embodiments. Still other variations of the invention provide a process for producing a high-carbon biogenic reagent, the process comprising:

(a) providing a carbon-containing feedstock comprising biomass;

(b) optionally drying the feedstock to remove at least a portion of moisture contained within the feedstock;

(c) optionally deaerating the feedstock to remove at least a portion of interstitial oxygen, if any, contained with the feedstock;

(d) in a pyrolysis zone, pyrolyzing the feedstock in the presence of a substantially inert gas for at least about 10 minutes and with a pyrolysis temperature selected from about 250° C. to about 700° C., to generate hot pyrolyzed solids, condensable vapors, and non-condensable gases;

(e) separating at least a portion of the condensable vapors and at least a portion of the non-condensable gases from the hot pyrolyzed solids;

(f) in a cooling zone, cooling the hot pyrolyzed solids, in the presence of the substantially inert gas for at least about 5 minutes and with a cooling temperature less than the pyrolysis temperature, to generate warm pyrolyzed solids;

(g) optionally cooling the warm pyrolyzed solids in a separate cooler to generate cool pyrolyzed solids;

(h) subsequently passing at least a portion of the condensable vapors and/or at a portion of the non-condensable gases from step (e) across the warm pyrolyzed solids and/or the cool pyrolyzed solids, to form enriched pyrolyzed solids with increased carbon content; and (i) recovering a high-carbon biogenic reagent comprising at least a portion of the enriched pyrolyzed solids.

In some embodiments, step (h) includes passing at least a portion of the condensable vapors from step (e), in vapor and/or condensed form, across the warm pyrolyzed solids, to produce enriched pyrolyzed solids with increased carbon and/or energy content. In these or other embodiments, step (h) includes passing at least a portion of the non-condensable gases from step (e) across the warm pyrolyzed solids, to produce enriched pyrolyzed solids with increased carbon and/or energy content.

In some embodiments, step (h) includes passing at least a portion of the condensable vapors from step (e), in vapor and/or condensed form, across the cool pyrolyzed solids, to produce enriched pyrolyzed solids with increased carbon and/or energy content. In these or other embodiments, step (h) includes passing at least a portion of the non-condensable gases from step (e) across the cool pyrolyzed solids, to produce enriched pyrolyzed solids with increased carbon and/or energy content.

In certain embodiments, step (h) includes passing substantially all of the condensable vapors from step (e), in vapor and/or condensed form, across the cool pyrolyzed solids, to produce enriched pyrolyzed solids with increased carbon and/or energy content In these or other embodiments, step (h) includes passing substantially all of the non-condensable gases from step (e) across the cool pyrolyzed solids, to produce enriched pyrolyzed solids with increased carbon content.

Energy may be recovered from the condensable vapors, the non-condensable gases, or both, for use in the process. Energy may be recovered through heat exchange with these streams Optionally, either or both of the condensable vapors and non-condensable gases may be combusted, and the heat of combustion may be recovered for process use.

The process may further include introducing an intermediate feed stream consisting of at least a portion of the condensable vapors and at least a portion of the non-non-condensable gases, obtained from step (e), to a separation unit configured to generate at least first and second output streams The intermediate feed stream may include of the condensable vapors and/or all of the non-condensable gases, in certain embodiments. A portion of the second output stream may be recycled to step (d) for use substantially inert gas in the pyrolysis unit, alone or in combination with another source inert gas (e.g., $N_2$).

The first and second output streams may be separated based on relative volatility, for example. In some embodiments, the first output stream comprises the condensable vapors (e.g., terpenes, alcohols, acids, aldehydes, or ketones), and the second output stream comprises the non-condensable gases (e.g., carbon monoxide, carbon dioxide, and methane).

The first and second output streams may be separated based on relative polarity. In these embodiments, the first output stream comprises polar compounds (e.g., methanol, furfural, and acetic acid), and the second output stream comprises non-polar compounds (e.g., carbon monoxide, carbon dioxide, methane, terpenes, and terpene derivatives).

In some embodiments, step (h) increases the total carbon content, fixed carbon content, and/or energy content of the high-carbon biogenic reagent, relative to an otherwise-identical process without step (h). In some embodiments, step (h) increases the fixed carbon content of the high-carbon biogenic reagent, relative to an otherwise-identical process without step (h).

This invention also provides a continuous or batch process for increasing carbon and/or energy content of any carbon-containing material. In some variations, a process for producing a high-carbon biogenic reagent comprises:

(a) providing a solid stream comprising a starting carbon-containing material;

(b) providing a gas stream comprising condensable carbon-containing vapors, non-condensable carbon-containing gases, or a mixture of condensable carbon-containing vapors and non-condensable carbon-containing gases; and (c) passing the gas stream across the solid stream under suitable conditions to form a carbon-containing product with increased carbon and/or energy content relative to the carbon-containing material.

In some embodiments, the starting carbon-containing material is biomass or torrefied biomass The gas stream may be obtained during an integrated process that provides the carbon-containing material. Or, the gas stream may be obtained from separate processing of the carbon-containing material. The gas stream, or a portion thereof, may be obtained from an external source. Mixtures of gas streams, as well as mixtures of carbon-containing materials, from a variety of sources, are possible.

In some embodiments, the process further comprises recycling or reusing the gas stream for repeating the process to further increase carbon and/or energy content of the carbon-containing product. In some embodiments, the process further comprises recycling or reusing the gas stream for carrying out the process to increase carbon and/or energy content of another feedstock different from the carbon-containing material.

This process may include introducing the gas stream to a separation unit configured to generate at least first and second output streams, wherein the gas stream comprises a mixture of condensable carbon-containing vapors and non-condensable carbon-containing gases. The first and second output streams may be separated based on relative volatility or relative polarity, for example.

In some embodiments, the carbon-containing product has higher total carbon content and/or fixed carbon content and/or volatile carbon content than the carbon-containing material. In some embodiments, the carbon-containing product has higher energy content than the carbon-containing material.

A high-carbon biogenic reagent production system is also provided, the system comprising:

(a) a material feed system configured to introduce a carbon-containing feedstock;

(b) an optional dryer, disposed in operable communication with the material feed system, configured to remove moisture contained within a carbon-containing feedstock, (c) a BPU, disposed in operable communication with the material feed system or the dryer (if present), wherein the BPU contains at least one pyrolysis zone disposed in operable communication with a spatially separated cooling zone, and wherein the BPU is configured with an outlet to remove condensable vapors and non-condensable gases from solids;

(d) an optional cooler, disposed in operable communication with the BPU, (e) a material-enrichment unit, disposed in operable communication with the or the cooler (if present), configured to pass the condensable vapors and/or the non-non-condensable gases across the solids, to form enriched solids with increased carbon content; and (1) a carbon recovery unit, disposed in operable communication with the material-enrichment unit.

In some embodiments, the system further comprises a preheating zone, disposed in operable communication with the pyrolysis zone. Each of the pyrolysis zone, the cooling zone, and the preheating zone (if present) may be located within a single unit, or in separate units. The dryer, if present, may be configured as a drying zone within the BPU.

The cooling zone may be configured with a gas inlet, and the pyrolysis zone may be configured with a gas outlet, to generate substantially countercurrent flow of the gas phase relative to the solid phase. The cooling zone may be configured with a gas inlet, and the preheating zone and/or drying zone may be configured with a gas outlet, to generate substantially countercurrent flow of the gas phase relative to the solid phase.

In certain embodiments, the material-enrichment unit comprises:

(i) a housing with an upper portion and a lower portion;

(ii) an inlet at a bottom of the lower portion of the housing configured to carry the condensable vapors and non-condensable gases;

(iii) an outlet at a top of the upper portion of the housing configured to carry a concentrated gas stream derived from the condensable vapor and non-condensable gases; (iv) a path defined between the upper portion and the lower portion of the housing; and (v) a transport system following the path, the transport system configured to transport the solids, wherein the housing is shaped such that the solids adsorb at least some of the condensable vapors and/or at least some of the non-condensable gases This invention also provides various products and compositions In some variations, a high-carbon biogenic reagent is produced by a process comprising the steps of:

(a) providing a carbon-containing feedstock comprising biomass;

(b) optionally drying the feedstock to remove at least a portion of moisture contained within the feedstock;

(c) optionally deaerating the feedstock to remove at least a portion of interstitial oxygen, if any, contained with the feedstock;

(d) in a pyrolysis zone, pyrolyzing the feedstock in the presence of a substantially inert gas for at least about 10 minutes and with a pyrolysis temperature selected from about 250° C. to about 700° C., to generate hot pyrolyzed solids, condensable vapors, and non-condensable gases;

(e) separating at least a portion of the condensable vapors and at least a portion of the non-condensable gases from the hot pyrolyzed solids;

(f) in a cooling zone, cooling the hot pyrolyzed solids, in the presence of the substantially inert gas for at least about 5 minutes and with a cooling-zone temperature less than the pyrolysis temperature, to generate warm pyrolyzed solids;

(g) in an optional cooler that is separate from the cooling zone, cooling the warm pyrolyzed solids to generate cool pyrolyzed solids; and (h) recovering a high-carbon biogenic reagent comprising at least a portion of the warm or cool pyrolyzed solids.

The high-carbon biogenic reagent may further comprise at least one process additive incorporated during the process. Alternatively, or additionally, the high-carbon biogenic reagent may further include at least one product additive introduced to the reagent following the process.

In some embodiments, the process additive and/or the product additive is selected to increase the carbon content and/or the energy content of the high-carbon biogenic reagent. In some embodiments, the process additive and/or the product additive is selected to maintain the structural integrity or mechanical strength of the high-carbon biogenic reagent relative to said feedstock. Additives may be useful to help maintain structural form prior to use of the biogenic reagent.

In some embodiments, the high-carbon biogenic reagent comprises at least 55 wt. %, at least 60 wt. %, at least 65 wt. %, at least 70 wt %, at least 80 wt %, at least 90 wt %, or at least 95 wt % total carbon on a dry basis. The total carbon includes fixed carbon and carbon from volatile matter. In some embodiments, the carbon from volatile matter is at least 5%, at least 20%, or at least 40% of the total carbon.

In some embodiments, the high-carbon biogenic reagent comprises about 10 wt % or less hydrogen, such as about 5 wt % or less hydrogen on a dry basis. In some embodiments, the reagent comprises about 20 wt % or less oxygen, such as between about 1 wt % and about 10 wt % oxygen on a dry basis. In some embodiments, the high-carbon biogenic reagent comprises about 1 wt % or less nitrogen, such as about 0.5 wt % or less nitrogen on a dry basis. In some embodiments, the reagent comprising about 0.5 wt % or less phosphorus, such as about 0.2 wt % or less phosphorus on a dry basis. In some embodiments, the high-carbon biogenic reagent comprising about 0.2 wt % or less sulfur, such as about 0.1 wt % or less sulfur on a dry basis.

In some embodiments, the high-carbon biogenic reagent comprises about 10 wt % or less non-combustible matter (e.g., ash) on a dry basis. In certain embodiments, the high-carbon biogenic reagent comprises about 5 wt % or less, or about 1 wt % or less, non-combustible matter on a dry basis. The high-carbon biogenic reagent may further contain moisture at varying levels.

The high-carbon biogenic reagent may have an energy content of at least 11,000 Btu/lb, at least 12,000 Btu/lb, at least 13,000 Btu/lb, at least 14,000 Btu/lb, or at least 14,500 Btu/lb on a dry basis. In exemplary embodiments, the high-carbon biogenic reagent has an energy content of at least 14,700 Btu/lb and a fixed carbon content of at least 95 wt % on a dry basis.

In some embodiments, a high-carbon biogenic reagent comprises, on a dry basis:

55 wt % or more total carbon;
5 wt % or less hydrogen;
1 wt % or less nitrogen;
0.5 wt % or less phosphorus;
0.2 wt % or less sulfur; and
an additive selected from a metal, a metal oxide, a metal hydroxide, a metal halide, or a combination thereof.

The additive may be selected from the group consisting of magnesium, manganese, aluminum, nickel, chromium, silicon, boron, cerium, molybdenum, phosphorus, tungsten, vanadium, iron halide, iron chloride, iron bromide, magnesium oxide, dolomite, dolomitic lime, fluorite, fluorospar, bentonite, calcium oxide, lime, and combinations thereof.

In some embodiments, a high-carbon biogenic reagent comprises, on a dry basis:

55 wt % or more total carbon;
5 wt % or less hydrogen;
1 wt % or less nitrogen;
0.5 wt % or less phosphorus;
0.2 wt % or less sulfur, and
an additive selected from an acid, a base, or a salt thereof.

The additive may be selected from the group consisting of sodium hydroxide, potassium hydroxide, magnesium oxide, hydrogen bromide, hydrogen chloride, sodium silicate, potassium permanganate, and combinations thereof.

In certain embodiments, a high-carbon biogenic reagent comprises, on a dry basis:

55 wt % or more total carbon;
5 wt % or less hydrogen;
1 wt % or less nitrogen;
0.5 wt % or less phosphorus;
0.2 wt % or less sulfur,
a first additive selected from a metal, a metal oxide, a metal hydroxide, a metal halide, or a combination thereof; and a second additive selected from an acid, a base, or a salt thereof, wherein the first additive is different from the second additive.

The first additive may be selected from the group consisting of magnesium, manganese, aluminum, nickel, chromium, silicon, boron, cerium, molybdenum, phosphorus, tungsten, vanadium, iron halide, iron chloride, iron bromide, magnesium oxide, dolomite, dolomitic lime, fluorite, fluorospar, bentonite, calcium oxide, lime, and combinations thereof, and the second additive may be independently selected from the group consisting of sodium hydroxide, potassium hydroxide, magnesium oxide, hydrogen bromide, hydrogen chloride, sodium silicate, potassium permanganate, and combinations thereof.

The high-carbon biogenic reagent may comprise about 55 wt. %, 60 wt. %, 65 wt. %, 70 wt %, 75 wt %, 80 wt %, 85 wt %, 90 wt %, 95 wt %, or more total carbon on a dry basis (total carbon includes fixed carbon and carbon associated with volatile matter).

In some embodiments, the reagent comprises about 8 wt % or less non-combustible matter on a dry basis, such as about 4 wt % or less non-combustible matter on a dry basis.

A high-carbon biogenic reagent may consisting essentially of, on a dry basis, carbon, hydrogen, oxygen, nitrogen, phosphorus, sulfur, non-combustible matter, and an additive selected from the group consisting of magnesium, manganese, aluminum, nickel, chromium, silicon, boron, cerium, molybdenum, phosphorus, tungsten, vanadium, iron halide, iron chloride, iron bromide, magnesium oxide, dolomite, dolomitic lime, fluorite, fluorospar, bentonite, calcium oxide, lime, and combinations thereof. Moisture may be present or absent.

A high-carbon biogenic reagent may consisting essentially of, on a dry basis, carbon, hydrogen, nitrogen, phosphorus, sulfur, non-combustible matter, and an additive selected from the group consisting of sodium hydroxide, potassium hydroxide, magnesium oxide, hydrogen bromide, hydrogen chloride, sodium silicate, potassium permanganate, and combinations thereof. Moisture may be present or absent.

The high-carbon biogenic reagent may have an energy content of at least 11,000 Btu/lb, at least 12,000 Btu/lb, at least 13,000 Btu/lb, at least 14,000 Btu/lb, or at least 14,500 Btu/lb on a dry basis.

The high-carbon biogenic reagent may be a fine powder, or may be in the form of structural objects. Structural objects may be derived from pressing, binding pelletizing, or agglomerating particles. In some embodiments, the structural objects have a structure and/or strength that substantially derive from the feedstock source of the carbon. In certain embodiments, the structural objects have substantially the same structural form as the feedstock source of the carbon.

In some embodiments of the high-carbon biogenic reagent, the majority of the carbon is classified as renewable carbon Substantially all of the carbon contained within certain high-carbon biogenic reagents may be classified as renewable carbon The present invention also provides a wide variety of carbonaceous products comprising high-carbon biogenic reagents. Such carbonaceous products include, but are not limited to, blast furnace addition products, taconite pellet process addition products, taconite pellets, coal replacement products, coking carbon products, carbon breeze products, fluidized-bed products, furnace addition products, injectable carbon products, ladle addition carbon products, met coke products, pulverized carbon products, stoker carbon products, carbon electrodes, and activated carbon products. These and other embodiments are described in further detail below.

BRIEF DESCRIPTION OF THE FIGURES

FIG. 6 depicts an embodiment of one embodiment of a single-reactor biomass processing unit of the present invention with an optional dryer.

FIG. 7 depicts a pyrolysis reactor system embodiment of the invention with an optional dryer and a gas inlet.

DETAILED DESCRIPTION OF EMBODIMENTS OF THE INVENTION

Figure 1:
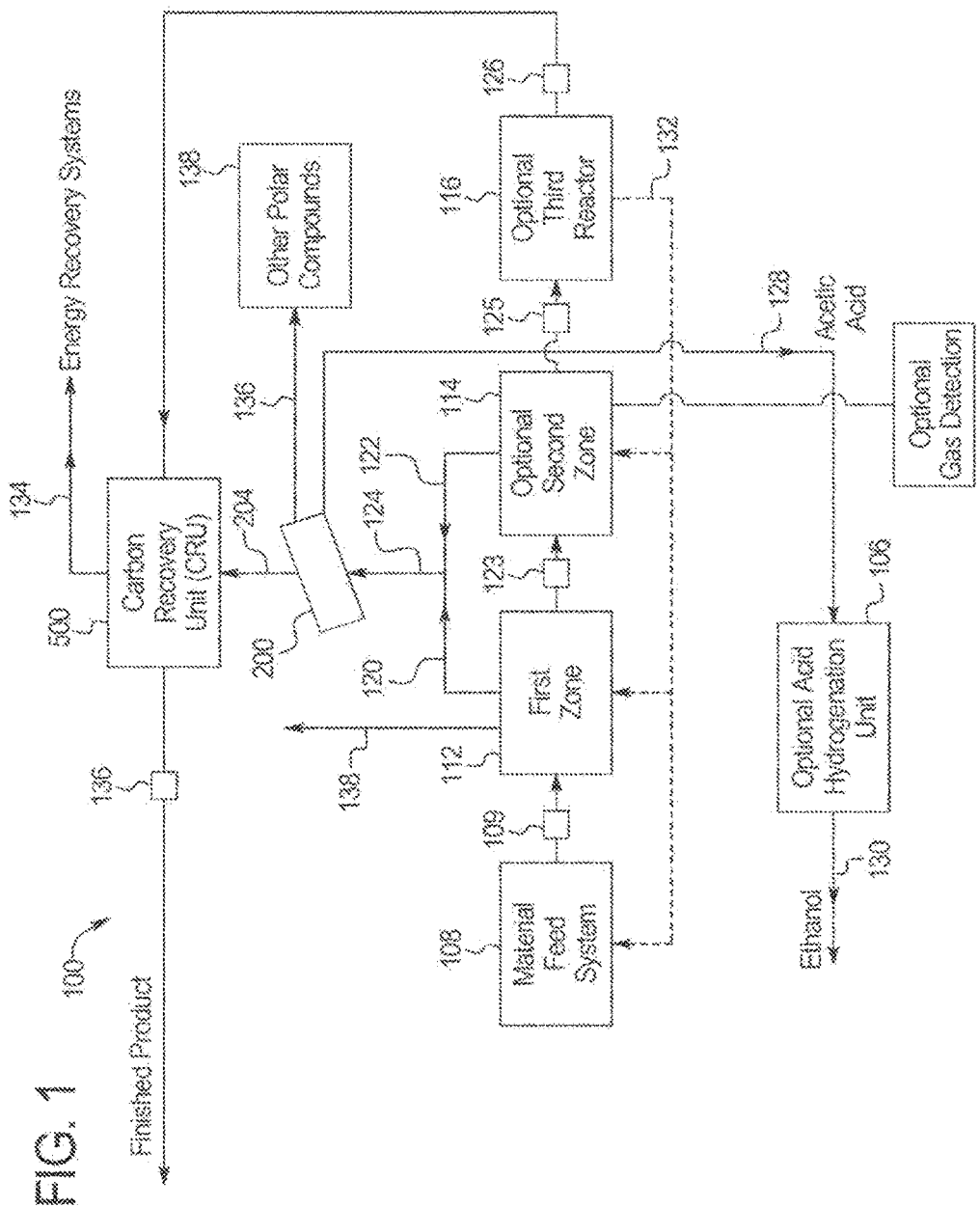
FIG. 1 depicts a multi-reactor embodiment of a system of the invention.

This description will enable one skilled in the art to make and use the invention, and it describes several embodiments, adaptations, variations, alternatives, and uses of the invention. These and other embodiments, features, and advantages of the present invention will become more apparent to those skilled in the art when taken with reference to the following detailed description of the invention in conjunction with the accompanying drawings.

As used in this specification and the appended claims, the singular forms "a," "an," and "the" include plural referents unless the context clearly indicates otherwise. Unless defined otherwise, all technical and scientific terms used herein have the same meaning as is commonly understood by one of ordinary skill in the art to which this invention belongs.

Unless otherwise indicated, all numbers expressing reaction conditions, stoichiometries, concentrations of components, and so forth used in the specification and claims are to be understood as being modified in all instances by the term "about." Accordingly, unless indicated to the contrary, the numerical parameters set forth in the following specification and attached claims are approximations that may vary depending least upon a specific analytical technique.

The term "comprising," which is synonymous with "including," "containing," or "characterized by" is inclusive or open-ended and does not exclude additional, unrecited elements or method steps. "Comprising" is a term of art used in claim language which means that the named claim elements are essential, but other claim elements may be added and still form a construct within the scope of the claim.

As used herein, the phase "consisting of excludes any element, step, or ingredient not specified in the claim. When the phrase "consists of (or variations thereof) appears in a clause of the body of a claim, rather than immediately following the preamble, it limits only the element set forth in that clause; other elements are not excluded from the claim as a whole. As used herein, the phase "consisting essentially of limits the scope of a claim to the specified elements or method steps, plus those that do not materially affect the basis and novel characteristic(s) of the claimed subject matter.

With respect to the terms "comprising." "consisting of," and "consisting essentially of," where one of these three terms is used herein, the presently disclosed and claimed subject matter may include the use of either of the other two terms. Thus in some embodiments not otherwise explicitly recited, any instance of "comprising" may be replaced by "consisting of" or, alternatively, by "consisting essentially of."

For present purposes, "biogenic" is intended to mean a material (whether a feedstock, product, or intermediate) that contains an element, such as carbon, that is renewable on time scales of months, years, or decades. Non-biogenic materials may be non-renewable, or may be renewable on time scales of centuries, thousands of years, millions of years, or even longer geologic time scales. Note that a biogenic material may include a mixture of biogenic and non-biogenic sources.

For present purposes, "reagent" is intended to mean a material in its broadest sense; a reagent may be a fuel, a chemical, a material, a compound, an additive, blend component, a solvent, and so on. A reagent is not necessarily a chemical reagent causes or participates in a chemical reaction. A reagent may or may not be a chemical reactant; it may or may not be consumed in a reaction. A reagent may be a chemical catalyst for a particular reaction. A reagent may cause or participate in adjusting a mechanical, physical, or hydrodynamic property of a material to which the reagent may added. For example, a reagent may be introduced to a metal to impart certain strength properties to the metal. A reagent may be a substance of sufficient purity (which, in the current context, is typically carbon purity) for use in chemical analysis or physical testing.

By "high-carbon" as used in this application to describe biogenic reagents, it is meant simply that the biogenic reagent has a relatively high carbon content as compared to the initial feedstock utilized to produce the high-carbon biogenic reagent. Typically, a high-carbon biogenic reagent will contain at least about half its weight as carbon. More typically, a high-carbon biogenic reagent will contain at least 55 wt %, 60 wt %, 65 wt %, 70 wt %, 80 wt %, 90 wt % or higher carbon.

Notwithstanding the foregoing, the term "high-carbon biogenic reagent" is used herein for practical purposes to consistently describe materials that may be produced by processes and systems of the invention, in various embodiments. Limitations as to carbon content, or any other concentrations, shall not be imputed from the term itself but rather only by reference to particular embodiments and equivalents thereof. For example it will be appreciated that a starting material having very low carbon content, subjected to the disclosed processes, may produce a high-carbon biogenic reagent that is highly enriched in carbon relative to the starting material (high yield of carbon), but nevertheless relatively low in carbon (low purity of carbon), including less than 50 wt % carbon.

"Pyrolysis" and "pyrolyze" generally refer to thermal decomposition of a carbonaceous material. In pyrolysis, less oxygen is present than is required for complete combustion of the material, such as less than 10%, 5%, 1%, 0.5%, 0.1%, or 0.01% of the oxygen that is required for complete combustion. In some embodiments, pyrolysis is performed in the absence of oxygen.

Exemplary changes that may occur during pyrolysis include any of the following: (i) heat transfer from a heat source increases the temperature inside the feedstock; (ii) the initiation of primary pyrolysis reactions at this higher temperature releases volatiles and forms a char; (iii) the flow of hot volatiles toward cooler solids results in heat transfer between hot volatiles and cooler unpyrolyzed feedstock; (iv) condensation of some of the volatiles in the cooler parts of the feedstock, followed by secondary reactions, can produce tar; (v) autocatalytic secondary pyrolysis reactions proceed while primary pyrolytic reactions simultaneously occur in competition; and (vi) further thermal decomposition, reforming, water-gas shift reactions, free-radical recombination, and/or dehydrations can also occur, which are a function of the residence time, temperature, and pressure profile.

Pyrolysis can at least partially dehydrate the feedstock. In various embodiments, pyrolysis removes greater than about 50%, 75%, 90%, 95%, 99%, or more of the water from the feedstock.

As discussed above, some variations of the invention are premised, at least in part, on the discovery that multiple reactors or multiple zones within a single reactor can be designed and operated in a way that optimizes carbon yield and product quality from pyrolysis, while maintaining flexibility and adjustability for feedstock variations and product requirements.

Generally speaking, the temperatures and residence times are selected to achieve relatively slow pyrolysis chemistry. The benefit is potentially the substantial preservation of cell walls contained in the biomass structure, which means the final product can retain some, most, or all of the shape and strength of the starting biomass. In order to maximize this potential benefit, an apparatus that does not mechanically destroy the cell walls or otherwise convert the biomass particles into small fines can be utilized Various reactor configurations are discussed following the process description below Additionally, if the feedstock is a milled or sized feedstock, such as wood chips or pellets, it may be desirable for the feedstock to be carefully milled or sized. Careful initial treatment will tend to preserve the strength and cell-wall integrity that is present in the native feedstock source (e.g., trees). This can also be important when the final product should retain some, most, or all of the shape and strength of the starting biomass In various embodiments, measures are taken to preserve the vascular structure of woody feedstock to create greater strength in biogenic reagents. For example and without limitation, in various embodiments the feedstock is prepared by drying feedstock over an extended period of time, for example over a period of time of no less 1 hour, no less than 2 hours, no less than 3 hours, no less than 4 hours, no less than 5 no less than 6 hours, no less than 7 hours, no less than 8 hours, no less than 9 hours, no than 10 hours, no less than 11 hours, no less than 12 hours, no less than 13 hours, no less than 14 hours, no less than 15 hours, no less than 16 hours, no less than 17 hours, no less than 18 hours, no less than 19 hours, no less than 20 hours, no less than 21 hours, no less than 22 hours, no less than 23 hours, or no less than 24 hours, to allow water and gases to exit the biomass without destroying the vascular structure of the feedstock. In various embodiments, use of a slow progressive heat rate during pyrolysis (for example in to flash pyrolysis) over minutes or hours is used to allow water and gases to exit the biomass without destroying the vascular structure of the feedstock. For example and without limitation, a rate of temperature increase during the pyrolysis step may range about 1° C. per minute to about 40° C. per minute, for example about 1° C. per minute, about 2° C. per minute, about 4° C. per minute, about 5° C. per minute, about 10° C. per minute, about 15° C. per minute, about 20° C. per minute, about 25° C. per minute, about 30° C. per minute, about 35° C. per minute, or about 40° C. per minute. In some embodiments, the temperature increase occurs in a pre-heat zone to produce a preheated feedstock. In some embodiments, the temperature increase occurs predominantly or entirely in a pre-heat zone to produce a preheated feedstock. In some embodiments, the temperature of a preheated feedstock is increased in a pre-pyrolysis zone. In some embodiments, the temperature increase occurs at least in part in a carbonization zone or a pyrolysis zone. In some embodiments, the temperature increase occurs predominantly or entirely in a carbonization zone or a pyrolysis zone. In some embodiments, a preheat pre-pyrolysis zone, carbonization zone or pyrolysis zone is configured to increase the temperature during pyrolysis from an initial, low temperature to a final, higher over time. In some embodiments, the temperature increase is linear or substantially over time. In some embodiments, the rate of temperature increase increases or decreases over time such that the temperature during preheating, pre-pyrolysis and/or carbonization or pyrolysis is at least partially nonlinear, for example logarithmic or substantially logarithmic for at least a portion of the preheat, pre-pyrolysis and/or carbonization or pyrolysis step. In various embodiments, an additive is used prior to drying or pyrolysis to reduce gas formation that could damage the vascular structure of the feedstock during pyrolysis In various embodiments, prior to pyrolysis, dried feedstock is sized using a or other cutting device designed to be less destructive to the vascular structure of wood than other sizing approaches such as chipping or shearing wet wood that fractures wood and decreases its strength. In such embodiments, a biogenic reagent has a greater index (e.g., CSR value) than a comparable biogenic reagent not prepared in such a manner.

In various embodiments, the feedstock is prepared by milling biomass to form a plurality of biomass pieces that are substantially uniform size and substantially uniform shape. For example and without limitation, biomass can be processed to produce sawdust of approximately uniform grain size (e.g., mesh size). Alternatively, biomass can be processed to produce chips having substantially uniform dimensions (e.g., approximately 1 inch by approximately K-inch by approximately ⅛-inch pieces). In other embodiments, feedstock can be prepared by milling biomass to form lengths of material with substantially uniform width and depth dimensions or diameters (e.g., wood bars, boards or dowels). In related embodiments, the lengths of material having substantially uniform width and depth or diameter can be further milled to produce feedstock pieces of substantially uniform lengths, resulting in a feedstock material having substantially uniform size and shape. For example, wood dowels having a uniform diameter (e.g., about 1⅛ inches) can be cut into pieces of substantially uniform length (e.g., about 1.5 inches). The resulting feedstock pieces have a substantially uniform shape (cylinders) and a substantially uniform size (about 1⅛ inch diameter by about 1.5 inch lengths). In some embodiments, a biogenic reagent prepared from a feedstock consisting of pieces of substantially uniform shape and size is produced in greater mass yield than a comparable biogenic reagent prepared from feedstock pieces of substantially non-uniform shape and/or size.

Referring now generally to FIGS. 1 to 13, block flow diagrams of a exemplary multi reactor embodiments of the present disclosure are illustrated. Each is discussed in turn below. It should be appreciated FIGS. 1 to 13 represent some embodiments but not all contemplated embodiments of the present disclosure. As discussed below, various additional non-illustrated embodiments and combinations of the several components and features discussed herein are also contemplated. As will be understood in the discussion below, any of the plurality of reactors discussed herein can independent reactors, or alternatively within a single reactor BPU can include a plurality zones, or a combination thereof. It should be appreciated that, although the figures each illustrate a different alternative embodiment, all other discussion in this disclosure can apply to each of the illustrated and non-illustrated embodiments.

Referring now generally to FIG. 1, a block flow diagram of a multi reactor embodiment of the present disclosure is illustrated. This embodiment can utilize two to a plurality of different reactors. Three reactors are shown in the illustrative embodiment, however, any different number of reactors could be employed. In one embodiment, each reactor is connected to at least one other reactor via a material transport unit 304 (shown in FIG. 3). In one embodiment, the material transport unit 304 controls atmosphere and temperature conditions.

Figure 3:
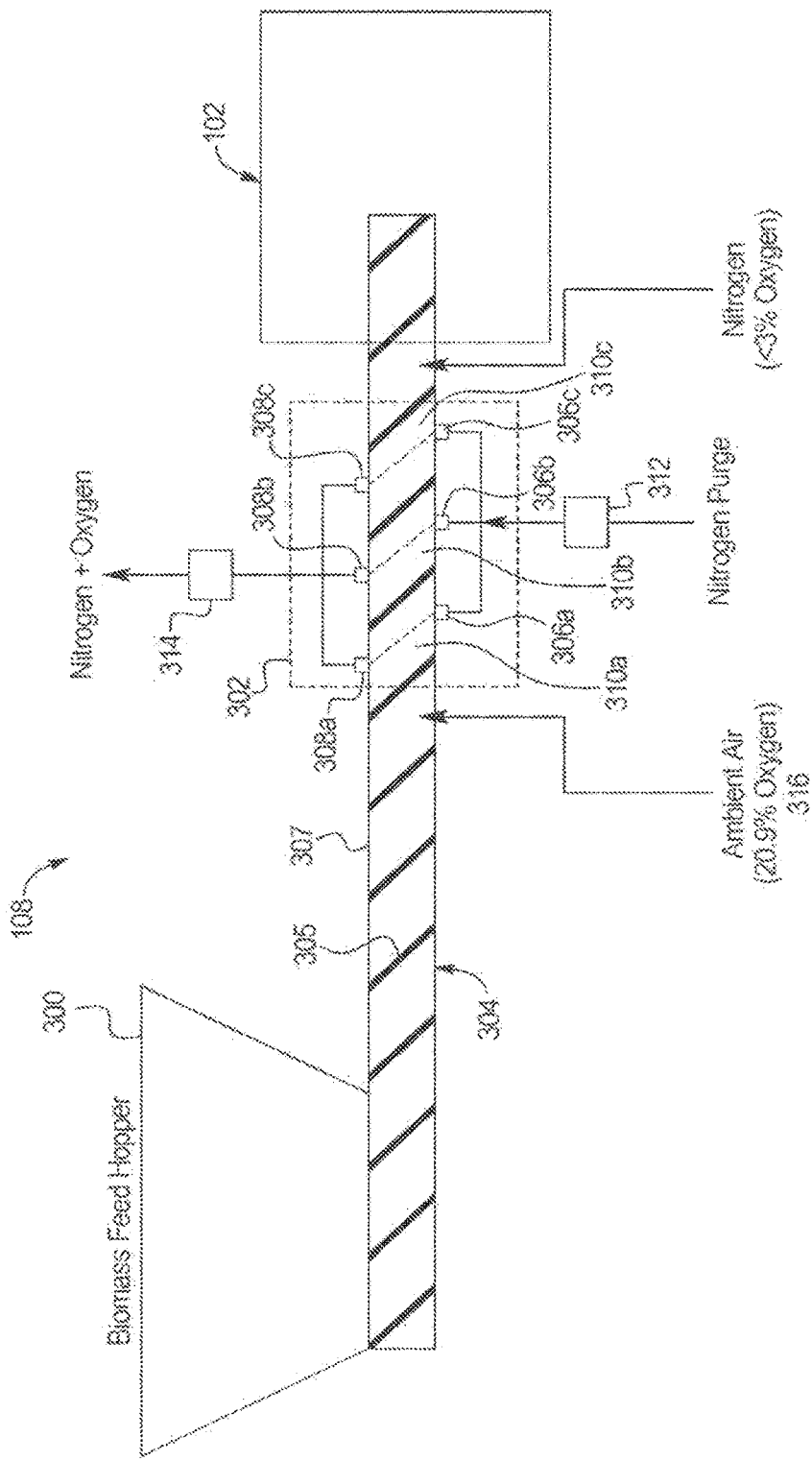
FIG. 3 depicts one embodiment of a zero-oxygen continuous feed mechanism suitable for use in connection with the present invention.

In the illustrated embodiment, the raw material 109, such as biomass, is optionally dried and sized outside the system and introduced into the first reactor 100 in a low-oxygen atmosphere, optionally through the use of a material feed system 108. As discussed in further detail below and as illustrated in FIG. 3, the material feed system 108 reduces the oxygen level in the ambient air in the system to not more than about 3%. The raw material 109 enters the first reactor 112 via the enclosed material transport unit 304 after the oxygen levels have been decreased in the first reactor. In one embodiment, the raw material transport unit will include an encapsulated jacket or sleeve through which steam and off-gases from the reactor are sent and used to pre-heat the biomass either directly or sent to a process gas heater and or heat exchanger and then sent and used to pre-heat or pyrolize the biomass.

In the illustrated embodiment, the raw material 109 first travels from the material feed system 108 on the material transport unit 304 into the first reactor of the BPU 112.

As discussed in more detail below, in one embodiment, the first reactor 112 is configured to be connected to any other reactor in the system to recover waste heat 132 and conserve energy through a suitable waste heat recovery system. In one embodiment, the waste heat given off in the first reactor 112 is used to operate a steaming bin or another appropriate heating mechanism configured to dry raw materials 109 inside or outside of the system. In various embodiments, other byproducts of the waste heat, such as a substantially heated inert gas or the like, can be used elsewhere in the system to further enrich the material at any point along the process.

In the illustrated embodiment, the biomass 109 enters the first reactor 112, wherein the temperature is raised from the range of about ambient temperature to about 150° C. to a temperature of about 100° C. to about 200° C. In one embodiment, the temperature does not exceed 200° C. in the first reactor 112. As discussed in greater detail below, the first reactor 112 can include an output mechanism to capture and exhaust off-gases 120 from the biomass 123 while it is being heated. In one embodiment, the off-gases 120 are extracted for optional later use. In various embodiments, the heating source used for the various zones in the BPU 102 is electrical or gas. In one embodiment, the heating source used for the various reactors of the BPU 102 is waste gas from other reactors of the unit 102 or from external sources. In various embodiments, the heat is indirect.

Following preheating in the first reactor 112, the material transport unit 304 passes the preheated material 123 into the optional second reactor 114. In one embodiment reactor 114 is the same as reactor 112. In one embodiment where reactor 114 is different than reactor 112, the material transport unit 304 penetrates the second reactor 114 through a high-temperature vapor seal system (e.g. an airlock), which allows the material transport unit 304 to penetrate the second reactor while preventing gas from escaping. In one embodiment, the interior of the second reactor 114 is heated to a temperature of about 100° C. to about 600° C. or about 200° C. to about 600° C. In another embodiment, the second reactor 114 includes an output port similar to the first reactor 102 to capture and exhaust the gases 122 given off of the preheated material 123 while it is being carbonized. In one embodiment, the gases 122 are extracted for optional later use. In one illustrative embodiment, the off-gases 120 from the first reactor 112 and the off-gases 122 from the second reactor 114 are combined into one gas stream 124. Once carbonized, the carbonized biomass 125 exits the second reactor 114 and enters the third reactor 116 for cooling. Again, the third reactor can be the same reactor as 112 or 114 or different.

In one embodiment, when the biogenic reagent 125 enters the third reactor 116, the carbonized biomass 125 is allowed to cool (actively or passively) to a specified temperature range to form carbonized biomass 126, as discussed above. In one embodiment, temperature of the carbonized biomass 125 is reduced in the third reactor under substantially inert atmospheric conditions In another embodiment, the third cools the carbonized biomass 125 with an additional water cooling mechanism. It should be appreciated that the carbonized biomass 126 is allowed to cool in the third reactor 116 the point where it will not spontaneously combust if exposed to oxygenated air. In one such embodiment, the third reactor 116 reduces temperature of the carbonized biomass to below 200° C. In one embodiment, the third reactor includes a mixer (not shown) to and uniformly cool the carbonized biomass. It should be appreciated that cooling may occur either directly or indirectly with water or other liquids; cooling may also occur directly or indirectly with air or other cooled gases, or any combination of the above.

It should be appreciated that in several embodiments (not shown) one or more additional coolers or cooling mechanisms are employed to further reduce the temperature of the carbonized biomass. In various such embodiments, the cooler is separate from the other reactors 112, 114, 116, along the material transport system. In some embodiments, the cooler follows the reactors. In some embodiments, the cooler can be the same as the reactors 112, 114, 116. In other embodiments, the cooler is, for example, a screw, auger, conveyor (specifically a belt conveyor in one embodiment), drum, screen, pan, counterflow bed, vertical tower, jacketed paddle, cooled screw or combination thereof that cools either directly or indirectly with water or other liquids, or directly or indirectly with other gases, or combination of the above. In various embodiments, coolers could include water spray, coded inert gas streams, liquid nitrogen, or ambient air if below ignition temperature. It should be appreciated that heat can be recovered from this step by capturing the flash steam generated by the water spray, or the superheated steam generated when saturated steam is introduced and heated by the carbonized biomass.

Figure 5:
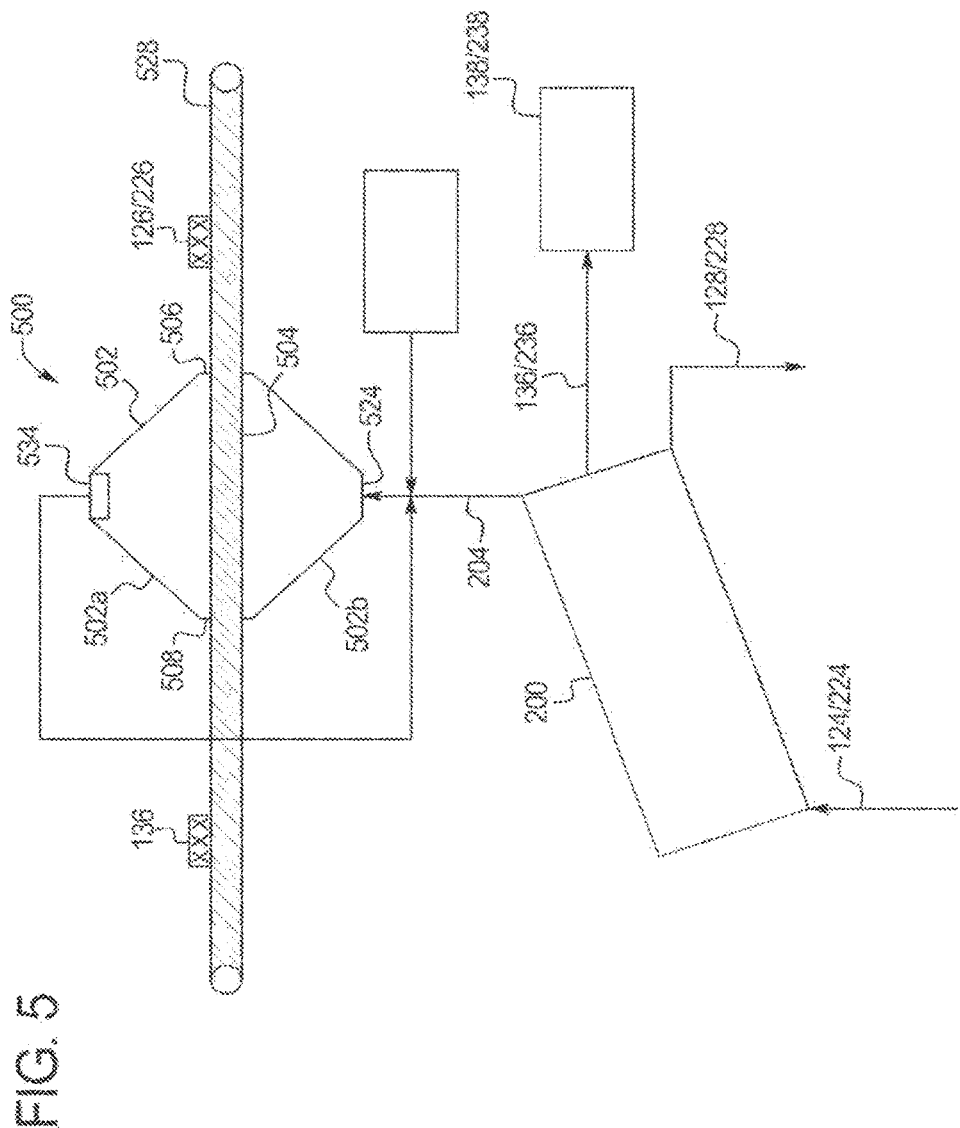
FIG. 5 depicts one embodiment of a carbon recovery unit suitable for use in connection with the present invention

As illustrated in FIGS. 1 and 5, the gas-phase separator unit 200 includes at least one input and a plurality of outputs. The at least one input is connected to the ports on the first reactor 112 and the second reactor 114 of the BPU 102. One of the outputs is connected to the carbon recovery unit 104, and another one of the outputs is connected to collection equipment or further processing equipment such as an acid hydrogenation unit 106 or distillation column. In various embodiments, the gas-phase separator processes the off-gases 120, 122 from the first reactor 112 and the second 114 to produce a condensate 128 and an enrichment gas 204 In various embodiments, condensables may be used for either energy recovery (134) (for example in the dryer, reactor or process gas heater), or for other carbon enrichment. In various embodiments, non-condensables (for example CO) may be used for energy recovery (134) (for example in a dryer, reactor or process gas heater), as an inert gas in the process (for example in the deaeration unit, reactor, BPU or cooler discussed in more detail below) or for carbon enrichment.

In various embodiments, the condensate 128 includes polar compounds, such as acetic acid, methanol and furfural. In another embodiment, the enrichment gas 204 produced by the gas-phase separator 200 includes at least non-polar gases, for example carbon monoxide, terpenes, methane, carbon dioxide, etc. In one embodiment, the gas-phase separator comprises a fractionation column. In one embodiment, acetic acid is sent via a line 128 to an optional acid hydrogenation unit In another embodiment, methanol and/or furfural are sent via optional additional line(s) 136 to a distillation/processing unit 138.

In various embodiments, as discussed in more detail below, the carbon recovery unit itself has the facility to enrich the material. In various other embodiments, the material is enriched in a material enrichment unit separate from the carbon recovery unit. It should be appreciated that, in some such embodiments, the carbon recovery unit is a vessel for storing the carbonized material, and the separate material enrichment unit is the unit in which gases are introduced to enrich the material.

In the illustrated embodiment, the carbon recovery unit 500 also enriches the carbonized biomass 126. The carbonized biomass 126 exits the third reactor along material transport unit 304 and enters the carbon recovery unit 500. In various embodiments, as illustrated in more detail in FIG. 5 and discussed above, the carbon recovery unit 500 also includes an input 524 connected to the gas-phase separator 200. In one embodiment, the enrichment gas 204 is directed into the carbon recovery unit to be combined with the biogenic reagent 126 to create a high carbon biogenic reagent 136. In another embodiment, a carbon-enriched gas from an external source can also be directed the carbon recovery unit to be combined with the carbonized biomass 126 to add carbon to the ultimate high carbon biogenic reagent produced In various embodiments, the carbonized biomass 126 is temperature-reduced carbonized biomass. Illustratively, system 100 can be co-located near a timber processing facility and carbon-enriched gas from the timber processing facility can be used as gas from an external source.

Figure 2:
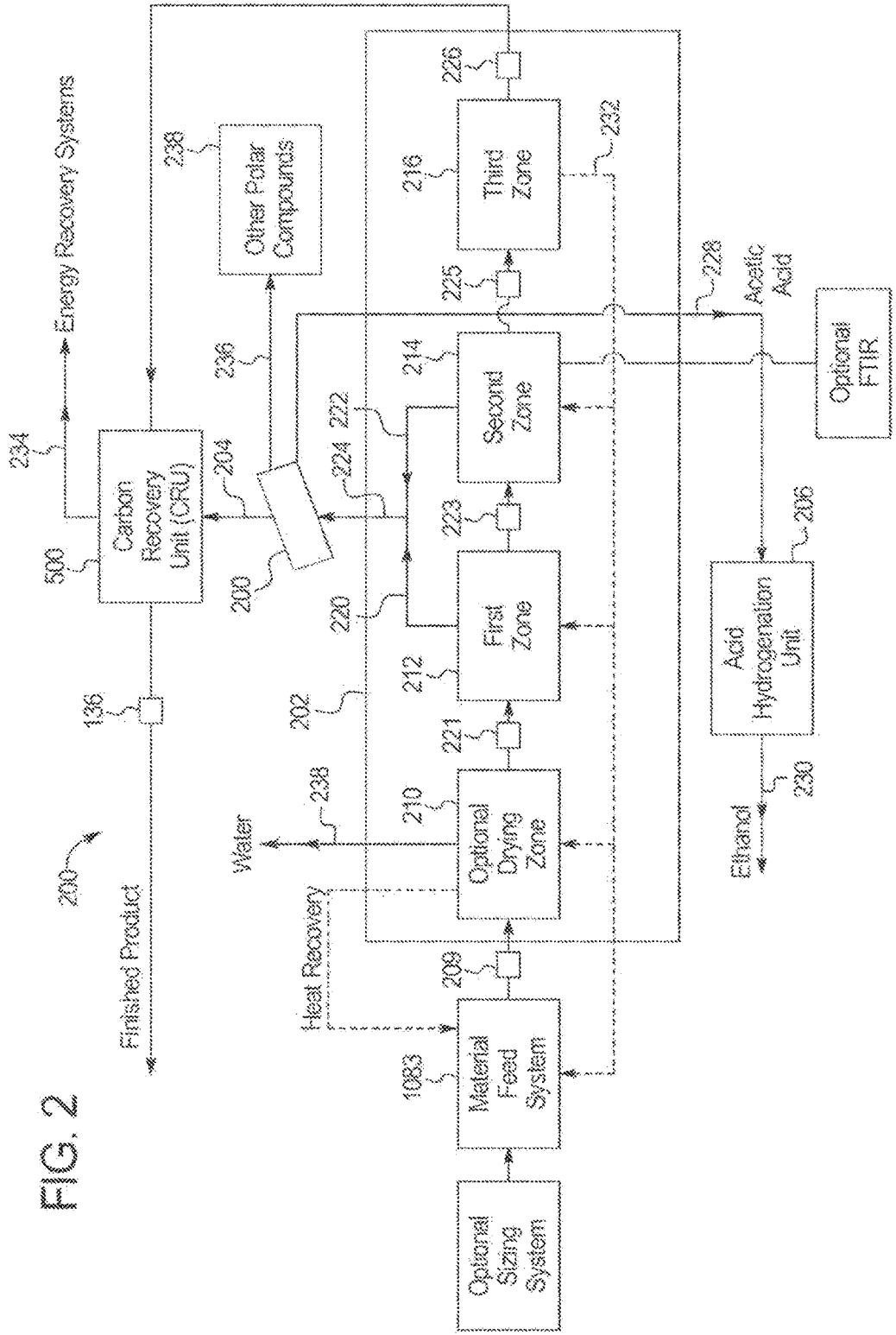
FIG. 2 depicts a single reactor, multi-zone embodiment of a system of the invention

Referring now generally to FIG. 2, a block flow diagram of a single reactor, multi-zone embodiment of the present disclosure is illustrated. In the illustrated embodiment, the raw material 209, such as biomass, is introduced into the reactor 200 in a low-oxygen atmosphere, optionally through the use of a material feed system 108 already described. As discussed in further detail below, the material feed system 108 reduces the oxygen level in the ambient air in the system to not more than about 3%. The raw material 209 enters the BPU 202 in an enclosed material transport unit 304 after the oxygen levels have been decreased. In one embodiment, the material transport unit will include an encapsulated jacket or sleeve through which steam and off-gases from the reactor 200 are sent and used to pre-heat the biomass.

In the illustrated embodiment, the raw material first travels from the material feed system 108 on the material transport unit 304 through an optional drying zone 210 of the BPU 202. In one embodiment, the optional drying zone 210 heats the raw material to remove water and other moisture prior to being passed along to the preheat zone 212. In one embodiment, the interior of the optional drying zone 210 is heated to a temperature of about ambient temperature to about 150° C. Water 238 or other moisture removed from the raw material 209 can be exhausted, for example, from the optional drying zone 210. In another embodiment, the optional drying zone is adapted to allow vapors and steam to be extracted. In another embodiment, vapors and steam from the optional drying zone are extracted for optional later use. As discussed below, vapors or steam extracted from the optional drying zone can be used in a suitable waste heat recovery system with the material feed system. In one embodiment, the vapors and steam used in the material feed system pre-heat the raw materials while oxygen levels are being purged in the material feed system. In another embodiment, biomass is dried outside of the reactor and the reactor does not comprise a drying zone.

As discussed in more detail below, in one embodiment, the optional zone 210 is configured to be connected to the cooling zone 216 to recover waste heat 232 and conserve energy through a suitable waste heat recovery system. In one embodiment, the waste heat given off in the cooling zone 216 is used to operate a heating mechanism configured to dry raw materials 209 in the optional drying zone 210. After being dried a desired period of time, the dried biomass 221 exits the optional drying zone 210 and enters preheat zone 212.

In the illustrated embodiment, the dried biomass 221 enters the first (preheat) zone 212, wherein the temperature is raised from the range of about ambient temperature to about 150° C. to a temperature range of about 100° C. to about 200° C. In one embodiment, the temperature does not exceed 200° C. in the first/preheat zone 212. It should be appreciated that if the preheat zone 212 is too hot or not hot enough, the dried biomass 221 may process incorrectly prior to entering the second zone 214. As discussed in greater detail below, the preheat zone 212 can includes an output mechanism to capture and exhaust off-gases 220 from the dried biomass 221 while it is being preheated. In another embodiment, the off-gases 220 are extracted for optional later use. In various embodiments, the heating source used for the various zones in the BPU 202 is electric or gas. In one embodiment, the heating source used for the various zones of the BPU 202 is waste gas from other zones of the unit 202 or from external sources. In various embodiments, the heat is indirect.

Following the preheat zone 212, the material transport unit 304 passes the preheated material 223 into the second (pyrolysis) zone 214. In one embodiment, the material transport unit 304 penetrates the second/pyrolysis zone through a high-temperature vapor seal system (such as an airlock, not shown), which allows the material transport unit 304 to penetrate the high-temperature pyrolysis zone while preventing (or minimizing) gas from escaping. In one embodiment, the interior of the pyrolysis zone 214 is heated to a temperature of about 100° C. to about 600° C. or about 200° C. to about 500° C. In another embodiment, the pyrolysis zone 214 includes an output port similar to the preheat zone 212 to capture and exhaust the gases 222 given off of the preheated biomass 223 while it is being carbonized. In one embodiment, the gases 222 are extracted for optional later use. In one illustrative embodiment, the off-gases 220 from the preheat zone 212 and the off-gases 222 from the pyrolysis zone 214 are combined into one gas stream 224. Once carbonized, the carbonized biomass 225 exits the second/pyrolysis zone 214 and enters the third/temperature-reducing or cooling zone 216

In one embodiment, when the carbonized biomass 225 enters the cooling zone 216, the carbonized biomass 225 is allowed to cool to a specified temperature range of about 20° C. to 25° C. (about room temperature) to become temperature-reduced carbonized biomass 226, as discussed above. In various embodiments, the BPU 202 includes a plurality of cooling zones. In one embodiment, the cooling zone 216 cools the carbonized biomass to below 200° C. In one embodiment, the cooling zone includes a mixer to agitate and uniformly cool the materials. In various embodiments, one or more of the plurality of cooling zones is outside of the BPU 202.

As illustrated in FIGS. 2 and 5, the gas-phase separator unit 200 includes at least one input and a plurality of outputs. In this illustrative embodiment, the at least one input is connected to the exhaust ports on the first/preheat zone 212 and the second/pyrolysis zone 214 of the BPU 202 One of the outputs is connected to the carbon recovery unit 500 (which is configured to enrich the material), and another one of the outputs is connected to collection equipment or further processing equipment such as an acid hydrogenation unit 206 or distillation column. In various embodiments, the gas-phase separator processes the off-gases 220, 222 from the first/preheat zone 212 and the second/pyrolysis zone 214 to produce a condensate 228 and an enrichment gas 204. In one embodiment, the condensate 228 includes polar compounds, such as acetic acid, methanol and furfural. In one embodiment, the enrichment gas 204 produced by the gas-phase separator 200 includes at least non-polar gases. In one embodiment, the gas-phase separator comprises a fractionation column. In one embodiment, acetic acid is sent via a line 228 to an optional acid hydrogenation unit 206. In another embodiment, methanol and/or furfural are sent via optional additional line(s) 236 to a distillation/processing unit 238.

In the illustrated embodiments, the carbonized biomass exits the cooling reactor/zone along the material transfer unit 304 and enters the carbon recovery unit 500. In various embodiments, as illustrated in more detail in FIG. 5 and discussed above, the carbon recovery unit 500 also includes an input 524 connected to the gas-phase separator 200. In one embodiment, the enrichment gas 204 is directed into the carbon recovery 500 to be combined with the biogenic reagent 226 to create a high carbon biogenic 136. In another embodiment, a carbon-enriched gas from an external source can also be directed to the carbon recovery unit 500 to be combined with the biogenic reagent 226 to add additional carbon to the biogenic reagent. In various embodiments, gases pulled the carbon recovery unit 500 at reference 234 are optionally used in energy recovery systems and/or systems for further carbon enrichment. Similarly, in various gases pulled from one or more zones of the BPU 202 are optionally used in energy recovery systems and/or systems for further carbon enrichment Illustratively, the system 200 can be co-located near a timber processing facility and carbon-enriched gas from the timber processing facility can be used as gas from an external source.

Now referring generally to FIG. 3, one material feed system embodiment of the present disclosure is illustrated. As discussed above, high oxygen levels in the ambient air surrounding the raw material as it processes could result in undesirable combustion or oxidation of the raw material, which reduces the amount and quality of the final product. In one embodiment, the material feed system is a closed system and includes one or more manifolds configured to purge oxygen from the air surrounding the raw material. In one embodiment, oxygen level of about 0.5% to about 1.0% are used for pre-heating, pyrolyzing/carbonizing and cooling. It should be appreciated that a primary goal of the closed material feed system is to reduce oxygen levels to not more than about 3%, not more than about 2%, not more than about 1% or not more than about 0.5%. After the oxygen level is reduced, the biomass is transferred along the material feed system into the BPU. It should be appreciated that in various embodiments, pre-heating of inert gases through recovered process energy and subsequent introduction of pre-heated inert gases to the BPU, reactor or trimming reactor makes the system more efficient.

In some embodiments, a trimming reactor is included in the system. In one trimming reactor embodiment, pyrolyzed material from the BPU is fed into a separate additional reactor for further pyrolysis where heated inert gas is introduced to create a product with higher fixed carbon levels. In various embodiments, the secondary process may be conducted in a container such as a drum, tank, barrel, bin, tote, pipe, sack, press, or roll-off container. In various embodiments, the final container also may be used for transport of the carbonized biomass. In some embodiments, the inert gas is heated via a heat exchanger that derives heat from gases extracted from the BPU and combusted in a process gas heater As seen in FIG. 3, the closed material feed system 108 includes a raw material feed hopper 300, a material transport unit 304 and an oxygen purge manifold 302.

In one embodiment, the raw material feed hopper 300 is any suitable open-air or closed-air container configured to receive raw or sized/dried biomass 109/209. The raw material feed hopper 300 is operably connected with the material transport unit 304, which, in one embodiment, is a screw or auger system operably rotated by a drive source. In one embodiment, the raw material 109/209 is fed into the material transport unit 304 by a gravity-feed system. It should be appreciated that the material transport unit 304 of FIG. 3 is fashioned such that the screw or auger 305 is enclosed in a suitable enclosure 307. In one embodiment, the enclosure 307 is substantially cylindrically shaped. In various embodiments, material feed systems include a screw, auger, conveyor, drum, screen, chute, drop chamber, pneumatic conveyance device, including a rotary airlock or a double or triple flap airlock.

As the raw material 109/209 is fed from the raw material feed hopper 300 to the material transport unit 304, the auger or screw 305 is rotated, moving the raw material 109/209 toward the oxygen purge manifold 302. It should be appreciated that, when the raw material 109/209 reaches the oxygen purge manifold 302, the ambient air among the raw material 109/209 in the material transport unit 304 includes about 20.9% oxygen. In various embodiments, the oxygen purge manifold 302 is arranged adjacent to or around the material transport unit 304. Within the oxygen fold manifold of one embodiment, the enclosure 307 of the material transport unit 304 includes a plurality of gas inlet ports 310a, 310b, 310c and a plurality of gas outlet ports 308a, 308b, 308c.

The oxygen purge manifold 302 has at least one gas inlet line 312 and at least one gas outlet line 314. In various embodiments, the at least one gas inlet line 312 the oxygen purge manifold 302 is in operable communication with each of the plurality gas inlet ports 310a, 310b, 310c. Similarly, in various embodiments, the at least one gas outlet line 314 of the oxygen purge manifold 302 is in operable communication with each of the plurality of gas outlet ports 308a, 308b, 308c. It should be appreciated that, in one embodiment, the gas inlet line 312 is configured to pump an inert gas into the gas inlet ports 310a, 310b, 310c In one such embodiment, the inert gas is nitrogen containing substantially no oxygen. In one embodiment, the inert gas will flow counter-current to biomass.

As will be understood, the introduction of inert gas 312 into the enclosed material transport unit 304 will force the ambient air out of the enclosed system. In operation, when the inert gas 312 is introduced to the first gas inlet port 310a of one embodiment, a quantity of oxygen-rich ambient air is forced out of outlet port 308a. It should be appreciated that, at this point, the desired level of not more than about 2% oxygen, not more than about 1% oxygen, not more than about 0.5% oxygen or not more than about 0.2% oxygen may not be achieved. Therefore, in various embodiments, additional infusions of the inert gas 312 must be made to purge the requisite amount of oxygen from the air surrounding the raw material 109 in the enclosed system. In one embodiment, the second gas inlet port 310b pumps the inert gas 312 into the enclosed system subsequent to the infusion at the first gas inlet port 310a, thereby purging more of the remaining oxygen from the enclosed system. It should be appreciated that, after one or two infusions of inert gas 312 to purge the oxygen 314, the desired level of less oxygen may be achieved. If, in one embodiment, the desired oxygen levels are still not achieved after two inert gas infusions, a third infusion of inert gas 312 at gas inlet 310c will purge remaining undesired amounts of oxygen 314 from the enclosed system at gas outlet 308c. Additional inlets/outlets may also be incorporated if desired. In various embodiments, oxygen levels are monitored throughout the material feed system to allow calibration of the amount and location of inert gas infusions.

In one alternative embodiment, heat, steam and gases recovered from the reactor are directed to the feed system where they are enclosed in jacket and separated from direct contact with the feed material, but indirectly heat the feed material prior to introduction to the reactor.

In one alternative embodiment, heat, steam and gases recovered from the drying zone of the reactor are directed to the feed system where they are enclosed in jacket and separated from direct contact with the feed material, but indirectly heat the feed material prior to introduction to the reactor.

It should be appreciated that the gas inlet ports 310a, 310b, 310c and the corresponding gas outlet ports 308a, 308b, 308c, respectively, of one embodiment are slightly offset from one another with respect to a vertical bisecting plane through the material transport unit 304. For example, in one embodiment, inlet port 310a and corresponding outlet port 308a are offset on material transport unit 304 by an amount that approximately corresponds with the pitch of the auger 305 in the material transport unit 304. In various embodiments, after the atmosphere surrounding the raw material 109/209 is satisfactorily de-oxygenated, it is fed from the material feed system 108 into the BPU 102. In various embodiments, oxygen levels are monitored throughout the material feed system to allow the calibration of the amount and location of inert gas infusions.

It should be appreciated that, in one embodiment, the raw material 109/209, and subsequently the dried biomass 221, preheated biomass 123/223, carbonized biomass 125/225 and carbonized biomass 126/226, travel through the reactor 102 (or reactors) along a continuous material transport unit 304. In another embodiment, the material transport unit carrying the material differs at different stages in the process. In one embodiment, the process of moving the material through the reactor, zones or reactors is continuous. In one such embodiment, the speed of the material transport unit 304 is appropriately calibrated and calculated by an associated controller and processor such that the operation of the material transport unit 304 does not require interruption as the material moves through the reactor or reactors.

In another embodiment, the controller associated with the reactor 102 or reactors (112/114/116) is configured to adjust the speed of the material transport unit 304 based on one or more feedback sensors, detected gas (e.g. from the optional FTIR), measured parameters, temperature gauges, or other suitable variables in the reactor process. It should be appreciated that, in various embodiments, any suitable moisture sensors, temperature sensors or gas sensors in operable communication with the and processor could be integrated into or between each of the zones/reactors or at any suitable position along the material transport unit 304. In one embodiment, the controller and processor use the information from sensors or gauges to optimize the speed and efficiency of the BPU 100/200. In one embodiment, the controller associated with the reactor 102 or reactors (112/114/116) is configured to operate the material transport unit 304. In one embodiment, the controller associated with the reactor 102 or reactors (112/114/116) is configured to monitor the concentration, temperature and moisture of gas inside the material transport unit 304 or inside any of the reactors In one the controller is configured to adjust the speed of the material transport unit 304, the input of gases into the material transport unit and the heat applied to the material in the material transport unit based upon one or more readings taken by the various sensors.

Figure 4:
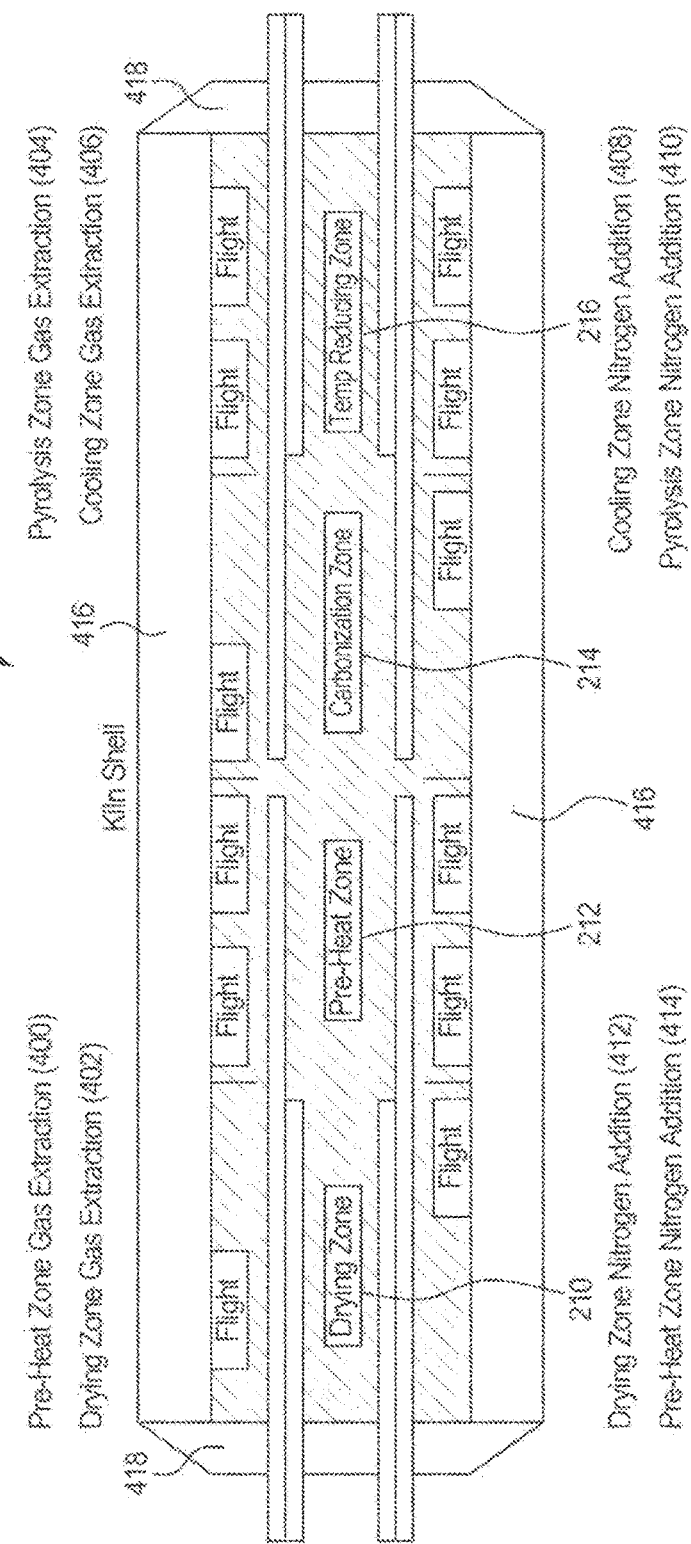
FIG. 4 depicts another embodiment of a single reactor, multi-zone biomass processing unit suitable for use in connection with the present invention.

Referring now to FIGS. 2 and 4, one embodiment of the BPU 102 is illustrated. It should be appreciated that the graphical representation of the BPU 202 in FIG. 4 corresponds substantially to the BPU 202 in FIG. 2. It should also be appreciated that, in various embodiments, the BPU 202 is enclosed in a kiln shell to control and manipulate the high amounts of heat required for the reactor process. As seen in FIG. 4, in one embodiment, the kiln shell of the BPU 202 includes several insulating chambers (416, 418) surrounding the four zones 210, 212, 214 and 216. In one embodiment, the kiln includes four separated zones. In various embodiments, each of the four zones 210, 212, 214 and 216 of the BPU 202 includes at least one inlet flight and at least one outlet flight. As discussed in greater detail below, within each zone of one such embodiment, the inlet and outlet flights are configured to be adjustable to control the flow of feed material, gas and heat into and out of the zone. A supply of inert air can be introduced into the inlet flight and the purged air can be extracted from the corresponding outlet flight. In various embodiments, one or more of the outlet flights of a zone in the BPU 202 are connected to one or more of the other inlet or outlet flights in the BPU.

In one embodiment, after the raw material 209 is de-oxygenated in the material feed system 108, it is introduced to the BPU 202, and specifically to the first of four zones the optional drying zone 210. As seen in FIG. 4, the drying zone includes inlet flight 422b and outlet flight 420a. In one embodiment, the drying zone is heated to a temperature of about 80° C. to about 150° C. to remove water or other moisture from the raw materials 209. The biomass is then moved to the second or pre-heat zone 212 where the biomass is pre-heated as described above.

In another embodiment, the material that has optionally been dried and heated is moved to the third or carbonization zone. In one embodiment, carbonization occurs at a temperature from about 200° C. to about 700° C., for example about 200° C., about 210° C., about 220° C., about 230° C., about 240° C., about 250° C., about 260° C., about 270° C., about 280° C., about 290° C., about 300° C., about 310° C., about 320° C., about 330° C., about 340° C., about 350° C., about 360° C., about 370° C., about 380° C., about 390° C., about 400° C., 410° C., about 420° C., about 430° C., about 440° C., about 450° C., about 460° C., about 470° C., about 480° C., about 490° C., about 500° C., about 510° C., about 520° C., about 530° C., about 540° C., about 550° C., about 560° C., about 570° C., about 580° C., about 590° C., about 600° C., about 610° C., about 620° C., about 630° C., about 640° C., about 650° C., about 660° C., about 670° C., about 680° C., about 690° C., or about 700° C. In another embodiment, a carbonization zone of a reactor 421 adapted to allow gases produced during carbonization to be extracted. In another embodiment, gases produced during carbonization are extracted for optional later use. In one embodiment, a carbonization temperature is selected to minimize or eliminate production of methane ($CH_4$) and maximize carbon content of the carbonized biomass.

In another embodiment, carbonized biomass is moved to a temperature-reducing or cooling zone (third zone) and is allowed to passively cool or is actively cooled. In one embodiment, carbonized biomass solids are cooled to a temperature ±10, 20, 30 or 40° C. of room temperature.

In various embodiments, the BPU includes a plurality of gas introduction probes and gas extraction probes. In the embodiment of the BPU illustrated in FIG. 4, the BPU further includes a plurality of gas introduction probes: 408, 410, 412 and 414, and a plurality of gas extraction probes: 400, 402, 404 and 406. It should be appreciated that, in various embodiments, one of each gas introduction probes and one of each gas extraction probes correspond with a different one of the plurality of zones 210, 212, 214 and 216. It should also be appreciated that, in various alternative embodiments, the BPU 202 includes any suitable number of gas introduction probes and gas extraction probes, including more than one gas introduction probes and more than one gas extraction probes for each of the plurality of zones.

In the illustrated embodiment, the drying zone 210 is associated with gas introduction probe 412 and gas extraction probe 402 In one embodiment, the gas introduction probe 412 introduces nitrogen to the drying zone 210 and the gas extraction probe 402 extracts gas from the drying zone 210. It should be appreciated that, in various embodiments, the gas introduction probe 412 is configured to introduce a mixture of gas into the drying zone 210. In one embodiment, the gas extracted is oxygen. It should be appreciated that, in various embodiments, the gas extraction probe 402 extracts gases the drying zone 210 to be reused in a heat or energy recovery system, as described in detail above.

In the illustrated embodiment, the pre-heat zone 212 is associated with gas introduction probe 414 and gas extraction probe 400. In one embodiment, gas introduction probe 414 introduces nitrogen to the pre-heat zone 212 and gas extraction probe 400 extracts gas from the pre-heat zone 212. It should be appreciated that, in various embodiments, the gas introduction probe 414 is configured to introduce a mixture of gas into the pre-heat zone 212. In various embodiments, the gas extracted in gas extraction probe 400 includes carbon-enriched off-gases. It should be appreciated that in one embodiment, as discussed above, the gases extracted from the pre-heat zone 212 and pyrolysis zone 214 are reintroduced to the material at a later stage in the process, for example in the carbon recovery unit. In various embodiments, the gases extracted from any of the zones of the reactor are used for either energy recovery in the dryer or process gas heater, for further pyrolysis in a trimming reactor, or in the carbon enrichment unit.

In the illustrated embodiment, the pyrolysis zone 214 is associated with gas introduction probe 410 and gas extraction probe 404. In one embodiment, gas introduction probe 410 introduces nitrogen to the pyrolysis zone 214 and gas extraction probe 404 extracts gas from the pyrolysis zone 214. It should be appreciated that, in various embodiments, the gas introduction probe 410 is configured to introduce a mixture of gas into the pyrolysis zone 214. In various embodiments, the gas extracted in the gas extraction probe 404 includes carbon-enriched off-gases. It should be appreciated that in one embodiment, as discussed above, the carbon-enriched gases extracted from the pyrolysis zone 214 are used and reintroduced to the material at a later stage in the process. In various embodiments, as described in more detail below, the extracted gas 400 from the pre-heat zone 212 and the extracted gas 404 from the pyrolysis zone 214 are combined prior to being reintroduced to the material.

In the illustrated embodiment, the cooling zone 116 is associated with gas introduction probe 408 and gas extraction probe 406 In one embodiment, gas probe 408 introduces nitrogen to the cooling zone 116 and gas extraction probe 406 gas from the cooling zone 116. It should be appreciated that, in various embodiments, the gas introduction probe 408 is configured to introduce a mixture of gas into the cooling zone 116. It should be appreciated that, in various embodiments, the gas extraction probe 406 extracts gases from the cooling zone 116 to be reused in a heat or energy recovery system, as described in more detail above.

It should be appreciated that the gas introduction probes and gas extraction probes of various embodiments described above are configured to operate with the controller and plurality of sensors discussed above to adjust the levels and concentrations of gas being introduced to and gas being extracted from each zone.

In various embodiments, the gas introduction probes and gas extraction probes are made of a suitable pipe configured to withstand high temperature fluctuations. In one embodiment, the gas introduction probes and gas extraction probes include a plurality of openings through which the gas is introduced or extracted. In various embodiments, the plurality of openings are disposed on the lower side of the inlet and gas extraction probes. In various embodiments, each of the plurality of openings extends for a substantial length within the respective zone In one embodiment, the gas introduction probes extend from one side of the BPU 202 through each zone. In one such embodiment, each of the four gas introduction probes extend from a single side of the BPU to each of the respective zones. In various embodiments, gaseous catalysts are added that enrich fixed carbon levels. It should be appreciated that, in such an embodiment, the plurality of openings for each of the four gas introduction probes are only disposed in the respective zone associated with that particular gas introduction probe.

For example, viewing FIG. 4, if each of the gas introduction probes from the left side of the drying zone into each one of the zones, all four gas introduction probes would travel through the drying zone, with the drying zone gas introduction terminating in the drying zone. The three remaining gas introduction probes would all travel through the pre-heat zone, with the pre-heat zone gas introduction probe in the pre-heat zone. The two remaining gas introduction probes would travel through pyrolysis zone, with the pyrolysis zone gas introduction probe terminating in the zone. The cooling zone gas introduction probe would be the only gas introduction probe travel into and terminate in the cooling zone. It should be appreciated that in various embodiments, the gas extraction probes are configured similar to the gas introduction probes described in this example. It should also be appreciated that the gas introduction probes and gas extraction probes can each start from either side of the BPU.

In various embodiment, the gas introduction probes are arranged concentrically with one another to save space used by the multiple-port configuration described in the example above. In one such embodiment, each of the four inlet probes/ports would have a smaller diameter than the previous inlet probe/port. For example, in one embodiment, the drying zone gas introduction probe has the largest interior diameter, and the pre-heat zone gas introduction probe is situated within the interior diameter of the drying zone inlet probe/port, the pyrolysis zone gas introduction probe is then situated within the interior diameter of the pre-heat zone gas introduction probe and the cooling zone gas introduction probe is situated within the pyrolysis zone gas introduction probe. In one example embodiment, a suitable connector is attached to each of the four gas introduction probes outside of the BPU 102 to control the air infused into each of the four gas introduction probes individually.

In one such embodiment, similar to the example above, the drying zone gas introduction probe would terminate in the drying zone, and the three other gas introduction probes would continue onto the preheat zone. However, with a concentric or substantially concentric arrangement, only the outer-most gas introduction probe is exposed in each zone before being terminated. Therefore, in one such embodiment, the individual zone gas introductions are effectively controlled independent of one another, while only requiring one continuous gas introduction probe line. It should be appreciated that a similar concentric or substantially concentric configuration is suitably used for the gas extraction probes in one embodiment.

In one embodiment, each zone or reactor is adapted to extract and collect off-gases from one or more of the individual zones or reactors. In another embodiment, off-gases from each zone/reactor remain separate for disposal, analysis and/or later use. In various embodiments, each reactor/zone contains a gas detection system such as an FTIR that can monitor gas formation within the zone/reactor. In another embodiment, off-from a plurality of zones/reactors are combined for disposal, analysis and/or later use, in various embodiments, off gases from one or more zones/reactors are fed to a process heater. In another embodiment, off-gases from one or more zones/reactors are fed into a carbon recovery unit. In another embodiment, off-gases from one or more zones/reactors are fed to a gas-phase separator prior to introduction in the carbon recovery unit. In one embodiment, a gas-phase separator comprises a fractionation column. Any fractionation column known to those skilled in the art may be used. In one embodiment, off-gases are separated into non-polar compounds and polar compounds using a standard fractionation column heated to a suitable temperature, or a packed column. In another embodiment, non-polar compounds or enriched gases from a gas-phase separator are extracted for optional later use, and in various embodiments, off gases from one or more are fed to a process gas heater. In one embodiment, gases extracted from the pre-heat zone/reactor, the pyrolysis zone/reactor and optionally the cooling zone/reactor are extracted into a combined stream and fed into the gas-phase separator. In various embodiments, one or more of the zones/reactors is configured to control whether and how much gas is introduced into the combined stream.

As discussed above and generally illustrated in FIG. 5, the off-gases 124/224 from the BPU 102/202 are directed into the gas-phase separator 200. In various embodiments, the off-gases 124/224 include the extracted gases 120 from the first/preheat zone/reactor 112/212 combined with the extracted gases 122/222 from the second/pyrolysis zone/reactor 114/214 or either gas stream alone. When the off-gases 124/224 enter the gas-phase separator 200, the off-gases 124/224 are separated into polar compounds 128/228/136/236 and non-polar compounds 204, such as non-polar gases. In various embodiments, the gas-phase separator 200 is a known fractionation column.

In various embodiments, the enriched gases 204 extracted from the combined off-gases 124/224 are directed from the gas-phase separator 200 into the recovery unit 500 via input 524, which enriches the material. As discussed above, and as illustrated in FIGS. 8 and 11, it should be appreciated that in various embodiments, the extracted gases are first introduced into a material enrichment unit, and then into a carbon recovery unit In the embodiment illustrated in FIG. 5, the material enrichment takes place in the carbon recovery unit 500 In one embodiment (FIG. 5), the gas-phase separator 200 includes a plurality of outputs. In various embodiments, one output from gas-phase separator 200 is connected to the carbon recovery unit 500 to introduce an enriched gas stream to the carbon recovery unit 500. In one embodiment, a portion of the enriched gas stream is directed to the carbon recovery unit 500 and another portion is directed to a scrubber, or another suitable purifying apparatus to clean and dispose of unwanted gas. In various embodiments, off-gases that are not sent to the carbon recovery unit may be used for either energy recovery (for example in a process gas heater) or as an inert gas (for example in the deaeration unit, reactor, BPU, or cooler). Similarly, in embodiments, off-gases from the carbon recovery unit may be used for either energy recovery (for example in a process gas heater), as an inert gas (for example in the deaeration unit, reactor, BPU, or cooler), or in a secondary recovery unit.

In one embodiment, another output from the gas-phase separator extracts polar compounds, optionally condensing them into a liquid component, including a plurality of different liquid parts. In various embodiments, the liquid includes water, acetic acid, methanol and furfural. In various embodiments, the outputted liquid is stored, disposed of, further processed, or re-used. For example, it should be appreciated that the water outputted in one embodiment can be re-used to heat or cool another portion of a system. In another embodiment, the water is drained. It should also be appreciated that the acetic acid, methanol and furfural outputted in one embodiment can be routed to storage tanks for re-use, re-sale, distillation or refinement.

As seen in FIG. 5, the carbon recovery unit 500 of one embodiment comprises a housing with an upper portion and a lower portion. It should be appreciated that, in various embodiments in which a material enrichment unit is separate from the carbon recovery unit, the material enrichment unit includes features similar to those discussed with respect to the carbon recovery unit 500 of FIG. 5. In one embodiment, the carbon recovery unit, comprises: a housing 502 with an upper portion 502a and a lower portion 502b; an inlet 524 at a bottom of the lower portion of the housing configured to carry reactor off-gas; an outlet 534 at a top of the upper portion of the housing configured to carry a concentrated gas stream; a path 504 defined between the upper portion and portion of the housing; and a transport system 528 following the path, the transport configured to transport reagent, wherein the housing is shaped such that the reagent adsorbs at least some of the reactor off-gas. In various embodiments, the upper portion includes a plurality of outlets and the lower portion includes a plurality of inlets.

In one embodiment, the housing 502 is substantially free of corners having an angle of 110 degrees or less, 90 degrees or less, 80 degrees or less or 70 degrees or less. In one embodiment, the housing 502 is substantially free of convex corners. In another embodiment, the housing 502 is substantially free of convex corners capable of producing eddies or trapping air. In another embodiment, the housing 502 is substantially shaped like a cube, rectangular prism, ellipsoid, a stereographic ellipsoid, a spheroid, two cones affixed base-to-base, two regular tetrahedrons affixed base-to-base, two rectangular pyramids affixed base-to-base or two isosceles triangular prisms affixed base-to-base.

In one embodiment, the upper portion 502a and lower portion 502b of the housing 502 are each substantially shaped like a half-ellipsoid, half rectangular prism, half-stereographic ellipsoid, a half-spheroid, a cone, a regular tetrahedron, a rectangular pyramid, an isosceles triangular prism or a round-to-rectangular duct transition.

In another embodiment, the inlet 524 at the bottom of the lower portion of the housing 502b and the outlet 534 at the top of the upper portion of the housing 502a are configured to connect with a pipe. In another embodiment, the top of the lower portion of the housing 502b and the bottom of the upper portion of the housing 502a are substantially rectangular, circular or elliptical. In another embodiment, the width between the top of the lower portion of the housing 502b and the bottom of the upper portion of the housing 502a is wider than a width of the transport system 528. In one embodiment, the width of the transport system 528 is its height In one embodiment, the carbon recovery unit 500 comprises a path 504 defined between the upper portion and the lower portion, an inlet opening 506 and an outlet opening 508 In one embodiment, the inlet opening and outlet opening are configured to receive the transport system. In one embodiment, the transport system 528 is at least semi-permeable or permeable to the enriching gas.

In one embodiment, the inlet opening 506 includes an inlet opening sealing mechanism to reduce escape of gas and the outlet opening 508 includes an outlet opening sealing mechanism to reduce escape of gas In one embodiment, the inlet and outlet opening sealing mechanisms comprise an airlock In various embodiments, the lower portion 502b of the housing of the carbon recovery unit has a narrow round bottom connection opening, which is connected to the gas-phase separator 200 for the transport of gas stream 204. In various embodiments, the top of the lower portion 502b of the housing of the carbon recovery unit 500 is substantially rectangular in shape, and substantially wider than the narrow round bottom connection opening. It should be appreciated that in one embodiment, the lower portion transitions from the round bottom opening to a rectangular top opening. In one embodiment, the rectangular top opening of the lower portion is about six feet wide (along the direction of the conveyor system). In various embodiments, the top portion of the carbon recovery unit 500 is shaped substantially similarly to the lower portion. In one embodiment, the lower opening of the top portion is wider than the top opening of the lower portion. In one embodiment, the rectangular lower opening of the top portion is about six and a half feet wide (along the direction of the conveyor system). In one embodiment, the top portion is configured to capture all gases passed through the carbon recovery unit 500 that are not adsorbed by the activated materials.

It should be appreciated that, in various embodiments, the shape of the lower portion of the carbon recovery unit aids in slowing down and dispersing the gases 204 across a wider surface area of the conveyor carrying the biogenic reagent 126/226. In various embodiments, the precise shape of the lower 502b and upper 502a portions of the carbon recovery unit 500 depend upon the angle of gas dispersion coming from the gas-phase separator pipe. It should be appreciated that in various embodiments, the gas naturally will tend to expand as it is pumped up at a flared range of between 5 and 30 degrees from the vertical. In one embodiment, the flare angle is approximately 15 degrees. It should be appreciated that the lower portion of the carbon recovery unit is constructed with as few creases and corners as possible to prevent the trapping of air or formation of eddies In one embodiment, the carbon recovery unit 500 is configured to connect to the gas-phase separator 200 as discussed above, as well as the BPU 102/202. In embodiments, the carbon recovery unit 500 is connected to the output of the cooling reactor/zone 216/116, or the last cooling zone of the BPU 102/202 or outside of the BPU In one embodiment, the output of the cooling reactor/zone 116/216 includes biogenic reagent that have been processed in the BPU 102/202. In one embodiment, the biogenic reagent 126/226 enter the carbon recovery unit 500 along a suitable transport system. In various embodiments, the top portion and the bottom portion of the carbon recovery unit are connected to one another, and define a pathway through which a transport system passes. In one embodiment, the transport system is constructed with a porous or mesh material configured to allow gas to pass there through. It should be appreciated that the transport system is configured to pass through an opening of the carbon recovery unit 500 and then through an exit opening in the carbon recovery. In some embodiments, the entrance and the exit into and out of the carbon recovery unit are appropriately sealed an airlock or another suitable sealing mechanism to prevent gases from escaping through the conveyor opening. In various embodiments, off-gases that are not sent to the carbon recovery unit may be used for either energy recovery (for example in a process gas or as an inert gas (for example in the deaeration unit, reactor, BPU, or cooler). Similarly, various embodiments, off-gases from the carbon recovery unit may be used for either energy recovery (for example in a process gas heater), as an inert gas (for example in the deaeration unit, reactor, BPU, or cooler), or in a secondary recovery unit.

In various embodiments, the process operates by first outputting the biogenic reagent 126/226 from the cooling zone 116/216 onto the transport system using a suitable discharge mechanism from the cooling reactor/zone 116/216. In one embodiment, the biogenic reagent 126/216 are spread across the width of the transport system to minimize material stacking or bunching and maximize surface area for gaseous absorption. At the point which the biogenic reagent 126/216 are deposited and suitably spread onto the transport system, in various embodiments, the transport system transports the biogenic reagent 126/216 through the opening in the carbon recovery unit 104 defined between the lower portion and the top portion discussed above. In the carbon recovery unit 104, the biogenic reagent 126/216 adsorb gases piped into the lower portion of the carbon recovery unit 104 from the gas-phase separator 200. After the biogenic reagent is enriched with non-polar gases, it should be appreciated that the biogenic reagent becomes a high carbon biogenic reagent. In various embodiments, the high carbon biogenic reagent is a final product of the process disclosed herein and is transported away from the carbon recovery unit 104 into a suitable storage or post-processing apparatus In one embodiment, after the enriched gases 204 pass through the conveyor and the biogenic reagent 126/216, the resulting gas is extracted at the top portion of the carbon recovery unit 104. In various embodiments, the exhausted gases 134 are carried away to a suitable scrubber, stack or recovery system. In some embodiments, the exhaust gases are exploited for any reusable qualities in the system, including usage in a secondary carbon recovery unit or for energy. In various embodiments, off-gases that are not sent to the carbon recovery unit may be used for either energy recovery (for example in a process gas heater) or as an inert gas (for example in the deaeration unit, reactor, BPU, or cooler). Similarly, in various embodiments, off-gases from the carbon recovery unit may be used for either energy recovery (for example in a process gas heater), as an inert gas (for example in the deaeration unit, reactor, BPU, or cooler), or in a secondary recovery unit.

It should be appreciated that the biogenic reagent 126/216 include a high should also be appreciated that the enriched gas stream 204 includes primarily non-polar gases like terpenes, carbon monoxide, carbon dioxide and methane. In various embodiments, as the enriched gases are directed from the gas-phase separator into the carbon recovery unit, the gas flow rate and the conveyor speed are monitored and controlled to ensure maximum absorption of the non-polar gases in the biogenic reagent 126/216. In another embodiment, the high-energy organic compounds comprise at least a portion of the enriched gases 204 eluted during carbonization of the biomass, and outputted from the gas-phase separator 200 to the carbon recovery unit 104 In various embodiments, the enriched gases 204 are further enriched with additional additives prior to being introduced to the carbon recovery unit or material enrichment unit.

As discussed in more detail below, in various embodiments, the residence time of the biogenic reagent 126/216 in the carbon recovery unit is controlled and varies based upon the composition of the biogenic reagent 126/216 and gas flow and composition. In one embodiment, the biogenic reagent are passed through one or more carbon recovery units more than one time. In various embodiments, the output of enriched air from the gas-phase separator and the output of exhausted air from the carbon recovery unit 104 can be diverted or bifurcated into an additional carbon recovery unit or further refined or used for energy or inert gas for use in the process Referring more generally to FIGS. 6 to 13, various embodiments of the present disclosure are illustrated and discussed. It should be appreciated that the various embodiments and alternatives discussed below with respect to FIGS. 6 to 13 apply to the embodiments of FIGS. 1 to 5 discussed above, and vice versa.

Referring specifically now to FIG. 6, this embodiment can utilize a BPU including a single reactor having two to a greater plurality of different zones. Two zones are shown in the illustrative embodiment, however, any different number of zones could be employed. In one embodiment, each zone is connected to at least one other zone via a material transport unit (not pictured). In one embodiment, the material transport unit controls atmosphere and temperature conditions.

Specifically in one embodiment illustrated in FIG. 6, the system 600 includes a material feed system 602, a BPU 606 including a pyrolysis zone 608 and a cooling zone 610, a cooler 614 and a carbon recovery unit 616. It should be appreciated that the cooler 614 of FIG. 6 is outside of the BPU 606, and is in addition to the cooling zone 610 that resides within the BPU 606.

In various embodiments, the system 600 includes an optional dryer between the material feed system 602 and the BPU 606. In various embodiments, the BPU 606 includes a plurality of zones. In FIG. 6, the BPU 606 includes a pyrolysis zone 608 and a cooling zone 610. The BPU 606 also includes at least a plurality of inlets and outlets for adding substances to and removing various substances from the plurality of zone 608, 610, including at least condensable vapors and non-condensable gases 612. It should be appreciated that in various embodiments discussed below, one or more of the plurality of zone 608 or 610 are enclosed by the BPU 606.

Referring now to FIG. 7, a system 700 of one embodiment is illustrated discussed System 700 includes a single-reactor system, including a material feed system 702, a pre-heater 706, a pyrolysis reactor 708, a cooler, 714 and a carbon recovery unit 716. In various embodiments, the system 700 includes an optional dryer 704 between the material feed system 702 and the pre-heater 706. As seen in FIG. 7, the pyrolysis reactor 708 of one embodiment includes at least one gas inlet 710 and at least one outlet 712 for outputting substances from the pyrolysis reactor 708 In various embodiments, the substances outputted through outlet 712 include condensable vapors and/or non-non-condensable gases. It should be appreciated that the pyrolysis reactor 708 can one or more zones, not discussed in detail herein. In various embodiments, the system includes one or more reactors in addition to the pyrolysis reactor 708.

Figure 8:
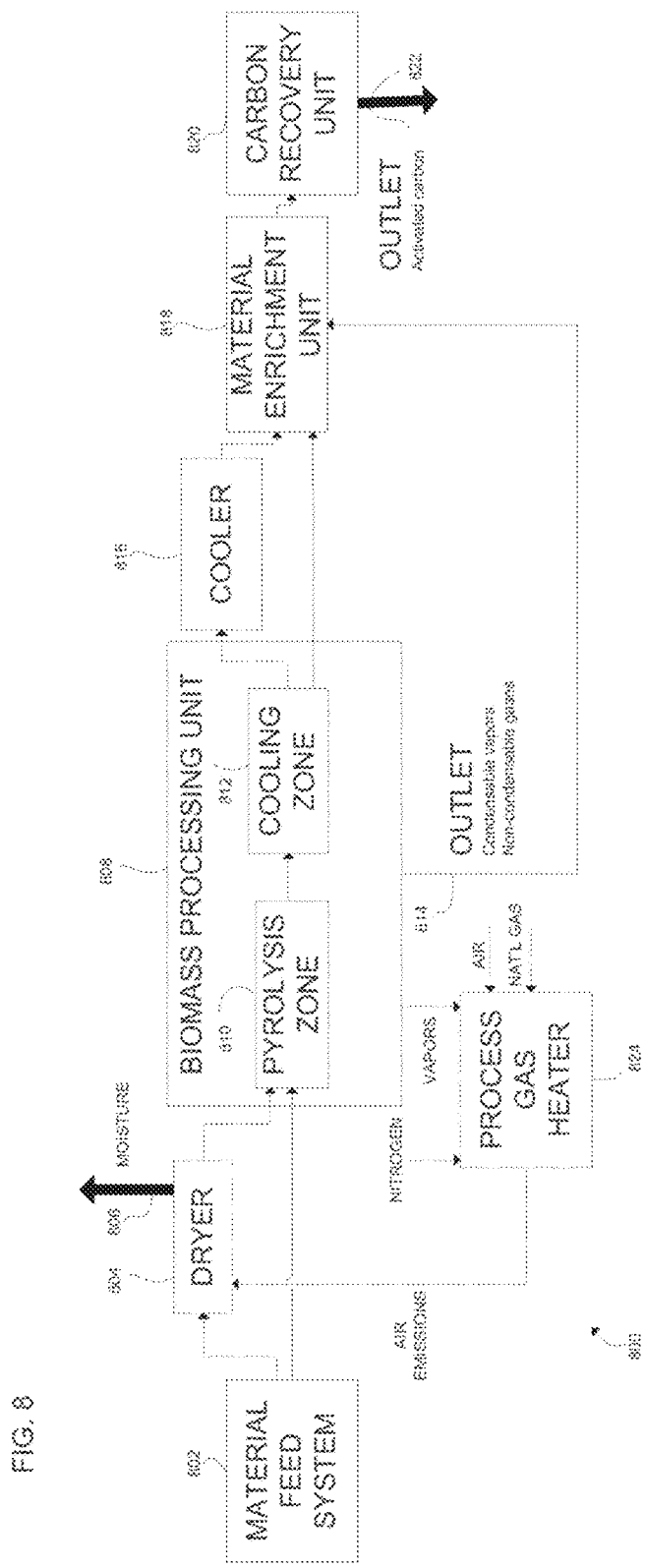
FIG. 8 depicts an embodiment of a single-reactor biomass processing unit of the invention with a gas inlet and an optional cooler.

Referring now to FIG. 8, a single-reactor, multiple zone BPU system 800 of one embodiment is illustrated and discussed. System 800 includes a material feed system 802, a BPU 808 having a pyrolysis zone 810 and a cooling zone 812, a material enrichment unit 818, and a carbon recovery unit 820. Similar to the embodiments discussed above, FIG. 8 also includes an optional dryer 804 located between the material feed system 802 and the BPU 808. It should be appreciated that moisture 806 from the dryer 804 is removed during the drying process. FIG. 8 also includes an optional cooler 816 outside of the BPU 808 and before the material enrichment unit 818. As discussed in more detail below, the material enrichment unit 818 is in communication with a gas outlet 814 of the BPU 808, which carries condensable vapors and non-condensable gases from the BPU. It should be appreciated that various embodiments illustrated in FIG. 8 include a separate carbon recovery unit 820 from the material enrichment unit 818. As discussed above, in various embodiments, the carbon recovery unit 820 of FIG. 8 is an appropriate vessel in which the enriched material is stored following the material enrichment unit 818, and the carbon recovery unit 820 does not further enrich the material.

It should be appreciated that, in various embodiments, an optional process gas heater 824 is disposed in the system and attached to the BPU 808. In various embodiments, vapors or other off-gases from the BPU 808 are inputted into the optional process gas heater 824, along with an external source of any one or more of air, natural gas, and nitrogen. As discussed below, in various embodiments, the air emissions from the process gas heater 824 are inputted into dryer 804 as a heat or energy recovery system.

Figure 9:
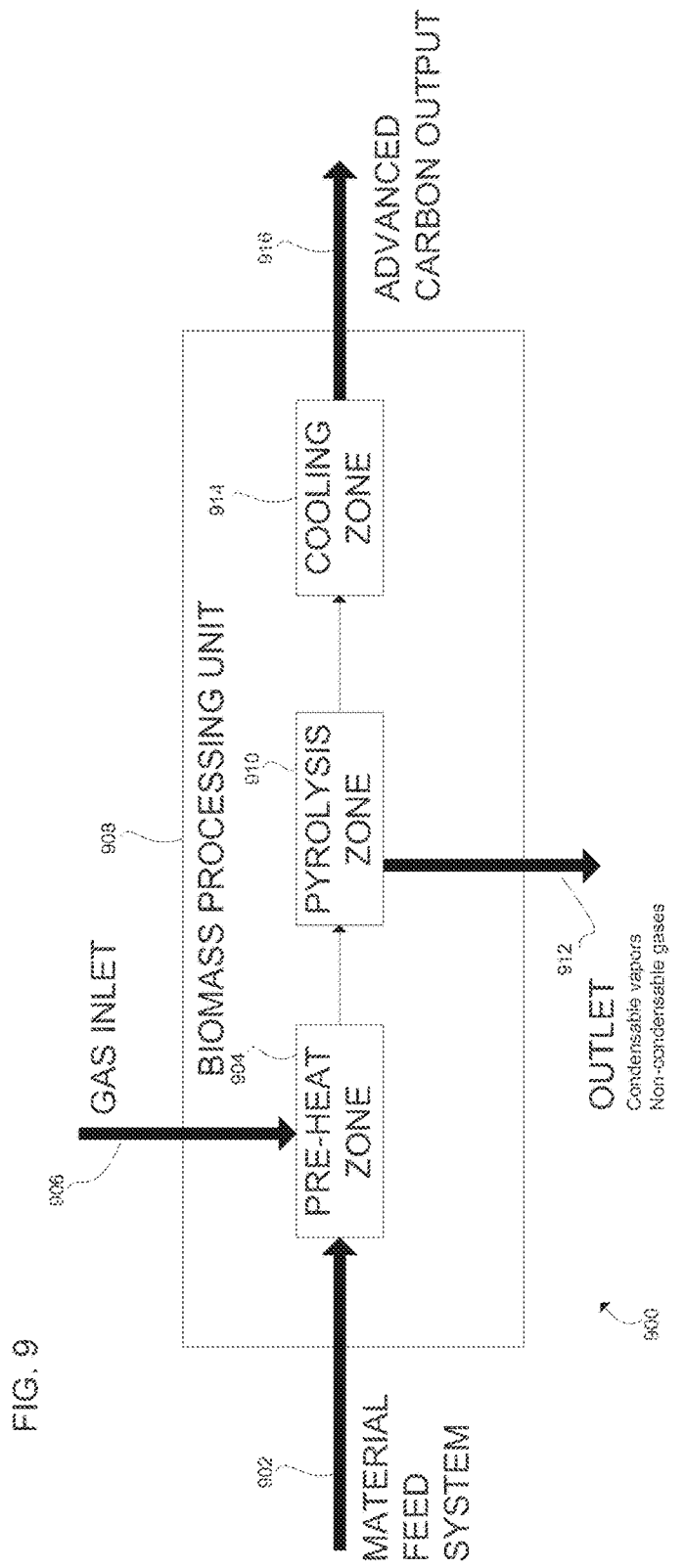
FIG. 9 depicts a single-reactor biomass processing unit system embodiment of the invention with an optional dryer and de-aerator, and an inert gas inlet.

Referring now to FIG. 9, a BPU 908 of a system 900 of one embodiment illustrated and discussed. The BPU 908 includes a plurality of zones: the pre-heat zone 904, the pyrolysis zone 910, and the cooling zone 914. The BPU 908 of one embodiment also includes a material feed system 902 in communication with one of the zones at least one gas inlet 906 in communication with one or more of the zones 904, 910, 914 In various embodiments, as discussed below, one of the zones also includes at least one 912 for outputting substances, in one embodiment, condensable vapors and/or non-non-condensable gases. In various embodiments, one of the zones also includes an outlet for outputting the advanced carbon from the system 900.

It should be appreciated that, although FIG. 9 shows the gas inlet 906 being connected to the pre-heat zone 904, various embodiments include inlets into any combination of the three zones. Similarly, it should be appreciated that although the gaseous outlet 912 comes from the pyrolysis zone 910, various embodiments include outlets out of one or more of any combination of the three zones. As discussed below, various embodiments contemplated include inputs and outputs within the BPU: e.g., an outlet of the pyrolysis zone 910 is then input into the pre-heat zone 904. It should be appreciated that, in the illustrated embodiment, each of the reactors in the BPU is connected to one another via the material feed system, as discussed above.

In various embodiments, the pre-heat zone 904 of the BPU 908 is configured for feeding biomass 902 (or another carbon-containing feedstock) in a manner that does not "shock" the biomass, which would rupture the cell walls and initiate fast decomposition of the solid phase into vapors and gases. In one embodiment, pre-heat zone 904 can be thought of as mild pyrolysis.

In various embodiments, pyrolysis zone 910 of the BPU 908 is configured as the primary reaction zone, in which preheated material undergoes pyrolysis chemistry to release gases and condensable vapors, resulting in a solid material which is a high-carbon reaction intermediate. Biomass components (primarily cellulose, hemicellulose, and lignin) decompose and create vapors, which escape by penetrating through pores or creating new nanopores. The latter effect contributes to the creation of porosity and surface area.

In various embodiments, the cooling zone 914 of the BPU 908 is for receiving the high-carbon reaction intermediate and cooling down the solids, i.e. the cooling zone 914 will be a lower temperature than the pyrolysis zone 910. In the cooling zone 914, the chemistry and mass transport can be complex. In various embodiments, secondary reactions occur in the cooling zone 914. It should be appreciated that carbon-containing components that are in the gas phase can decompose to form fixed carbon and/or become adsorbed onto the carbon. Thus, the advanced carbon 916 is not simply the solid, devolatilized residue of the processing steps, but rather includes additional carbon that has been deposited from the gas phase, such as by decomposition organic vapors (e.g., tars) that can form carbon.

Figure 10:
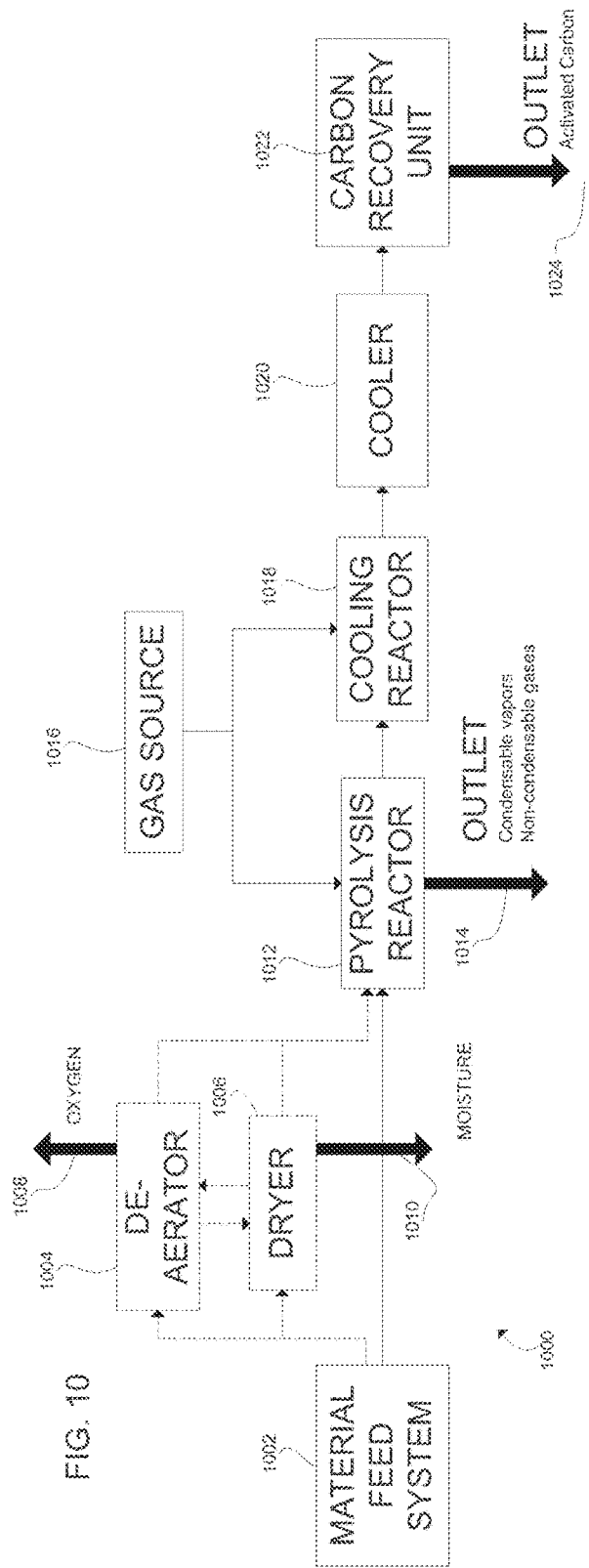
FIG. 10 depicts a multiple-reactor system embodiment of the invention with an optional dryer and de-aerator, and an inert gas inlet

Referring now to FIGS. 10 to 13, various multiple reactor embodiments of the system are illustrated and discussed. Similar to each of the embodiments, the systems include an optional deaerator and an optional dryer, as discussed in more detail below. Referring to FIG. 10, the system 1000 includes material feed system 1002, a pyrolysis reactor 1012, a cooling reactor 1018, a cooler 1020 and a carbon recovery unit 1022. As discussed further below, a gas source 1016 is configured to input gas into one or both of the pyrolysis reactor 1012 and the cooling reactor 1018. In various embodiments, the pyrolysis reactor includes an outlet to output at least condensable vapors and/or non-condensable gases. In various embodiments, the carbon recovery unit 1022 includes an outlet 1024 to output activated carbon from the system 1000.

It should be appreciated that, in various embodiments illustrated at least in FIGS. 10 to 13, the illustrated systems includes an optional de-aerator and an optional dryer. As seen in FIG. 10, for example, represented by broken lines, the optional de-aerator 1004 is connected to the system 1000 between the material feed system 1002 and the pyrolysis reactor 1002. Similarly, the dryer 1006 is connected to the system 1000 between the material feed system 1002 and the pyrolysis reactor 1012. In various embodiments, the dryer 1006 and deaerator 1004 are also connected to one another such that the material from the material feed system can follow any number of different paths through the material feed system, the de-aerator, the dryer, and to the pyrolysis reactor. It should be appreciated that in some embodiments, the material only passes through one of the optional de-aerator 1004 and dryer 1006.

In some embodiments, with reference to FIG. 10, a process for producing a high-carbon biogenic reagent comprises the following steps:

(a) providing a carbon-containing feedstock comprising biomass;

(b) optionally drying the feedstock to remove at least a portion of moisture contained within the feedstock;

(c) optionally deaerating the feedstock to remove at least a portion of interstitial oxygen, if any, contained with the feedstock, (d) pyrolyzing the feedstock in the presence of a substantially inert gas phase for at least 10 minutes and with at least one temperature selected from about 250° C. to about 700° C., to generate hot pyrolyzed solids, condensable vapors, and non-condensable gases;

(e) separating at least a portion of the condensable vapors and at least a portion of the non-condensable gases from the hot pyrolyzed solids;

(f) cooling the hot pyrolyzed solids to generate cooled pyrolyzed solids; and (g) recovering a high-carbon biogenic reagent comprising at least a portion of the cooled pyrolyzed solids.

Figure 11:
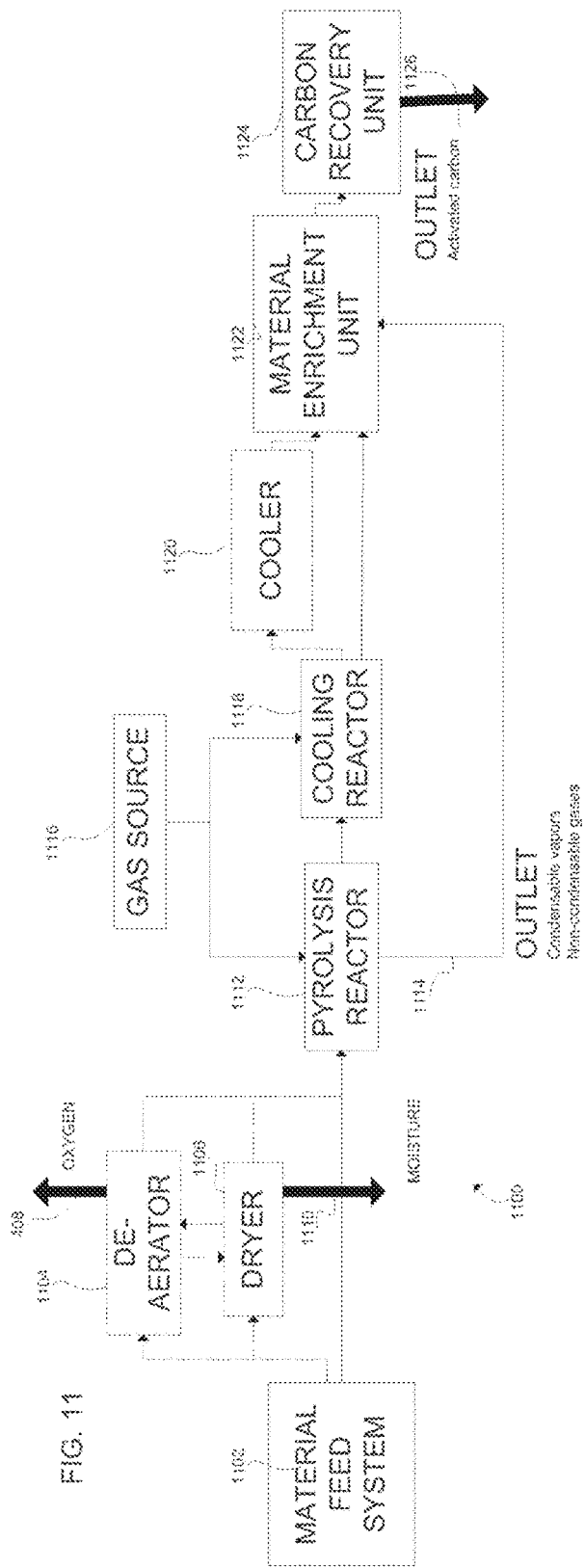
FIG. 11 depicts a multiple-reactor system embodiment of the invention with an optional dryer and cooler, and a material enrichment unit.
Figure 12:
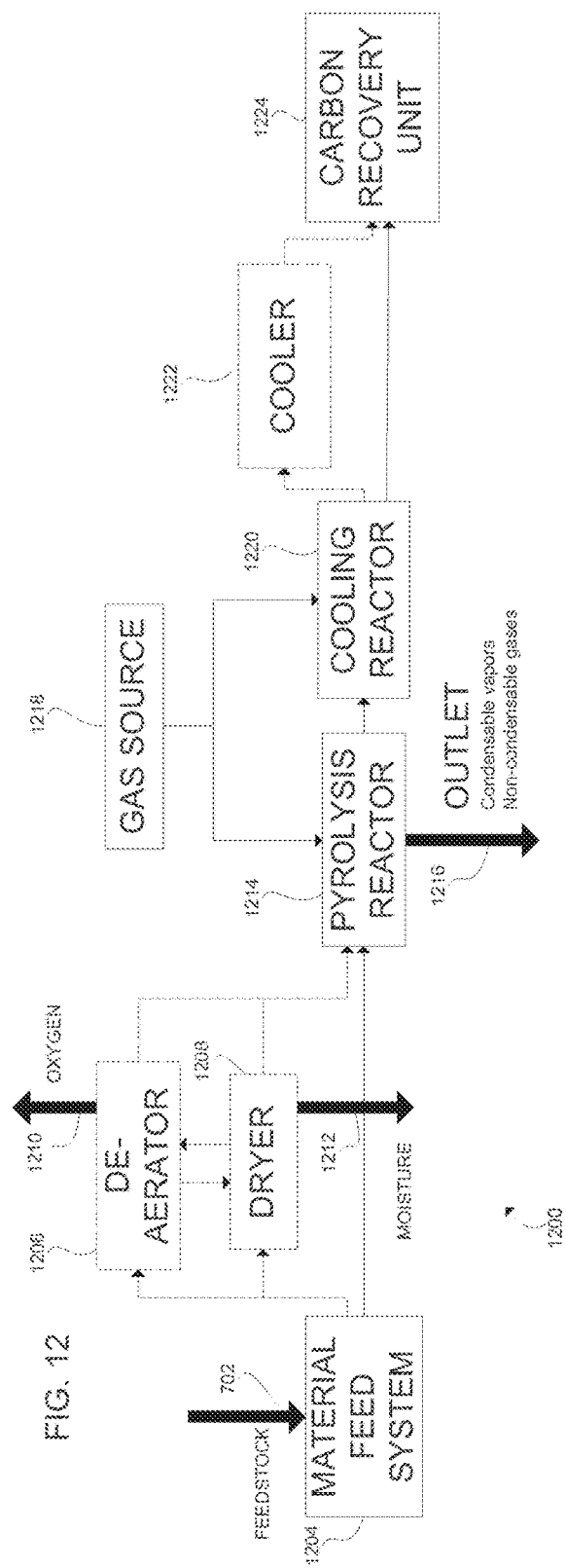
FIG. 12 depicts a multiple-reactor system embodiment of the invention with an optional dryer, de-aerator, a cooler, and an inert gas inlet.
Figure 13:
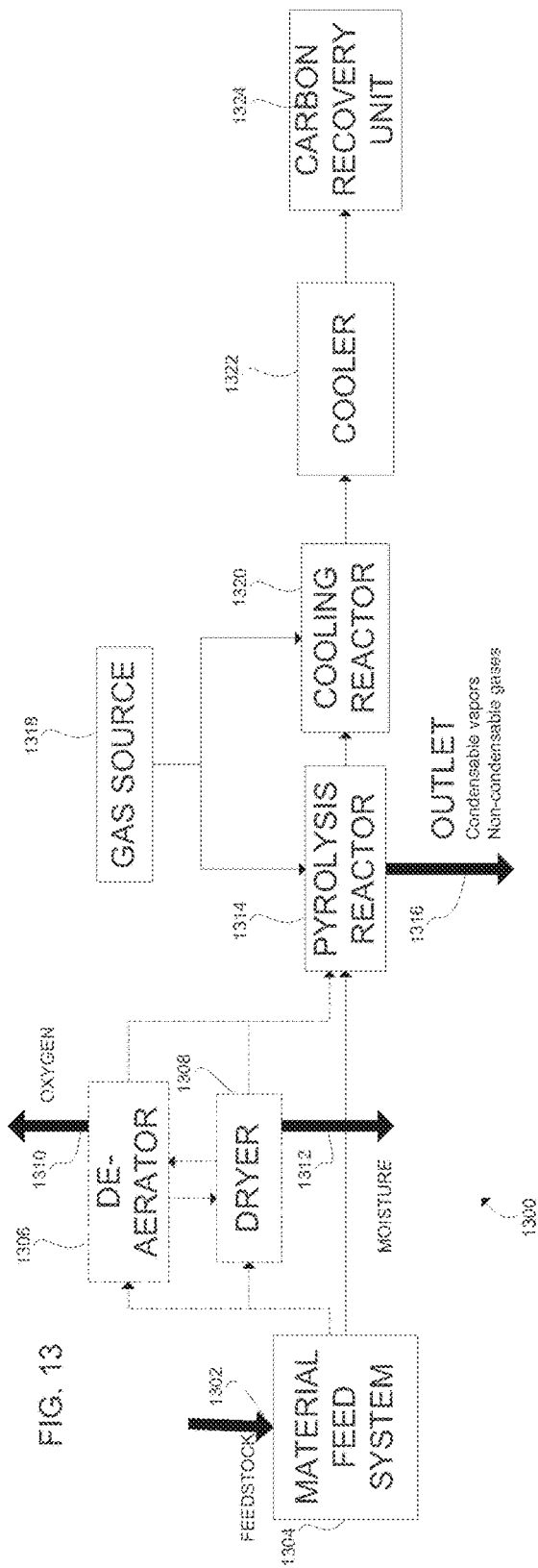
FIG. 13 depicts a multiple-reactor system embodiment of the invention with an optional dryer and de-aerator, an inert gas inlet, and a cooler.

Referring now to FIG. 11 a multiple reactor system 1100 of one embodiment is illustrated. Similar to the embodiment discussed above and illustrated in FIG. 10, this embodiment includes a material feed system 1102, pyrolysis reactor 1112, cooling reactor 1118, and carbon recovery unit 1124 In the illustrated embodiment of FIG. 11, the cooler 1120 is optional, and a material enrichment unit 1122 is disposed between the optional cooler 1120 and the carbon recovery unit 1124. It should be appreciated that, in various embodiments, the material enrichment unit 1122 enriches the material before it continues into the separate carbon recovery unit 1124, which may or may not further enrich the material. In various embodiments, an optional deaerator 1104 and an optional dryer 1106 are disposed between the material feed system 1102 and the pyrolysis reactor 1112. In the illustrated embodiment, the pyrolysis reactor 1112 also includes an outlet 1114 configured to remove substances such as condensable vapors and non-condensable gases, and route the removed substances to the material enrichment unit 1122.

Various embodiments extend the concept of additional carbon formation by including a separate material enrichment unit 818, 1122 in which cooled carbon is subjected to an environment including carbon-containing species, to enrich the carbon content of the final product. When the temperature of this unit is below pyrolysis temperatures, the additional carbon is expected to be in the form of adsorbed carbonaceous species, rather than additional fixed carbon As will be described in detail below, there are a large number of options as to intermediate input and output (purge or probe) streams of one or more phases present any particular reactor, various mass and energy recycle schemes, various additives that may be introduced anywhere in the process, adjustability of process conditions including both reaction and separation conditions in order to tailor product distributions, and so on. Zone or reactor-specific input and output streams enable good process monitoring and control, such as through FTIR sampling and dynamic process adjustments.

The present disclosure is different than fast pyrolysis, and it is different than conventional slow pyrolysis. High-quality carbon materials in the present disclosure, including compositions with high fractions of fixed carbon, may be obtained from the disclosed processes and systems.

"Biomass," for purposes of this disclosure, shall be construed as any biogenic feedstock or mixture of a biogenic and non-biogenic feedstock. Elementally, biomass includes at least carbon, hydrogen, and oxygen. The methods and apparatus of the invention can accommodate a wide range of feedstocks of various types, sizes, and moisture contents.

Biomass includes, for example, plant and plant-derived material, vegetation, agricultural waste, forestry waste, wood waste, paper waste, animal-derived waste, poultry-derived waste, and municipal solid waste. In various embodiments of the invention utilizing biomass, the biomass feedstock may include one or more materials selected from: timber harvesting residues, softwood chips, hardwood chips, tree branches, tree stumps, knots, leaves, bark, sawdust, off-spec paper pulp, cellulose, corn, corn stover, wheat straw, rice straw, sugarcane bagasse, switchgrass, *miscanthus*, animal manure, municipal garbage, municipal sewage, commercial waste, grape pumice, almond shells, pecan shells, coconut shells, coffee grounds, grass pellets, hay pellets, wood pellets, cardboard, paper, carbohydrates, plastic, and cloth. A person of ordinary skill in the art will readily appreciate that the feedstock options are virtually unlimited.

Various embodiments of the present disclosure are also be used for containing feedstocks other than biomass, such as a fossil fuel (e.g., coal or petroleum coke), or any mixtures of biomass and fossil fuels (such as biomass/coal blends). In embodiments, a biogenic feedstock is, or includes, coal, oil shale, crude oil, asphalt, or solids from crude-oil processing (such as petcoke). Feedstocks may include waste tires, recycled plastics, recycled paper, and other waste or recycled materials. Any method, apparatus, or system described herein may be used with any carbonaceous feedstock Carbon-containing feedstocks may be transportable by any known means, such as by train, ship, barge, tractor trailer, or any other vehicle or means of conveyance.

Selection of a particular feedstock or feedstocks is not regarded as technically critical, but is carried out in a manner that tends to favor an economical process. Typically, regardless of the feedstocks chosen, there can be (in some embodiments) screening to remove undesirable materials. The feedstock can optionally be dried prior to processing.

The feedstock employed may be provided or processed into a wide variety of particle sizes or shapes. For example, the feed material may be a fine powder, or a mixture of fine and coarse particles. The feed material may be in the form of large pieces of material, such as wood chips or other forms of wood (e.g., round, cylindrical, square, etc.). In some embodiments, the feed material comprises pellets or other agglomerated forms of particles that have been pressed together or otherwise bound, such as with a binder.

It is noted that size reduction is a costly and energy-intensive process. Pyrolyzed material can be sized with significantly less energy input, i.e. it can be more energy efficient to reduce the particle size of the product, not the feedstock. This is an option in the present disclosure because the process does not require a fine starting material, and there is not necessarily any particle-size reduction during processing. The present disclosure provides the ability to process very large pieces of feedstock. Notably, many market applications of the high-carbon product actually require large sizes (e.g., on the order of centimeters), so that in some embodiments, large pieces are fed, produced, and sold. It should be appreciated that, while not necessary in all embodiments of this disclosure, smaller sizing has resulted in higher fixed carbon numbers under similar process conditions and may be preferred in some embodiments.

When it is desired to produce a final carbonaceous biogenic reagent that structural integrity, such as in the form of cylinders, there are at least two options in the context of this invention. First, the material produced from the process is collected and then further process mechanically into the desired form. For example, the product is pressed or pelletized, with a binder The second option is to utilize feed materials that generally possess the desired size and/or shape for the final product, and employ processing steps that do not destroy the basic structure of the feed material. In some embodiments, the feed and product have similar geometrical shapes, such as spheres, cylinders, or cubes.

The ability to maintain the approximate shape of feed material throughout the process is beneficial when product strength is important. Also, this control avoids the difficulty and cost of pelletizing high fixed-carbon materials.

The starting feed material in various embodiments is provided with a range of moisture levels, as will be appreciated. In some embodiments, the feed material is already sufficiently dry that it need not be further dried before pyrolysis. Typically, it will be desirable to utilize commercial sources of biomass which will usually contain moisture, and feed the biomass through a drying step before introduction into the pyrolysis reactor. However, in some embodiments a dried feedstock is used. It should be appreciated that, in various embodiments, while any biomass works, the following factors may impact the process and its products: how material is grown, harvested, irrigated, material species selection and carbon content. Particularly, in various embodiments, low fertilizer and low phosphorous used in growing results in better properties for metal making. In various embodiments, low impact shearing during harvest results in greater strength. In various embodiments, less irrigation and smaller growth rings may result in greater strength.

It should be appreciated that, in various embodiments additives and/or catalysts are included in the BPU, and temperature profiles within the BPU are selected to promote production of carbon dioxide over carbon monoxide, leading to greater fixed carbon in the final product.

It is desirable to provide a relatively low-oxygen environment in the pyrolysis reactor, such as about 10 wt %, 5 wt %, 3 wt %, or 1 wt % $O_2$ in the gas phase. First, uncontrolled combustion should be avoided in the pyrolysis reactor, for safety reasons Some amount of total carbon oxidation to $CO_2$ may occur, and the heat released from the exothermic oxidation may assist the endothermic pyrolysis chemistry. Large amounts of oxidation of carbon, including partial oxidation to syngas, will reduce the carbon yield to solids.

Practically speaking, it can be difficult to achieve a strictly oxygen-free environment in each of the reactor(s) or the BPU. This limit can be approached, and in some embodiments, the reactor(s) or the BPU is substantially free of molecular oxygen in the gas phase. To ensure that little or no oxygen is present in the reactor(s) or BPU, it be desirable to remove air from the feed material before it is introduced to the reactor(s) the BPU. There are various ways to remove or reduce air in the feedstock.

In some embodiments, as seen in FIGS. 10, 11, 12 and 13, a deaeration unit is utilized in which feedstock, before or after drying, is conveyed in the presence of another gas which can remove adsorbed oxygen and penetrate the feedstock pores to remove oxygen from the pores. Most gases that have lower than 21 vol % $O_2$ may be employed, at varying effectiveness. In some embodiments, nitrogen is employed. In some embodiments, CO and/or $CO_2$ is employed. Mixtures may be used, such as a mixture of nitrogen and a small amount of oxygen. Steam may be present in the deaeration gas, although adding significant moisture back to the feed should be avoided. The effluent from the deaeration unit may be purged (to the atmosphere or to an emissions treatment unit) or recycled.

In principle, the effluent (or a portion thereof) from the deaeration unit could be introduced into the pyrolysis reactor itself since the oxygen removed from the solids will now be highly diluted. In this embodiment, it may be advantageous to introduce the deaeration effluent gas to the last zone of the reactor, when it is operated in a countercurrent configuration.

Various types of deaeration units may be employed. In one embodiment, if drying it to be performed, deaerating after drying prevents the step of scrubbing soluble oxygen out of the moisture present. In certain embodiments, the drying and deaerating steps are combined into a single unit, or some amount of deaeration is achieved during drying.

The optionally dried and optionally deaerated feed material is introduced to a pyrolysis reactor or multiple reactors in series or parallel. The material feed system in various embodiments introduces the feedstock using any known means, including screw material feed systems or lock hoppers, for example. In some embodiments, a material feed system incorporates an airlock When a single reactor is employed (such as in FIG. 6, 3 or 4), multiple zones can be present. Multiple zones, such as two, three, four, or more zones, can allow the separate control of temperature, solids residence time, gas residence time, gas composition, flow pattern, and/or pressure in order to adjust the overall process performance.

As discussed above, references to "zones" shall be broadly construed to include regions of space within a single physical unit (such as in FIG. 6, 8 or 9), physically separate units (such as in FIGS. 7 and 10 to 13), or any combination thereof. For a BPU, the demarcation of zones within that BPU may relate to structure, such as the presence of flights within the BPU or distinct heating elements to provide heat to separate zones. Alternatively, or additionally, in various embodiments, the demarcation of zones in a BPU relates to function, such as at least: distinct temperatures, fluid flow patterns, solid flow patterns, and extent of reaction. In a single batch reactor, "zones" are operating regimes in time, rather than in space. Various embodiments include the use of multiple batch BPUs.

It will be appreciated that there are not necessarily abrupt transitions from one zone to another zone. For example, the boundary between the preheating zone and pyrolysis zone may be somewhat arbitrary; some amount of pyrolysis may take place in a portion of the preheating zone, and some amount of "preheating" may continue to take place in the pyrolysis zone. The temperature profile in the BPU is typically continuous, including at zone boundaries within the zone.

Some embodiments, as seen for example in FIG. 9, employ a pre-heat zone 304 that is operated under conditions of preheating and/or mild pyrolysis. In various embodiments, the temperature of the pre-heat zone 304 is from about 80° C. to about 500° C., such as about 300° C. to about 400° C. In various embodiments, the temperature of the pre-heat zone 304 is not so high as to shock the biomass material which ruptures the cell walls and initiates fast decomposition of the solid phase into vapors and gases. Pyrolysis commonly known as fast or flash pyrolysis is avoided in the present disclosure.

All references to zone temperatures in this specification should be construed in a non-limiting way to include temperatures that may apply to the bulk solids present, or the gas phase, or the reactor or BPU walls (on the process side). It will be understood that there will be a temperature gradient in each zone, both axially and as well as temporally (i.e., following start-up or due to transients). Thus, references to temperatures may be references to average temperatures or other effective temperatures that may influence the actual kinetics. Temperatures may be directly measured by thermocouples or other temperature probes, or indirectly measured or estimated by other means.

The second zone, or the primary pyrolysis zone, is operated under conditions of pyrolysis or carbonization. The temperature of the pyrolysis zone may be selected from about 250° C. to about 700° C., such as about 300° C., 350° C., 400° C., 450° C., 500° C., 550° C., 600° C., or 650° C. Within this zone, preheated biomass undergoes pyrolysis chemistry to release gases and condensable vapors, leaving a significant amount of solid material as a high-carbon reaction intermediate. Biomass components (primarily cellulose, hemicellulose, and lignin) decompose and create vapors, which escape by penetrating through pores or creating new pores. The temperature will at least depend on the residence time of the pyrolysis zone, as well as the nature of the feedstock and product properties.

The cooling zone is operated to cool down the high-carbon reaction intermediate to varying degrees. In various embodiments, the temperature of the cooling zone is a lower temperature than that of the pyrolysis zone. In various embodiments, the temperature of the cooling zone is selected from about 100° C. to about 550° C., such as about 150° C. to about 350° C.

In various embodiments, chemical reactions continue to occur in the cooling zone. It should be appreciated that in various embodiments, secondary pyrolysis reactions are initiated in the cooling zone. Carbon-containing components that are in the gas phase can condense (due to the reduced temperature of the cooling zone). The temperature remains sufficiently high, however, to promote reactions that may form additional fixed carbon from the condensed liquids (secondary pyrolysis) or at least form bonds between adsorbed species and the fixed carbon. One exemplary reaction that may take place is the conversion of carbon monoxide to carbon dioxide plus fixed carbon (Boudouard reaction)

The residence times of the zones may vary. For a desired amount of pyrolysis, higher temperatures may allow for lower reaction times, and vice versa The residence time in a continuous BPU (reactor) is the volume divided by the volumetric rate. The residence time in a batch reactor is the batch reaction time, following heating to reaction temperature.

It should be recognized that in multiphase BPUs, there are multiple residence times. In the present context, in each zone, there will be a residence time (and residence-time distribution) of both the solids phase and the vapor phase. For a given apparatus employing multiple zones, and with a given throughput, the residence times across the zones will generally be coupled on the solids side, but residence times may be uncoupled on the vapor side when multiple inlet and outlet ports are utilized in individual zones. In various embodiments, the solids and vapor residence times are uncoupled.

The solids residence time of the preheating zone may be selected from about 5 min to about 60 min, such as about 10 min depending on the temperature and time required to reach a preheat temperature. The heat-transfer rate, which will depend on the particle type and size, the physical apparatus, and on the heating parameters, will dictate the minimum residence time necessary to allow the solids to reach a predetermined preheat temperature.

The solids residence time of the pyrolysis zone may be selected from about 10 min to about 120 min, such as about 20 min, 30 min, or 45 min. Depending on the pyrolysis temperature in this zone, there should be sufficient time to allow the carbonization chemistry to take place, following the necessary heat transfer. For times below about 10 min, in order to remove high quantities of non-carbon elements, the temperature would need to be quite high, such as above 700° C. This temperature would promote fast pyrolysis and its generation of vapors and gases derived from the carbon itself, which is to be avoided when the intended product is solid carbon.

In a static system of various embodiments, an equilibrium conversion is reached at a certain time. When, as in certain embodiments, vapor is continuously flowing over solids with continuous volatiles removal, the equilibrium constraint may be removed to allow for pyrolysis and devolatilization to continue until reaction rates approach zero. Longer times would not tend to substantially alter the remaining recalcitrant solids.

The solids residence time of the cooling zone in various embodiments may be selected from about 5 min to about 60 min, such as about 30 min. Depending on the cooling temperature in this zone, there should be sufficient time to allow the carbon to cool to the desired temperature. The cooling rate and temperature will dictate the minimum residence time necessary to allow the carbon to be cooled. Additional time not be desirable, unless some amount of secondary pyrolysis is desired.

As discussed above, the residence time of the vapor phase may be separately selected and controlled. The vapor residence time of the preheating zone may be selected from about 0.1 min to about 10 min, such as about 1 min. The vapor residence time of the pyrolysis zone may be selected from about 0.1 min to about 20 min, such as about 2 min. The vapor residence time of the cooling zone may be selected from about 0.1 min to about 15 min, such as about 1.5 min. Short vapor residence times promote fast sweeping of volatiles out of the system, while longer vapor residence times promote reactions of components in the vapor phase with the solid phase.

The mode of operation for the reactor, and overall system, may be continuous, semi-continuous, batch, or any combination or variation of these. In some embodiments, the BPU is a continuous, countercurrent reactor in which solids and vapor flow substantially in opposite directions. The BPU may also be operated in batch but with simulated countercurrent flow of vapors, such as by periodically introducing and removing gas phases from the batch vessel.

Various flow patterns may be desired or observed. With chemical reactions and simultaneous separations involving multiple phases in multiple zones, the fluid dynamics can be quite complex. Typically, the flow of solids may approach plug flow (well-mixed in the radial dimension) while the flow of vapor may approach fully mixed flow (fast transport in both radial and axial dimensions). Multiple inlet and outlet ports for vapor may contribute to overall mixing.

The pressure in each zone may be separately selected and controlled. The pressure of each zone may be independently selected from about 1 kPa to about 3000 kPa, such as about 101.3 kPa (normal atmospheric pressure). Independent zone control of pressure is possible when multiple gas inlets and outlets are used, including vacuum ports to withdraw gas when a zone pressure less than atmospheric is desired. Similarly, in a multiple reactor system, the pressure in each reactor may be independently selected and controlled The process may conveniently be operated at atmospheric pressure, in some embodiments. There are many advantages associated with operation at atmospheric pressure, ranging from mechanical simplicity to enhanced safety. In certain embodiments, the pyrolysis zone is operated at a pressure of about 90 kPa, 95 kPa, 100 kPa, 101 kPa, 102 kPa, 105 kPa, or 110 kPa (absolute pressures)

Vacuum operation (e.g., 10-100 kPa) would promote fast sweeping of volatiles out of the system. Higher pressures (e.g., 100-1000 kPa) may be useful when the off-gases will be fed to a high-pressure operation. Elevated pressures may also be useful to promote heat transfer, chemistry, or separations.

The step of separating at least a portion of the condensable vapors and at least a portion of the non-condensable gases from the hot pyrolyzed solids may be accomplished in the reactor itself, or using a distinct separation unit. A substantially inert sweep gas may be introduced into one or more of the zones. Condensable vapors and non-condensable gases are then carried away from the zone (s) in the sweep gas, and out of the BPU.

The sweep gas may be $NO_2$, Ar, CO, $CO_2$, $H_2$, $H_2O$, $CH_4$, other light hydrocarbons, or combinations thereof, for example. The sweep gas may first be preheated prior to introduction, or possibly cooled if it is obtained from a heated source.

The sweep gas more thoroughly removes volatile components, by getting them out of the system before they can condense or further react. The sweep gas allows volatiles to be removed at higher rates than would be attained merely from volatilization at a given process temperature. Or, use of the sweep gas allows milder temperatures to be used to remove a certain quantity of volatiles The reason the sweep gas improves the volatiles removal is that the mechanism of separation is not merely relative volatility but rather liquid/vapor phase disengagement assisted by the sweep gas. The sweep gas can both reduce mass-transfer limitations of volatilization as well as reduce thermodynamic limitations by continuously depleting a given volatile species, to cause more of it to vaporize to attain thermodynamic equilibrium.

It is important to remove gases laden with volatile organic carbon from subsequent processing stages, in order to produce a product with high fixed carbon Without removal, the volatile carbon can adsorb or absorb onto the pyrolyzed solids, thereby requiring additional energy (cost) to achieve a purer form of carbon which may desired. By removing vapors quickly, it is also speculated that porosity may be enhanced in the pyrolyzing solids. In various embodiments, such as activated carbon products, higher porosity is desirable.

In certain embodiments, the sweep gas in conjunction with a relatively low process pressure, such as atmospheric pressure, provides for fast vapor removal without large amounts of inert gas necessary.

In some embodiments, the sweep gas flows countercurrent to the flow direction of feedstock. In other embodiments, the sweep gas flows cocurrent to the flow direction of feedstock. In some embodiments, the flow pattern of solids approaches plug flow while the flow pattern of the sweep gas, and gas phase generally, approaches fully mixed flow in one or more zones.

The sweep may be performed in any one or more of the zones. In some embodiments, the sweep gas is introduced into the cooling zone and extracted (along with volatiles produced) from the cooling and/or pyrolysis zones In some embodiments, the sweep gas is introduced into the pyrolysis zone and extracted from the pyrolysis and/or preheating zones. In some embodiments, the sweep gas is introduced into the preheating zone and extracted from the pyrolysis zone. In these or other embodiments, the sweep gas may be introduced into each of the preheating, pyrolysis, and cooling zones and also extracted from each of the zones.

In some embodiments, the zone or zones in which separation is carried out is a physically separate unit from the BPU. The separation unit or zone may be disposed between zones, if desired. For example, there may be a separation unit placed between pyrolysis and cooling zones.

The sweep gas may be introduced continuously, especially when the solids flow is continuous. When the pyrolysis reaction is operated as a batch process, the sweep gas may be introduced after a certain amount of time, or periodically, to remove volatiles. Even when the pyrolysis reaction is operated continuously, the sweep gas may be introduced semi-continuously or periodically, if desired, with suitable valves and controls.

The volatiles-containing sweep gas may exit from the one or more zones, and may be combined if obtained from multiple zones The resulting gas stream, containing various vapors, may then be fed to a process gas heater for control of air emissions, as discussed above and illustrated in FIG. 8. Any known thermal-oxidation may be employed. In some embodiments, the process gas heater is fed with natural gas air, to reach sufficient temperatures for substantial destruction of volatiles contained therein.

The effluent of the process gas heater will be a hot gas stream comprising water, carbon dioxide, and nitrogen. This effluent stream may be purged directly to air emissions, if desired. In some embodiments, the energy content of the process gas heater effluent is recovered, such as in a waste-heat recovery unit. The energy content may also be recovered by heat exchange with another stream (such as the sweep gas). The energy content may be utilized by directly or indirectly heating, or assisting with heating, a unit elsewhere in the process, such as the dryer or the reactor. In some embodiments, essentially all of the process gas heater effluent is employed for indirect heating (utility side) of the dryer. The process gas heater may employ other fuels than natural gas.

The yield of carbonaceous material may vary, depending on the above-described factors including type of feedstock and process conditions. In some embodiments, the net yield of solids as a percentage of the starting feedstock, on a dry basis, is at least 25%, 30%, 35%, 40%, 45%, 50%, or higher. The remainder will be split between condensable vapors, such as terpenes, tars, alcohols, acids, aldehydes, or ketones; and non-condensable gases, such as carbon monoxide, hydrogen, carbon dioxide, and methane. The relative amounts of condensable vapors compared to non-condensable gases will also depend on process conditions, including the water present.

In terms of the carbon balance, in some embodiments the net yield of carbon as a percentage of starting carbon in the feedstock is at least 25%, 30%, 40%, 50%, 60%, 70%, or higher. For example, the in some embodiments the carbonaceous material contains between about 40% and about 70% of the carbon contained in the starting feedstock. The rest of the carbon results in the formation of methane, carbon monoxide, carbon dioxide, light hydrocarbons, aromatics, tars, terpenes, alcohols, acids, aldehydes, or ketones, to varying extents.

In alternative embodiments, some portion of these compounds is with the carbon-rich solids to enrich the carbon and energy content of the product. In embodiments, some or all of the resulting gas stream from the reactor, containing various vapors, may be condensed, at least in part, and then passed over cooled pyrolyzed solids derived from the cooling zone and/or from the separate cooler. These embodiments are described in more detail below.

Following the reaction and cooling within the cooling zone (if present), the carbonaceous solids may be introduced into a cooler. In some embodiments, solids are collected and simply allowed to cool at slow rates. If the carbonaceous solids are reactive or unstable in air, it may be desirable to maintain an inert atmosphere and/or rapidly cool the solids to, for example, a temperature less than 40° C., such as ambient temperature. In some embodiments, a water quench is employed for rapid cooling. In some embodiments, a fluidized-bed cooler is employed. A "cooler" should be broadly construed to also include containers, tanks, pipes, or portions thereof. It should be appreciated that in various embodiments, the cooler is distinct from the cooling unit or cooling reactor.

In some embodiments, the process further comprises operating the cooler to cool the warm pyrolyzed solids with steam, thereby generating the cool pyrolyzed solids and superheated steam; wherein the drying is carried out, at least in part, with the superheated steam derived from the cooler. Optionally, the cooler may be operated to first cool the warm pyrolyzed solids with steam to reach a first cooler temperature, and then with air to reach a second cooler temperature, wherein the second cooler temperature is lower than the first cooler temperature and is associated with a reduced combustion risk for the warm pyrolyzed solids in the presence of the air.

Following cooling to ambient conditions, the carbonaceous solids may be recovered and stored, conveyed to another site operation, transported to another site, or otherwise disposed, traded, or sold. The solids may be fed to a unit to reduce particle size. A variety of size-reduction units are known in the art, including crushers, shredders, grinders, pulverizers, jet mills, pin mills, and ball mills Screening or some other means for separation based on particle size may included. The screening may be upstream or downstream of grinding, if present. A of the screened material (e.g., large chunks) may be returned to the grinding unit. The small and large particles may be recovered for separate downstream uses. In some embodiments, cooled pyrolyzed solids are ground into a fine powder, such as a carbon or activated carbon product or increased strength.

Various additives may be introduced throughout the process, before, during, or after any step disclosed herein. The additives may be broadly classified as process additives, selected to improve process performance such as carbon yield or pyrolysis time/temperature to achieve a desired carbon purity; and product additives, selected to improve one or more properties of the high-carbon biogenic reagent, or a downstream product incorporating the reagent. Certain additives may provide enhanced process and product characteristics, such as overall yield of biogenic reagent compared to the amount of biomass feedstock.

Additives may be added before, during, or after any one or more steps of the process, including into the feedstock itself at any time, before or after it is harvested. Additive treatment may be incorporated prior to, during or after feedstock sizing, drying, or other preparation. Additives may be incorporated at or on feedstock supply facilities, transport trucks, unloading equipment, storage bins, conveyors (including open or closed conveyors), dryers, process heaters, or any other units. Additives may be added anywhere into the pyrolysis process itself, using suitable means for introducing additives. Additives may be added after carbonization, or even after pulverization, if desired.

In some embodiments, an additive is selected from a metal, a metal oxide, a metal hydroxide, or a combination thereof. For example an additive may be selected from, but is by no means limited to, magnesium, manganese, aluminum, nickel, chromium, silicon, boron, cerium, molybdenum, phosphorus, tungsten, vanadium, iron halide, iron chloride, iron bromide, magnesium oxide, dolomite, dolomitic lime, fluorite, fluorospar, bentonite, calcium oxide, lime, and combinations thereof.

In some embodiments, an additive is selected from an acid, a base, or a salt thereof. For example an additive may be selected from, but is by no means limited to, sodium hydroxide, potassium hydroxide, magnesium oxide, hydrogen bromide, hydrogen chloride, sodium silicate, potassium permanganate, or combinations thereof.

In some embodiments, an additive is selected from a metal halide Metal halides are compounds between metals and halogens (fluorine, chlorine, bromine, iodine, and astatine). The halogens can form many compounds with metals Metal halides are generally obtained by direct combination, or more commonly, neutralization of basic salt with a hydrohalic acid. In some embodiments, an additive is selected from iron (FeX2 and/or FeX3), iron chloride ($FeCl_2$ and/or FeCl₃), iron bromide (FeBr2 and/or FeBr3), or hydrates thereof, and any combinations thereof.

Additives may result in a final product with higher energy content (energy density). An increase in energy content may result from an increase in total carbon, fixed carbon, volatile carbon, or even hydrogen. Alternatively or additionally, the increase in energy content may result from removal of non-combustible matter or of material having lower energy density than carbon in some embodiments, additives reduce the extent of liquid formation, in favor of solid and gas formation, or in favor of solid formation.

In various embodiments, additives chemically modify the starting biomass, or the treated biomass prior to pyrolysis, to reduce rupture of cell walls for greater strength/integrity. In some embodiments, additives may increase fixed carbon content of biomass feedstock prior to pyrolysis.

Additives may result in a final biogenic reagent with improved mechanical properties, such as yield strength, compressive strength, tensile strength, fatigue strength, impact strength, elastic modulus, bulk modulus, or shear modulus. Additives may improve mechanical properties by simply being present (e.g., the additive itself imparts strength to the mixture) or due to some transformation that takes place within the additive phase or within the resulting mixture. For example, reactions such as vitrification may occur within a portion of the biogenic reagent that includes the additive, thereby improving the final strength.

Chemical additives may be applied to wet or dry biomass feedstocks. The additives may be applied as a solid powder, a spray, a mist, a liquid, or a vapor. In some embodiments, additives may be introduced through spraying of a liquid solution (such as an aqueous solution or in a solvent), or by soaking in tanks, bins, bags, or other containers.

In certain embodiments, dip pretreatment is employed wherein the solid feedstock is dipped into a bath comprising the additive, either batchwise or continuously, for a time sufficient to allow penetration of the additive into the solid feed material.

In some embodiments, additives applied to the feedstock may reduce energy requirements for the pyrolysis, and/or increase the yield of the carbonaceous product. In these or other embodiments, additives applied to the feedstock may provide functionality that is desired for the intended use of the carbonaceous product, as will be further described below regarding compositions.

The throughput, or process capacity, may vary widely from small laboratory-scale units to full commercial-scale biorefineries, including any pilot, demonstration, or semi-commercial scale. In various embodiments, the process capacity is at least about 1 kg/day, 10 kg/day, 100 kg/day, 1 ton/day (all tons are metric tons), 10 tons/day, 100 tons/day, 500 tons/day, 1000 tons/day, 2000 tons/day, or higher.

In some embodiments, a portion of solids produced may be recycled to the front end of the process, i.e. to the drying or deaeration unit or directly to the BPU or reactor. By returning to the front end and passing through the process again, treated solids may become higher in fixed carbon. Solid, liquid, and gas streams produced or existing within the process can be independently recycled, passed to subsequent steps, or removed/purged from the process at any point.

In some embodiments, pyrolyzed material is recovered and then fed to a separate reactor for further pyrolysis, to create a product with higher carbon purity. In some embodiments, the secondary process may be conducted in a simple container, such as a steel drum, in which heated inert gas (such as heated N2) is passed through. Other containers useful for this purpose include process tanks, barrels, bins, totes, sacks, and roll-offs. This secondary sweep gas with volatiles may be sent to the process gas heater, or back to the main BPU, for example. To cool the final product, another stream of inert gas, which is initially at ambient temperature for example, may be passed through the solids to cool the solids, and then returned to an inert gas preheat system. In various embodiments, the secondary process takes place in a separate carbonization or pyrolysis reactor, in which preheated substantially inert gas is inputted to pyrolyze the material and drive carbonization.

Some variations of the invention provide a high-carbon biogenic reagent production system comprising:

(a) a material feed system configured to introduce a carbon-containing feedstock;

(b) an optional dryer, disposed in operable communication with the material feed system, configured to remove moisture contained within a carbon-containing feedstock;

(c) a biomass processing unit including a plurality of zones, disposed in operable communication with the dryer, wherein the biomass processing unit contains at least a pyrolysis zone disposed in operable communication with a spatially separated cooling zone, and wherein the biomass processing unit is configured with an outlet to remove condensable vapors and non-condensable gases from solids;

(d) an external cooler, disposed in operable communication with the biomass processing unit; and (e) a carbon recovery unit, disposed in operable communication with the cooler.

Some variations provide a high-carbon biogenic reagent production system comprising:

(a) a material feed system configured to introduce a carbon-containing feedstock;

(b) an optional dryer, disposed in operable communication with the material feed system, configured to remove moisture contained within a carbon-containing feedstock;

(c) an optional preheater, disposed in operable communication with the dryer, configured to heat and/or mildly pyrolyze the feedstock;

(d) a pyrolysis reactor, disposed in operable communication with the preheater, configured to pyrolyze the feedstock;

(e) a cooler, disposed in operable communication with the pyrolysis reactor, configured to cool pyrolyzed solids; and (f) a carbon recovery unit, disposed in operable communication with the cooler, wherein the system is configured with at least one gas outlet to remove condensable vapors and non-condensable gases from solids The material feed system may be physically integrated with the BPU, such as through the use of a screw material feed system or auger mechanism to introduce feed solids into one of the reactors or zones.

In some embodiments, the system further comprises a preheating zone, disposed in operable communication with the pyrolysis zone. Each of the pyrolysis zone, cooling zone, and preheating zone (it present) may be located within a single BPU, or may be located in separate BPUs Optionally, the dryer may be configured as a drying zone within the BPU. Optionally, the cooler may be disposed within the BPU (i.e., configured as an additional cooling zone or integrated with the cooling zone discussed above).

The system may include a purging means for removing oxygen from the system. For example, the purging means may comprise one or more inlets to introduce a substantially inert gas, and one or more outlets to remove the substantially inert gas and displaced oxygen from the system. In some embodiments, the purging means is a deaerater disposed in operable communication between the dryer and the BPU.

The BPU can be configured with at least a first gas inlet and a first gas outlet. The first gas inlet and the first gas outlet may be disposed in communication with different zones, or with the same zones.

In some embodiments, the BPU is configured with a second gas inlet and/or a second gas outlet. In some embodiments, the BPU is configured with a third gas inlet and/or a third gas outlet. In some embodiments, the BPU is configured with a fourth gas inlet and/or a fourth gas outlet. In some embodiments, each zone present in the BPU is configured with a gas inlet and a gas outlet.

Gas inlets and outlets allow not only introduction and withdrawal of vapor, but gas outlets (probes) in particular allow precise process monitoring and control across various stages of the process, up to and potentially including all stages of the process. Precise process monitoring would be expected to result in yield and efficiency improvements, both dynamically as well as over a period of time when operational history can be utilized to adjust process conditions.

In some embodiments (see, generally, FIG. 4), a reaction gas probe is disposed in operable communication with the pyrolysis zone. Such a reaction gas probe may be useful to extract gases and analyze them, in order to determine extent of reaction, pyrolysis selectivity, or other process monitoring. Then, based on the measurement, the process may be controlled or adjusted in any number of ways, such as by adjusting feed rate, rate of inert gas sweep, temperature (of one or more zones), pressure (of one or more zones), additives, and so on.

As intended herein, "monitor and control" via reaction gas probes should construed to include any one or more sample extractions via reaction gas probes, and optionally making process or equipment adjustments based on the measurements, if deemed necessary or desirable, using well-known principles of process control (feedback, feedforward, proportional-integral-derivative logic, etc.).

A reaction gas probe may be configured to extract gas samples in a number of ways. For example, a sampling line may have a lower pressure than the pyrolysis reactor pressure, so that when the sampling line is opened an amount of gas can readily be extracted from pyrolysis zone. The sampling line may be under vacuum, such as when the pyrolysis zone is near atmospheric pressure. Typically, a reaction gas probe will be associated with one gas output, or a portion thereof (e.g., a line split from a gas output line).

In some embodiments, both a gas input and a gas output are utilized as a reaction gas probe by periodically introducing an inert gas into a zone, and pulling the inert gas with a process sample out of the gas output ("sample sweep"). Such an arrangement could be used in a zone that does not otherwise have a gas inlet/outlet for the substantially inert gas for processing, or, the reaction gas probe could be associated with a separate gas inlet/outlet that is in addition to process inlets and outlets. A sampling inert gas that is introduced and extracted periodically for sampling (in embodiments that utilize sample sweeps) could even be different than the process inert gas, if desired, either for reasons of accuracy in analysis or to introduce an analytical tracer.

For example, acetic acid concentration in the gas phase of the pyrolysis zone may be measured using a gas probe to extract a sample, which is then analyzed using a suitable technique (such as gas chromatography, GC; mass spectroscopy, MS; GC-MS, or Fourier-Transform Infrared Spectroscopy, FTIR). CO and/or CO2 concentration in the gas phase could be measured and used as an indication of the pyrolysis selectivity toward gases/vapors, for example. Terpene concentration in the gas phase could be measured and used as an indication of the pyrolysis selectivity toward liquids, and son on.

In some embodiments, the system further comprises at least one additional gas probe disposed in operable communication with the cooling zone, or with the drying zone (if present) or the preheating zone (if present).

A gas probe for the cooling zone could be useful to determine the extent of any additional chemistry taking place in the cooling zone, for example. A gas probe in cooling zone could also be useful as an independent measurement of temperature (in addition, for example, to a thermocouple disposed in the cooling zone). This independent measurement may be a correlation of cooling temperature with a measured amount of a certain species. The correlation could be separately developed, or could be established after some period of process operation.

A gas probe for the drying zone could be useful to determine the extent of drying, by measuring water content, for example. A gas probe in the preheating zone could be useful to determine the extent of any mild pyrolysis taking place, for example.

In certain embodiments, the cooling zone is configured with a gas inlet, and the pyrolysis zone is configured with a gas outlet, to generate substantially countercurrent flow of the gas phase relative to the solid phase. Alternatively, or additionally, the preheating zone (when it is present) may be configured with a gas outlet, to generate substantially countercurrent flow of the gas phase relative to the solid phase. Alternatively, or additionally, the drying zone may be configured with a gas outlet, to generate substantially countercurrent flow.

The pyrolysis reactor or reactors may be selected from any suitable reactor configuration that is capable of carrying out the pyrolysis process. Exemplary reactor configurations include, but are not limited to, fixed-bed reactors, fluidized-bed reactors, entrained-flow reactors, augers, rotating cones, rotary drum kilns, calciners, roasters, moving-bed reactors, transport-bed reactors, ablative reactors, rotating cones, or microwave-assisted pyrolysis reactors.

In some embodiments in which an auger is used, sand or another heat carrier can optionally be employed. For example, the feedstock and sand can be fed at one end of a screw The screw mixes the sand and feedstock and conveys them through the reactor. The screw can provide good control of the feedstock residence time and does not dilute the pyrolyzed products with a carrier or fluidizing gas. The sand can be reheated in a separate vessel.

In some embodiments in which an ablative process is used, the feedstock is moved at a high speed against a hot metal surface. Ablation of any char forming at surfaces can maintain a high rate of heat transfer. Such apparatus can prevent dilution of products. As an alternative, the feedstock particles may be suspended in a carrier gas and introduced at a high speed through a cyclone whose wall is heated.

In some embodiments in which a fluidized-bed reactor is used, the feedstock can be introduced into a bed of hot sand fluidized by a gas, which is typically a recirculated product gas. Reference herein to "sand" shall also include similar, substantially inert materials, such as glass particles, recovered ash particles, and the like. High heat-transfer rates from fluidized sand can result in rapid heating of the feedstock. There can be some ablation by attrition with the sand particles. Heat is usually provided by heat-exchanger tubes through which hot combustion gas flows.

Circulating fluidized-bed reactors can be employed, wherein gas, sand, and feedstock move together. Exemplary transport gases include recirculated product gases and combustion gases. High heat-transfer rates from the sand ensure rapid heating of the feedstock, and ablation is expected to be stronger than with regular fluidized beds. A separator can be employed to separate the product gases from the sand and char particles. The sand particles can be reheated in a fluidized burner vessel and recycled to the reactor.

In some embodiments, the BPU is a continuous reactor comprising a feedstock inlet, a plurality of spatially separated zones configured for separately controlling the temperature and mixing within each of the zones, and a carbonaceous-solids outlet, wherein one of the zones is configured with a first gas inlet for introducing a substantially inert gas into the BPU, and wherein one of the zones is configured with a first gas outlet.

In various embodiments the reactor includes at least two, three, four, or more zones. Each of the zones is disposed in communication with separately adjustable heating means independently selected from the group consisting of electrical heat transfer, steam heat transfer, hot-oil heat transfer, phase-change heat transfer, waste heat transfer, and combinations thereof. In some embodiments, at least one zone is heated with an effluent stream from the process gas heater, if present.

The BPU may be configured for separately adjusting gas-phase composition and gas-phase residence time of at least two zones, up to and including all zones present in the BPU.

The BPU may be equipped with a second gas inlet and/or a second gas outlet In some embodiments, the BPU is configured with a gas inlet in each zone In or other embodiments, the BPU is configured with a gas outlet in each zone. The BPU be a cocurrent or countercurrent reactor.

In some embodiments, the material feed system comprises a screw or auger feed mechanism. In some embodiments, the carbonaceous-solids outlet comprises a screw or auger output mechanism.

Certain embodiments utilize a rotating calciner with a screw material feed system. In these embodiments, some or all of the BPU is axially rotatable, i.e. it spins about its centerline axis. The speed of rotation will impact the solid flow pattern, and heat and mass transport. Each of the zones may be configured with flights disposed on internal walls, to provide agitation of solids. The flights may be separately adjustable in each of the zones.

Other means of agitating solids may be employed, such as augers, screws, or paddle conveyors. In some embodiments, the BPU includes a single, continuous auger disposed throughout each of the zones. In other embodiments, the reactor includes twin screws disposed throughout each of the zones.

Some systems are designed specifically with the capability to maintain the approximate size of feed material throughout the process-that is, to process the biomass feedstock without destroying or significantly damaging its structure. In some embodiments, the pyrolysis zone does not contain augers, screws, or rakes that would tend to greatly reduce the size of feed material being pyrolyzed.

In some embodiments of the invention, the system further includes a process gas heater disposed in operable communication with the outlet at which condensable vapors and non-condensable gases are removed. The process gas heater can be configured to receive a separate fuel (such as natural gas) and an oxidant (such as air) into a combustion chamber, adapted for combustion of the fuel and at least a portion of the condensable vapors. Certain non-condensable gases may also be oxidized, such as CO or $CH_4$, to $CO_2$.

When a process gas heater is employed, the system may include a heat exchanger disposed between the process gas heater and the dryer, configured to utilize at least some of the heat of the combustion for the dryer. This embodiment can contribute significantly to the overall energy efficiency of the process.

In some embodiments, the system further comprises a material enrichment unit, disposed in operable communication with the cooler, configured for combining condensable vapors, in at least partially condensed form, with the solids. The material enrichment unit may increase the carbon content of the high-carbon biogenic reagent obtained from the carbon recovery unit.

The system may further include a separate pyrolysis zone adapted to further pyrolyze the high-carbon biogenic reagent to further increase its carbon content. The separate pyrolysis zone may be a relatively simply container, unit, or device, such as a tank, barrel, bin, drum, tote, sack, or roll-off.

The overall system may be at a fixed location, or it may be made portable. The system may be constructed using modules which may be simply duplicated for practical scale-up. The system may also be constructed using economy-of-scale principles, as is well-known in the process industries.

Some variations relating to carbon enrichment of solids will now be further described. In some embodiments, a process for producing a high-carbon biogenic reagent comprises:

(a) providing a carbon-containing feedstock comprising biomass;

(b) optionally drying the feedstock to remove at least a portion of moisture contained within the feedstock;

(c) optionally deaerating the feedstock to remove at least a portion of interstitial oxygen, if any, contained with the feedstock;

(d) in a pyrolysis zone, pyrolyzing the feedstock in the presence of a substantially inert gas for at least 10 minutes and with a pyrolysis temperature selected from about 250° C. to about 700° C., to generate hot pyrolyzed solids, condensable vapors, and non-condensable gases;

(e) separating at least a portion of the condensable vapors and at least a portion of the non-condensable gases from the hot pyrolyzed solids;

(f) in a cooling zone, cooling the hot pyrolyzed solids, in the presence of the substantially inert gas for at least 5 minutes and with a cooling temperature less than the pyrolysis temperature, to generate warm pyrolyzed solids;

(g) optionally cooling the warm pyrolyzed solids in a cooler to generate cool pyrolyzed solids;

(h) subsequently passing at least a portion of the condensable vapors and/or at least a portion of the non-condensable gases from step (e) across the warm pyrolyzed solids and/or the cool pyrolyzed solids, to form enriched pyrolyzed solids with increased carbon content; and (i) in a carbon recovery unit, recovering a high-carbon biogenic reagent comprising at least a portion of the enriched pyrolyzed solids.

In some embodiments, step (h) includes passing at least a portion of the condensable vapors from step (e), in vapor and/or condensed form, across the warm pyrolyzed solids, to produce enriched pyrolyzed solids with increased carbon content. In some embodiments, step (h) includes passing at least a portion of the non-condensable gases from step (e) across the warm pyrolyzed solids, to produce enriched pyrolyzed solids with increased carbon content.

It should be appreciated that in various embodiments, carbon enrichment increases carbon content, energy content, as well as mass yield.

Alternatively, or additionally, vapors or gases may be contacted with the cool pyrolyzed solids. In some embodiments, step (h) includes passing at least a portion of the condensable vapors from step (e), in vapor and/or condensed form, across the cool pyrolyzed solids, to produce enriched pyrolyzed solids with increased carbon content. In some embodiments, step (h) includes passing at least a portion of the non-condensable gases from step (e) across the cool pyrolyzed solids, to produce enriched pyrolyzed solids with increased carbon content.

In certain embodiments, step (h) includes passing substantially all of the condensable vapors from step (e), in vapor and/or condensed form, across the cool pyrolyzed solids, to produce enriched pyrolyzed solids with increased carbon content. In certain embodiments, step (h) includes passing substantially all of the non-condensable gases from step (e) across the cool pyrolyzed solids, to produce enriched pyrolyzed solids with increased carbon content.

The process may include various methods of treating or separating the vapors or gases prior to using them for carbon enrichment. For example, an intermediate feed stream consisting of at least a portion of the condensable vapors and at least a of the non-condensable gases, obtained from step (e), may be fed to a separation unit configured to generate at least first and second output streams. In certain embodiments, intermediate feed stream comprises all of the condensable vapors, all of the non-non-condensable gases, or both.

Separation techniques can include or use distillation columns, flash vessels, centrifuges, cyclones, membranes, filters, packed beds, capillary columns, and so on. Separation can be principally based, for example, on distillation, absorption, adsorption, or diffusion, and can utilize differences in vapor pressure, activity, molecular weight, density, viscosity, polarity, chemical functionality, affinity to a stationary phase, and any combinations thereof.

In some embodiments, the first and second output streams are separated from the intermediate feed stream based on relative volatility. For example, the separation unit may be a distillation column, a flash tank, or a condenser.

Thus in some embodiments, the first output stream comprises the condensable vapors, and the second output stream comprises the non-condensable gases. The condensable vapors may include at least one carbon-containing compound selected from terpenes, alcohols, acids, aldehydes, or ketones. The vapors from pyrolysis may include aromatic compounds such as benzene, toluene, ethylbenzene, and xylenes. Heavier aromatic compounds, such as refractory tars, may be present in the vapor. The non-condensable gases may include at least one carbon-containing molecule selected from the group consisting of carbon monoxide, carbon dioxide, and methane.

In some embodiments, the first and second output streams are separated intermediate feed stream based on relative polarity. For example, the separation unit may be a stripping column, a packed bed, a chromatography column, or membranes.

Thus in some embodiments, the first output stream comprises polar compounds, and the second output stream comprises non-polar compounds. The polar compounds may include at least one carbon-containing molecule selected from the group consisting of methanol, furfural, and acetic acid. The non-polar compounds may include at least one carbon-containing molecule selected from the group consisting of carbon monoxide, carbon dioxide, methane, a terpene, and a terpene derivative.

Step (h) may increase the total carbon content of the high-carbon biogenic reagent, relative to an otherwise-identical process without step (h). The extent of increase in carbon content may be, for example, about 1%, 2%, 5%, 10%, 15%, 25%, or even higher, in various embodiments.

In some embodiments, step (h) increases the fixed carbon content of the high-carbon biogenic reagent. In these or other embodiments, step (h) increases the volatile carbon content of the high-carbon biogenic reagent. Volatile carbon content is the carbon attributed to volatile matter in the reagent. The volatile matter may be, but is not limited to, hydrocarbons including aliphatic or aromatic compounds (e.g., terpenes); oxygenates including alcohols, aldehydes, or ketones; and various tars. Volatile carbon will typically remain bound or adsorbed to the solids at ambient conditions but upon heating, will be released before the fixed carbon would be oxidized, gasified, or otherwise released as a vapor.

Depending on conditions associated with step (h), it is possible for some amount of volatile carbon to become fixed carbon (e.g., via Boudouard carbon formation from CO). Typically, the volatile matter will be expected to enter the micropores of the fixed carbon and will be present as condensed/adsorbed species, but still relatively volatile. This residual volatility can be more advantageous for fuel applications, compared to product applications requiring high surface area and porosity.

Step (h) may increase the energy content (i.e., energy density) of the high-carbon biogenic reagent. The increase in energy content may result from an increase in total carbon, fixed carbon, volatile carbon, or even hydrogen. The extent of increase in energy content may be, for example, about 1%, 2%, 5%, 10%, 15%, 25%, or even higher, in various embodiments.

Further separations may be employed to recover one or more non-condensable gases or condensable vapors, for use within the process or further processing. For example, further processing may be included to produce refined CO or syngas.

As another example, separation of acetic acid may be conducted, followed by reduction of the acetic acid into ethanol. The reduction of the acetic acid may be accomplished, at least in part, using hydrogen derived from the non-condensable gases produced.

Condensable vapors may be used for either energy in the process (such as by thermal oxidation) or in carbon enrichment, to increase the carbon content of the high-carbon biogenic reagent. Certain non-condensable gases, such as CO or $CH_4$, may be utilized either for energy in the process, or as part of the substantially inert gas for the pyrolysis step. Combinations of any of the foregoing are also possible.

A potential benefit of including step (h) is that the gas stream is scrubbed, with the resulting gas stream being enriched in CO and $CO_2$. The resulting gas stream may be utilized for energy recovery, recycled for carbon enrichment of solids, and/or used as an inert gas in the reactor. Similarly, by separating non-condensable gases from condensable vapors, the $CO/CO_2$ stream is prepared for use as the inert gas in the reactor system or in the cooling system, for example.

Other variations of the invention are premised on the realization that the principles of the carbon-enrichment step may be applied to any feedstock in which it is desired to add carbon.

In some embodiments, a batch or continuous process for producing a high-carbon biogenic reagent comprises:

(a) providing a solid stream comprising a carbon-containing material;

(b) providing a gas stream comprising condensable carbon-containing vapors, non-condensable carbon-containing gases, or a mixture of condensable carbon-containing vapors and non-condensable carbon-containing gases; and (c) passing the gas stream across the solid stream under suitable conditions to form a carbon-containing product with increased carbon content relative to the carbon-containing material.

In some embodiments, the starting carbon-containing material is biomass or torrefied biomass. The gas stream may be obtained during an integrated process that provides the carbon-containing material. Or, the gas stream may be obtained from separate processing of the carbon-containing material. The gas stream, or a portion thereof, may be obtained from an external source (e g, an oven at a lumber mill). Mixtures of gas streams, as well as mixtures of carbon-containing materials, from a variety of sources, are possible.

In some embodiments, the process further comprises recycling or reusing the gas stream for repeating the process to further increase carbon and/or energy content of the carbon-containing product. In some embodiments, the process further comprises recycling or reusing the gas stream for carrying out the process to increase carbon and/or energy content of another feedstock different from the carbon-containing material.

In some embodiments, the process further includes introducing the gas stream to a separation unit configured to generate at least first and second output streams, wherein the gas stream comprises a mixture of condensable carbon-containing vapors and non-condensable carbon-containing gases. The first and second output streams may be separated based on relative volatility, relative polarity, or any other property. The gas stream may be obtained from separate processing of the carbon-containing material.

In some embodiments, the process further comprises recycling or reusing the gas stream for repeating the process to further increase carbon content of the carbon-containing product. In some embodiments, the process further comprises recycling or reusing the gas stream for carrying out the process to increase carbon content of another feedstock.

The carbon-containing product may have an increased total carbon content, a higher fixed carbon content, a higher volatile carbon content, a higher energy content, or any combination thereof, relative to the starting carbon-containing material.

In related variations, a high-carbon biogenic reagent production system comprises:

(a) a material feed system configured to introduce a carbon-containing feedstock;

(b) an optional dryer, disposed in operable communication with the material feed system, configured to remove moisture contained within a carbon-containing feedstock;

(c) a BPU, disposed in operable communication with the dryer, wherein the BPU contains at least a pyrolysis zone disposed in operable communication with a spatially separated cooling zone, and wherein the BPU is configured with an outlet to remove condensable vapors and non-condensable gases from solids;

(d) a cooler, disposed in operable communication with the BPU;

(e) a material enrichment unit, disposed in operable communication with the cooler, configured to pass the condensable vapors and/or the non-condensable gases across the solids, to form enriched solids with increased carbon content; and (f) a carbon recovery unit, disposed in operable communication with the material enrichment unit.

The system may further comprise a preheating zone, disposed in operable communication with the pyrolysis zone. In some embodiments, the dryer is configured as a drying zone within the BPU. Each of the zones may be located within a single BPU or in separate BPUs. Also, the cooler may be disposed within the BPU.

In some embodiments, the cooling zone is configured with a gas inlet, and the pyrolysis zone is configured with a gas outlet, to generate substantially countercurrent flow of the gas phase relative to the solid phase. In these or other embodiments, the preheating zone and/or the drying zone (or dryer) is configured with a gas outlet, to generate substantially countercurrent flow of the gas phase relative to the solid phase.

In particular embodiments, the system incorporates a material enrichment unit that comprises:

(i) a housing with an upper portion and a lower portion;

(ii) an inlet at a bottom of the lower portion of the housing configured to carry the condensable vapors and non-condensable gases;

(iii) an outlet at a top of the upper portion of the housing configured to carry a concentrated gas stream derived from the condensable vapors and non-condensable gases;

(iv) a path defined between the upper portion and the lower portion of the housing; and (v) a material transport system following the path, the material transport system configured to transport the solids, wherein the housing is shaped such that the solids adsorb at least some of the condensable vapors and/or at least some of the non-condensable gases.

The present invention is capable of producing a variety of compositions useful as high-carbon biogenic reagents, and products incorporating these reagents. In some variations, a high-carbon biogenic reagent is produced by any process disclosed herein, such as a process comprising the steps of:

(a) providing a carbon-containing feedstock comprising biomass;

(b) optionally drying the feedstock to remove at least a portion of moisture contained within the feedstock;

(c) optionally deaerating the feedstock to remove at least a portion of interstitial oxygen, if any, contained with the feedstock;

(d) in a pyrolysis zone, pyrolyzing the feedstock in the presence of a substantially inert gas for at least 10 minutes and with a pyrolysis temperature selected from about 250° C. to about 700° C., to generate hot pyrolyzed solids, condensable vapors, and non-condensable gases;

(e) separating at least a portion of the condensable vapors and at least a portion of the non-condensable gases from the hot pyrolyzed solids;

(f) in a cooling zone, cooling the hot pyrolyzed solids, in the presence of the substantially inert gas for at least 5 minutes and with a cooling temperature less than the pyrolysis temperature, to generate warm pyrolyzed solids;

(g) cooling the warm pyrolyzed solids to generate cool pyrolyzed solids; and (h) recovering a high-carbon biogenic reagent comprising at least a portion of the cool pyrolyzed solids.

In some embodiments, the reagent comprises at least about 55 wt. %, for example at least 55 wt. %, at least 60 wt. %, at least 65 wt. %, at least 70 wt %, at least 75 wt. %, at least 80 wt %, at least 85 wt. %, at least 90 wt %, or at least 95 wt % total carbon on a dry basis. The total carbon includes at least fixed carbon, and may further include carbon from volatile matter. In some embodiments, carbon from volatile matter is about at least 5%, at least 10%, at least 25%, or at least 50% of the total carbon present in the high-carbon biogenic reagent. Fixed carbon may be measured using ASTM D3172, while volatile carbon may be estimated using ASTM D3 175, for example.

The high-carbon biogenic reagent may comprise about 10 wt % or less, such as about 5 wt % or less, hydrogen on a dry basis. The biogenic reagent may comprise about 1 wt % or less, such as about 0.5 wt % or less, nitrogen on a dry basis. The biogenic reagent may comprise about 0.5 wt % or less, such as about 0.2 wt % or less, phosphorus on a dry basis. The biogenic reagent may comprise about 0.2 wt % or less, such as about 0.1 wt % or less, sulfur on a dry basis.

Carbon, hydrogen, and nitrogen may be measured using ASTM D5373 for ultimate analysis, for example. Oxygen may be estimated using ASTM D3176, for example. Sulfur may be measured using ASTM D3177, for example.

Certain embodiments provide reagents with little or essentially no hydrogen (except from any moisture that may be present), nitrogen, phosphorus, or sulfur, and are substantially carbon plus any ash and moisture present. Therefore, some embodiments provide a material with up to and including 100% carbon, on a dry/ash-free (DAF) basis.

Generally speaking, feedstocks such as biomass contain non-volatile species, including silica and various metals, which are not readily released during pyrolysis. It is of course possible to utilize ash-free feedstocks, in which case there should not be substantial quantities of ash in the pyrolyzed solids. Ash may be measured using ASTM D3174, for example.

Various amounts of non-combustible matter, such as ash, may be present. The high-carbon biogenic reagent may comprise about 10 wt % or less, such as about 5 wt %, about 2 wt %, about 1 wt % or less non-combustible matter on a dry basis. In certain embodiments, the reagent contains little ash, or even essentially no ash or other non-combustible matter. Therefore, some embodiments provide essentially pure carbon, including 100% carbon, on a dry basis.

Various amounts of moisture may be present. On a total mass basis, the high-carbon biogenic reagent may comprise at least 1 wt %, 2 wt %, 5 wt %, 10 wt %, 15 wt %, 25 wt %, 35 wt %, 50 wt %, or more moisture. As intended herein, "moisture" is to be construed as including any form of water present in the biogenic reagent, including absorbed moisture, adsorbed water molecules, chemical hydrates, and physical hydrates. The equilibrium moisture content may vary at least with the local environment, such as the relative humidity. Also, moisture may vary during transportation, preparation for use, and other logistics. Moisture may be measured using ASTM D3173, for example.

The high-carbon biogenic reagent may have various "energy content" which for present purposes means the energy density based on the higher heating value associated with total combustion of the bone-dry reagent. For example, the high-carbon biogenic reagent may possess an energy content of about at least 11,000 Btu/lb, at least 12,000 Btu/lb, at least 13,000 Btu/lb, at least 14,000 Btu/lb, or at least 15,000 Btu/lb. In certain embodiments, the energy content is between about 14,000-15,000 Btu/lb. The energy content may be measured using ASTM D5865, for example.

The high-carbon biogenic reagent may be formed into a powder, such as a coarse powder or a fine powder. For example, the reagent may be formed into a powder with an average mesh size of about 200 mesh, about 100 mesh, about 50 mesh, about 10 mesh, about 6 mesh, about 4 mesh, or about 2 mesh, in embodiments.

In some embodiments, the high-carbon biogenic reagent is formed into structural objects comprising pressed, binded, or agglomerated particles. The starting material to form these objects may be a powder form of the reagent, such as an intermediate obtained by particle-size reduction. The objects may be formed by mechanical pressing or other forces, optionally with a binder or other means of agglomerating particles together.

In some embodiments, the high-carbon biogenic reagent is produced in the form of structural objects whose structure substantially derives from the feedstock. For example, feedstock chips may produce product chips of high-carbon biogenic reagent. Or, feedstock cylinders may produce high-carbon biogenic reagent cylinders, which may be somewhat smaller but otherwise maintain the basic structure and geometry of the starting material.

A high-carbon biogenic reagent according to the present invention may be produced as, or formed into, an object that has a minimum dimension of at least about 1 cm, 2 cm, 3 cm, 4 cm, 5 cm, 6 cm, 7 cm, 8 cm, 9 cm, 10 cm, or higher. In various embodiments, the minimum dimension or maximum dimension can be a length, width, or diameter.

Other variations of the invention relate to the incorporation of additives into the process, into the product, or both. In some embodiments, the high-carbon biogenic reagent includes at least one process additive incorporated during the process. In these or other embodiments, the reagent includes at least one product additive introduced to the reagent following the process.

In some embodiments, a high-carbon biogenic reagent comprises, on a dry basis:
55 wt % or more total carbon;
5 wt % or less hydrogen;
1 wt % or less nitrogen;
0.5 wt % or less phosphorus;
0.2 wt % or less sulfur, and
an additive selected from a metal, a metal oxide, a metal hydroxide, a metal halide, or a combination thereof.

The additive may be selected from, but is by no means limited to, magnesium, manganese, aluminum, nickel, chromium, silicon, boron, cerium, molybdenum, phosphorus, tungsten, vanadium, iron halide, iron chloride, iron bromide, magnesium oxide, dolomite, dolomitic lime, fluorite, fluorospar, bentonite, calcium oxide, lime, and combinations thereof.

In some embodiments, a high-carbon biogenic reagent comprising, on a dry basis:
55 wt % or more total carbon;
5 wt % or less hydrogen;
1 wt % or less nitrogen;
0.5 wt % or less phosphorus;
0.2 wt % or less sulfur, and
an additive selected from an acid, a base, or a salt thereof.

The additive may be selected from, but is by no means limited to, sodium hydroxide, potassium hydroxide, magnesium oxide, hydrogen bromide, hydrogen chloride, sodium silicate, potassium permanganate, or combinations thereof.

In certain embodiments, a high-carbon biogenic reagent comprises, on a dry basis:
55 wt % or more total carbon;
5 wt % or less hydrogen;
1 wt % or less nitrogen;
0.5 wt/or less phosphorus;
0.2 wt % or less sulfur, a first additive selected from a metal, metal oxide, metal hydroxide, a metal halide, or a combination thereof; and a second additive selected from an acid, a base, or a salt thereof, wherein the first additive is different from the second additive.

The first additive may be selected from magnesium, manganese, aluminum, nickel, chromium, silicon, boron, cerium, molybdenum, phosphorus, tungsten, vanadium, iron halide, iron chloride, iron bromide, magnesium oxide, dolomite, dolomitic lime, fluorite, fluorospar, bentonite, calcium oxide, lime, and combinations thereof, while the second additive may be independently selected from sodium hydroxide, potassium hydroxide, magnesium oxide, hydrogen bromide, hydrogen chloride, sodium silicate, potassium permanganate, or combinations thereof.

A certain high-carbon biogenic reagent consists essentially of, on a dry basis, carbon, hydrogen, nitrogen, phosphorus, sulfur, non-combustible matter, and an additive selected from the group consisting of magnesium, manganese, aluminum, nickel, chromium, silicon, boron, cerium, molybdenum, phosphorus, tungsten, vanadium, iron halide, iron chloride, iron bromide, magnesium oxide, dolomite, dolomitic lime, fluorite, fluorospar, bentonite, calcium oxide, lime, and combinations thereof.

A certain high-carbon biogenic reagent consists essentially of, on a dry basis, carbon, hydrogen, nitrogen, phosphorus, sulfur, non-combustible matter, and an additive selected from the group consisting of sodium hydroxide, potassium hydroxide, magnesium oxide, hydrogen bromide, hydrogen chloride, sodium silicate, and combinations thereof.

The amount of additive (or total additives) may vary widely, such as from about 0.01 wt % to about 25 wt %, including about 0.1 wt %, about 1 wt %, about 5 wt %, about 10 wt %, or about 20 wt %. It will be appreciated then when relatively large amounts of additives are incorporated, such as higher than about 1 wt %, there will be a reduction in energy content calculated on the basis of the total reagent weight (inclusive of additives). Still, in various embodiments, the high-carbon biogenic reagent with additive(s) may possess an energy content of about at least 11,000 Btu/lb, at least 12,000 Btu/lb, at least 13,000 Btu/lb, at least 14,000 Btu/lb, or at least 15,000 Btu/lb.

The above discussion regarding product form applies also to embodiments that incorporate additives. In fact, certain embodiments incorporate additives as binders or other modifiers to enrich final properties for a particular application.

In some embodiments, the majority of carbon contained in the high-carbon biogenic reagent is classified as renewable carbon. In some embodiments, substantially all of the carbon is classified as renewable carbon. There may be certain market mechanisms (e.g., Renewable Identification Numbers, tax credits, etc.) wherein value is attributed to the renewable carbon content within the high-carbon biogenic reagent.

In certain embodiments, the fixed carbon may be classified as non-renewable carbon (e.g., from coal) while the volatile carbon, which may be added separately, may be renewable carbon to increase not only energy content but also renewable carbon value.

The high-carbon biogenic reagents produced as described herein as useful for a wide variety of carbonaceous products. The high-carbon biogenic reagent may be a desirable market product itself. High-carbon biogenic reagents as provided herein are associated with lower levels of impurities, reduced process emissions, and improved sustainability (including higher renewable carbon content) compared to the state of the art.

In variations, a product includes any of the high-carbon biogenic reagents that may be obtained by the disclosed processes, or that are described in the compositions set forth herein, or any portions, combinations, or derivatives thereof.

Generally speaking, the high-carbon biogenic reagents may be combusted to produce energy (including electricity and heat); partially oxidized or steam-reformed to produce syngas; utilized for their adsorptive or absorptive properties; utilized for their reactive properties during metal refining (such as reduction of metal oxides) or other industrial processing; or utilized for their material properties in carbon steel and various other metal alloys. Essentially, the high-carbon biogenic reagents may be utilized for any market application of carbon-based commodities or advanced materials, including specialty uses to be developed.

Prior to suitability or actual use in any product applications, the disclosed high-carbon biogenic reagents may be analyzed, measured, and optionally modified (such as through additives) in various ways. Some properties of potential interest, other than chemical composition and energy content, include density, particle size, surface area, microporosity, absorptivity, adsorptivity, binding capacity, reactivity, desulfurization activity, and basicity, to name a few properties.

Products or materials that may incorporate these high-carbon biogenic reagents include, but are by no means limited to, carbon-based blast furnace addition products, carbon-based taconite pellet addition products, ladle addition carbon-based products, met coke carbon-based products, coal replacement products, carbon-based coking products, carbon breeze products, fluidized-bed carbon-based feedstocks, carbon-based furnace addition products, injectable carbon-based products, pulverized carbon-based products, stoker carbon-based products, carbon electrodes, or activated carbon products.

Use of the disclosed high-carbon biogenic reagents in metals production can reduce slag, increase overall efficiency, and reduce lifecycle environmental impacts. Therefore, embodiments of this invention are particularly well-suited for metal processing and manufacturing.

Some variations of the invention utilize the high-carbon biogenic reagents as carbon-based blast furnace addition products. A blast furnace is a type of metallurgical furnace used for smelting to produce industrial metals, such as (but not limited to) iron. Smelting is a form of extractive metallurgy; its main use is to produce a metal from its ore. Smelting uses heat and a chemical reducing agent to decompose the ore. The carbon and/or the carbon monoxide derived from the carbon removes oxygen from the ore, leaving behind elemental metal.

The reducing agent may consist of, or comprise, a high-carbon biogenic reagent. In a blast furnace, high-carbon biogenic reagent, ore, and typically limestone may be continuously supplied through the top of the furnace, while air (optionally with oxygen enrichment) is blown into the bottom of the chamber, so that the chemical reactions take place throughout the furnace as the material moves downward. The end products are usually molten metal and slag phases tapped from the bottom, and flue gases exiting from the top of the furnace. The downward flow of the ore in contact with an upflow of hot, carbon monoxide-rich gases is a countercurrent process.

Carbon quality in the blast furnace is measured by its resistance to degradation. The role of the carbon as a permeable medium is crucial in economic blast furnace operation. The degradation of the carbon varies with the position in the blast furnace and involves the combination of reaction with CO2, H2O, or O2 and the abrasion of carbon particles against each other and other components of the burden. Degraded carbon particles may cause plugging and poor performance.

The Coke Reactivity test is a highly regarded measure of the performance of carbon in a blast furnace. This test has two components: the Coke Reactivity Index (CRI) and the Coke Strength after Reaction (CSR). A carbon-based material with a low CRI value (high reactivity) and a high CSR value can provide improved blast furnace performance. CRI can be determined according to any suitable method known in the art, for example by ASTM Method DS341 on an as-received basis.

In some embodiments, the high-carbon biogenic reagent, when blended with another carbon source, for example up to about 10 wt % or more, provides a final carbon product having suitable properties for combustion in a blast furnace.

The strength of the high-carbon biogenic reagent may be determined by any suitable method known in the art, for example by a drop-shatter test, or a CSR test. In some embodiments, the high-carbon biogenic reagent, when blended with another source of carbon, provides a final carbon product having CSR of at least about 50%, 60%, or 70%. A combination product may also provide a final coke product having a suitable reactivity for combustion in a blast furnace. In some embodiments, the product has a CRI such that the high-carbon biogenic reagent is suitable for use as an additive or replacement for met coal, met coke, coke breeze, foundry coke, or injectable coal.

Some embodiments employ one or more additives in an amount sufficient to provide a high-carbon biogenic reagent that, when added to another carbon source (e.g., coke) having a CRI or CSR insufficient for use as a blast furnace product, provides a composite product with a CRI and/or CSR sufficient for use in a blast furnace. In some embodiments, one or more additives are present in an amount sufficient to provide a high-carbon biogenic reagent having a CRI of not more than about 40%, 30%, or 20%.

In some embodiments, one or more additives selected from the alkaline earth metals, or oxides or carbonates thereof, are introduced during or after the process of producing a high-carbon biogenic reagent. For example, calcium, calcium oxide, calcium carbonate, magnesium oxide, or magnesium carbonate may be introduced as additives. The addition of these compounds before, during, or after pyrolysis may increase or decrease the reactivity of the high-carbon biogenic reagent in a blast furnace. These compounds may lead to stronger materials, i.e. higher CSR, thereby improving blast-blast-furnace efficiency. In addition, additives such as those selected from the alkaline earth metals, or oxides or carbonates thereof, may lead to lower emissions (e.g., SO2).

In some embodiments, a high-carbon biogenic reagent contains not only a high fixed-carbon content but also a fairly high fraction of volatile carbon, as described above. The volatile matter may be desirable for metal oxide reduction because it is expected to have better mass transport into the metal oxide at lower temperatures. Compared to fossil-fuel based products such as coke, high-carbon biogenic reagents may have sufficient strength and more fixed and volatile carbon, which leads to greater reactivity.

In some embodiments, a blast furnace replacement product is a high-carbon biogenic reagent according to the present invention comprising at least about 55 wt % carbon, not more than about 0.5 wt % sulfur, not more than about 8 wt % non-combustible material, and a heat value of at least about 11,000 Btu per pound. In some embodiments, the blast furnace replacement product further comprises not more than about 0.035 wt % phosphorous, about 0.5 wt % to about 50 wt % volatile matter, and optionally one or more additives. In some embodiments, the blast furnace replacement product comprises about 2 wt % to about 15 wt % dolomite, about 2 wt % to about 15 wt % dolomitic lime, about 2 wt % to about 15 wt % bentonite, and/or about 2 wt % to about 15 wt % calcium oxide. In some embodiments, the blast furnace replacement product has dimensions substantially in the range of about 1 cm to about 10 cm.

In some embodiments, a high-carbon biogenic reagent according to the present invention is useful as a foundry coke replacement product. Foundry coke is generally characterized as having a carbon content of at least about 85 wt %, a sulfur content of about 0.6 wt %, not more than about 1.5 wt % volatile matter, not more than about 13 wt ash, not more than about 8 wt % moisture, about 0.035 wt % phosphorus, a CRI value of about 30, and dimensions ranging from about 5 cm to about 25 cm Some variations of the invention utilize the high-carbon biogenic reagents as carbon-based taconite pellet addition products. The ores used in making iron and steel are iron oxides. The major iron oxide ores are hematite, limonite (also called brown ore), taconite, and magnetite, a black ore. Taconite is a low-grade but important ore, which contains both magnetite and hematite. The iron content of taconite is generally 25 wt % to 30 wt %. Blast furnaces typically require at least a 50 wt % iron content ore for efficient operation. Iron ores may undergo beneficiation including crushing, screening, tumbling, flotation, and magnetic separation. The refined ore is enriched to over 60% iron and is often formed into pellets before shipping.

For example, taconite may be ground into a fine powder and combined with a binder such as bentonite clay and limestone. Pellets about one centimeter in diameter may be formed, containing approximately 65 wt % iron, for example. The pellets are fired, oxidizing magnetite to hematite. The pellets are durable which ensures that the blast furnace charge remains porous enough to allow heated gas to pass through and react with the pelletized ore.

The taconite pellets may be fed to a blast furnace to produce iron, as described above with reference to blast furnace addition products. In some embodiments, a high-carbon biogenic reagent is introduced to the blast furnace. In these or other embodiments, a high-carbon biogenic reagent is incorporated into the taconite pellet itself. For example, taconite ore powder, after beneficiation, may be mixed with a high-carbon biogenic reagent and a binder and rolled into small objects, then baked to hardness. In such embodiments, taconite-carbon pellets with the appropriate composition may conveniently be introduced into a blast furnace without the need for a separate source of carbon.

Some variations of the invention utilize the high-carbon biogenic reagents as ladle addition carbon-based products. A ladle is a vessel used to transport and pour out molten metals. Casting ladles are used to pour molten metal into molds to produce the casting. Transfers ladle are used to transfer a large amount of molten metal from one process to another. Treatment ladles are used for a process to take place within the ladle to change some aspect of the molten metal, such as the conversion of cast iron to ductile iron by the addition of various elements into the ladle High-carbon biogenic reagents may be introduced to any type of ladle, but typically carbon will be added to treatment ladles in suitable amounts based on the target carbon content. Carbon injected into ladles may be in the form of fine powder, for good mass transport of the carbon into the final composition. In some embodiments, a high-carbon biogenic reagent according to the present invention, when used as a ladle addition product, has a minimum dimension of about 0.5 cm, such as about 0.75 cm, about 1 cm, about 1.5 cm, or higher.

In some embodiments, a high carbon biogenic reagent according to the present invention is useful as a ladle addition carbon additive at, for example, basic oxygen furnace or electric arc furnace facilities wherever ladle addition of carbon would be used (e.g., added to ladle carbon during steel manufacturing). In some embodiments, the ladle addition carbon additive is a high-carbon biogenic reagent comprising at least about 55 wt. % carbon, no more than about 0.4 wt. % sulfur, no more than about 0.035 wt. % phosphorous, and a heat value of at least about 11,000 BTU per pound.

In some embodiments, the ladle addition carbon additive additionally comprises up to about 5 wt % manganese, up to about 5 wt % calcium oxide, and/or up to about 5 wt % dolomitic lime. In some embodiments, the ladle addition carbon additive has a minimum dimension of about ¼ inches. In some embodiments, the ladle addition carbon product has a maximum dimension of about ½ inches. In some embodiments, the ladle addition carbon additive has a minimum dimension of about ¼ inches and a maximum dimension of about ½ inches. In some embodiments, the ladle addition carbon product is substantially free of fossil fuel.

Direct-reduced iron (DRI), also called sponge iron, is produced from direct reduction of iron ore (in the form of lumps, pellets or fines) by a reducing gas produced from natural gas or coal. The reducing gas is typically syngas, a mixture of hydrogen and carbon monoxide which acts as reducing agent. The high-carbon biogenic reagent as provided herein may be converted into a gas stream comprising CO, to act as a reducing agent to produce direct-reduced iron.

Iron nuggets are a high-quality steelmaking and iron-casting feed material. Iron nuggets are essentially all iron and carbon, with almost no gangue (slag) and low levels of metal residuals. They are a premium grade pig iron product with superior shipping and handling characteristics. The carbon contained in iron nuggets, or any portion thereof, may be the high-carbon biogenic reagent provided herein. Iron nuggets may be produced through the reduction of iron ore in a rotary hearth furnace, using a high-carbon biogenic reagent as the reductant and energy source.

Some variations of the invention utilize the high-carbon biogenic reagents as metallurgical coke carbon-based products. Metallurgical coke, also known as "met" coke, is a carbon material normally manufactured by the destructive distillation of various blends of bituminous coal. The final solid is a non-melting carbon called metallurgical coke. As a result of the loss of volatile gases and of partial melting, met coke has an open, porous morphology. Met coke has a very low volatile content. However, the ash constituents, that were part of the original bituminous coal feedstock, remain encapsulated in the resultant coke. Met coke feedstocks are available in a wide range of sizes from fine powder to basketball-sized lumps. Typical purities range from 86-92 wt % fixed carbon.

Metallurgical coke is used where a high-quality, tough, resilient, wearing is required. Applications include, but are not limited to, conductive flooring, friction materials (e.g., carbon linings), foundry coatings, foundry carbon raiser, corrosion materials, drilling applications, reducing agents, heat-treatment agents, ceramic packing media, electrolytic processes, and oxygen exclusion.

Met coke may be characterized as having a heat value of about 10,000 to 14,000 Btu per pound and an ash content of about 10 wt % or greater. Thus, in some embodiments, a met coke replacement product comprises a high-carbon biogenic reagent according to the present invention comprising at least about 80 wt %, 85 wt %, or 90 wt % carbon, not more than about 0.8 wt % sulfur, not more than about 3 wt % volatile matter, more than about 15 wt % ash, not more than about 13 wt % moisture, and not more than about 0.035 wt % phosphorus. In some embodiments, the met coke replacement product comprises at least about 55 wt % carbon, no more than about 0.4 wt. % sulfur, no more about 0.035 wt. % phosphorous, and a heat value of at least about 11,000 BTU per pound. In some embodiments, a met coke replacement product further comprises about 2 wt % to about 15 wt. % of dolomite, for example, about 1 wt. %, about 3 wt. %, about 4 wt. %, 5 wt. %, about 6 wt. %, about 7 wt. %, about 8 wt. %, about 9 wt. %, about 10 wt %, about wt %, about 12 wt %, about 13 wt. %, about 14 wt. %, or about 15 wt. % of dolomite In some embodiments, a met coke replacement product further comprises about 2 wt. % to about 15 wt. % of bentonite, for example, about 1 wt. %, about 3 wt. %, about 4 wt. %, 5 wt. %, about 6 wt. %, about 7 wt. %, about 8 wt. %, about 9 wt. %, about 10 wt. %, about wt. %, about 12 wt. %, about 13 wt. %, about 14 wt. %, or about 15 wt. % of bentonite. In some embodiments, a met coke replacement product further comprises about 2 wt. % to about 15 wt. % of calcium oxide, for example, about 1 wt. %, about 3 wt. %, about 4 wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, or about 15 wt. % of oxide. In some embodiments, a met coke replacement product further comprises about 2 wt. % to about 15 wt. % of dolomitic lime, for example, about 1 wt. %, about 3 wt. %, about wt. %, about 5 wt. %, about 6 wt. %, about 7 wt. %, about 8 wt. %, about 9 wt. %, about 10 wt. %, about 11 wt. %, about 12 wt. %, about 13 wt. %, about 14 wt. %, or about 15 wt. % of dolomitic lime. In some embodiments, a met coke replacement product comprises any combination of about 2 wt. % to about 15 wt. % of dolomite, about 2 wt. % to about 15 of bentonite, about 2 wt. % to about 15 wt. % of calcium oxide, and/or about 2 wt. % to 15 wt. % of dolomitic lime. A high-carbon biogenic reagent according to the present invention, when used as a met coke replacement product, may have a size range from 2 cm to about 15 cm, for example. In some embodiments, a met coke replacement has a minimum dimension of about % inches. In some embodiments, a met coke replacement product has a maximum dimension of about 4 inches. In some a met coke replacement product has a minimum dimension of about ¾ inches and a maximum dimension of about 4 inches. In some embodiments, a met coke replacement product is substantially free of fossil fuel.

In some embodiments, the met coke replacement product further comprises an additive such as chromium, nickel, manganese, magnesium oxide, silicon, aluminum, dolomite, fluorospar, calcium oxide, lime, dolomitic lime, bentonite and combinations thereof.

Some variations of the invention utilize the high-carbon biogenic reagents as coal replacement products. Any process or system using coal can in principle be adapted to use a high-carbon biogenic reagent.

In some embodiments, a high-carbon biogenic reagent is combined with one or more coal-based products to form a composite product having a higher rank than the coal-based product(s) and/or having fewer emissions, when burned, than the pure coal-based product.

For example, a low-rank coal such as sub-bituminous coal may be used in applications normally calling for a higher-rank coal product, such as bituminous coal, by combining a selected amount of a high-carbon biogenic reagent according to the present invention with the low-rank coal product. In other embodiments, the rank of a mixed coal product (e.g., a combination of a plurality of coals of different rank) may be improved by combining the mixed coal with some amount of high-carbon biogenic reagent. The amount of a high-carbon biogenic reagent to be mixed with the coal product(s) may vary depending on the rank of the coal product(s), the characteristics of the high-carbon biogenic reagent (e.g., carbon content, heat value, etc.) and the desired rank of the final combined product.

For example, anthracite coal is generally characterized as having at least about 80 wt % carbon, about 0.6 wt % sulfur, about 5 wt % volatile matter, up to about 15 wt % ash, up to about 10 wt % moisture, and a heat value of about 29 MJ/kg (approximately 12,494 Btu/lb). In some embodiments, an anthracite coal replacement product is a high-carbon biogenic reagent according to the present invention comprising at least about 80 wt % carbon, not more than about 0.6 wt % sulfur, not more than about 15 wt % ash, and a heat value of at least about 12,000 Btu/lb.

In some embodiments, a high-carbon biogenic reagent according to the present invention is useful as a thermal coal replacement product. Thermal coal products are generally characterized as having high sulfur levels, high phosphorus levels, high ash content, and heat values of up to about 15,000 Btu/lb. In some embodiments, a thermal coal replacement product is a high-carbon biogenic reagent comprising not more than about 0.5 wt % sulfur, not more than about 4 wt % ash, and a heat value of at least about 12,000 Btu/lb.

Some variations of the invention utilize the high-carbon biogenic reagents as carbon-based coking products. Any coking process or system may be adapted to use high-carbon biogenic reagents to produce coke, or use it as a coke feedstock.

In some embodiments, a high-carbon biogenic reagent according to the present invention is useful as a thermal coal or coke replacement product. For example, a thermal coal or coke replacement product may consist of a high-carbon biogenic reagent comprising at least about 50 wt % carbon, not more than about 8 wt % ash, not more than about 0.5 wt % sulfur, and a heat value of at least about 11,000 Btu/lb. In other embodiments, the thermal coke replacement product further comprises about 0.5 wt % to about 50 wt % volatile matter. The thermal coal or coke replacement product may include about 0.4 wt % to about 15 wt % moisture.

In some embodiments, a high-carbon biogenic reagent according to the present invention is useful as a petroleum (pet) coke or calcine pet coke replacement product. Calcine pet coke is generally characterized as having at least about 66 wt % carbon, up to 4.6 wt % sulfur, up to about 5.5 wt % volatile matter, up to about 19.5 wt % ash, and up to about 2 wt % moisture, and is typically sized at about 3 mesh or less. In some embodiments, the calcine pet coke replacement product is a high-carbon biogenic reagent comprising at least about 66 wt % carbon, not more than about 4.6 wt % sulfur, not more than about 19.5 wt % ash, not more than about 2 wt % moisture, and is sized at about 3 mesh or less.

In some embodiments, a high-carbon biogenic reagent according to the present invention is useful as a coking carbon replacement carbon (e.g., co-fired with metallurgical coal in a coking furnace). In one embodiment, a coking carbon product is a high-carbon biogenic reagent comprising at least about 55 wt % carbon, not more than about 0.5 wt % sulfur, not more than about 8 wt % non-combustible material, a heat value of at least about 11,000 Btu per pound. In some embodiments, a coking replacement product is a high-carbon biogenic reagent comprising at least about 55 wt. % carbon, not more than about 0.4 wt. % sulfur, not more than about 0.035 wt. % and a heat value of at least about 11,000 Btu per pound In some embodiments, the carbon replacement product has a minimum dimension of about ¾ inches In some embodiments, the coking carbon replacement product is substantially free of fossil fuel some embodiments, the coking carbon replacement product comprises about 0.5 wt % to about 50 wt % volatile matter, and/or one or more additives.

Some variations of the invention utilize the high-carbon biogenic reagents as carbon breeze products, which typically have very fine particle sizes such as 6 mm, 3 mm, 2 mm, 1 mm, or smaller. In some embodiments, a high-carbon biogenic reagent according to the present invention is useful as a coke breeze replacement product. Coke breeze is generally characterized as having a maximum dimension of not more than about 6 mm, a carbon content of at least about 80 wt %, 0.6 to 0.8 wt % sulfur, 1% to 20 wt % volatile matter, up to about 13 wt % ash, and up to about 13 wt % moisture. In some embodiments, a coke breeze replacement product is a high-carbon biogenic reagent according to the present invention comprising at least about 80 wt % carbon, not more than about 0.8 wt % sulfur, not more than about 20 wt % volatile matter, not more than about 13 wt % ash, not more than about 13 wt % moisture, and a maximum dimension of about 6 mm.

In some embodiments, a high-carbon biogenic reagent according to the present invention is useful as a carbon breeze replacement product during, for example, taconite pellet production or in an iron-making process. In some embodiments, a carbon breeze replacement product is a high-carbon biogenic reagent comprising at least about 55 wt. % carbon, not more than about 0.4 wt. % sulfur, not more than about 0.035 wt. % phosphorous, and a heat value of at least about 11,000 Btu per pound. In some embodiments, the carbon breeze replacement product has a minimum dimension of about ⅛ inches. In some embodiments, the carbon breeze replacement product is substantially free of fossil fuel.

Some variations of the invention utilize the high-carbon biogenic reagents as feedstocks for various fluidized beds, or as fluidized-bed carbon-based feedstock replacement products. The carbon may be employed in fluidized beds for total combustion, partial oxidation, gasification, steam reforming, or the like. The carbon may be primarily converted into syngas for various downstream uses, including production of energy (e.g., combined heat and power), or liquid fuels (e.g., methanol or Fischer-Tropsch diesel fuels).

In some embodiments, a high-carbon biogenic reagent according to the present invention is useful as a fluidized-bed coal replacement product in, for example, fluidized bed furnaces wherever coal would be used (e.g., for process heat or energy production). In some embodiments, a fluidized-bed replacement product is a high-carbon biogenic reagent comprising at least about 55 wt. % carbon, not more than about 0.4 wt. % sulfur, not more than about 0.035 wt. % phosphorous, and a heat value of at least about 11,000 Btu per pound. In some embodiments, the fluidized-bed replacement product has minimum dimension of about ¼ inches. In some embodiments, the fluidized-bed replacement product has a maximum dimension of about 2 inches. In some the fluidized-bed replacement product has a minimum dimension of about ¼ inches and a maximum dimension of about 2 inches. In some embodiments, the fluidized-bed replacement product is substantially free of fossil fuel. Some variations of the invention utilize the high-carbon biogenic reagents as carbon-based furnace addition products. Coal-based carbon furnace addition products are generally characterized as having high sulfur levels, high phosphorus levels, and high ash content, which contribute to degradation of the metal product and create air pollution. In some embodiments, a furnace addition replacement product comprising a high-carbon biogenic reagent comprises not more than about 0.5 wt % sulfur, not more than about 4 wt % ash, not more than about 0.03 wt % phosphorous, and a maximum dimension of about 7.5 cm. In some embodiments, the carbon furnace addition replacement product replacement product comprises about 0.5 wt % to about 50 wt % volatile matter and about 0.4 wt % to about 15 wt % moisture. In some embodiments, the furnace addition replacement product is a high-carbon biogenic reagent comprising at least about 80 wt % carbon, no more than 0.4 wt % or less sulfur, no more than about 0.035 wt % phosphorous, no more than about 5 wt. % of manganese, no more than about 5 wt. % of fluorospar, and a heat value of at least about 11,000 BTU/lb. In some embodiments, the furnace addition replacement product further comprises about 5 wt % to about 10 wt % of dolomite, for example about 5 wt. %, about 6 wt. %, about 7 wt. %, about 8 wt. %, about 9 wt. %, or about 10 wt. % of dolomite some embodiments, the furnace addition replacement product further comprises about 5 wt % to about 10 wt % of dolomitic lime, for example about 5 wt. %, about 6 wt %, about 7 wt. %, about 8 wt. %, about 9 wt. %, or about 10 wt % of dolomitic lime. In some embodiments, the furnace addition replacement product further comprises about 5 wt % to about 10 wt % of calcium oxide, for example about 5 wt. %, about 6 wt %, about 7 wt. %, about 8 wt. %, about 9 wt. %, or about 10 wt. % of calcium oxide. In some embodiments, furnace addition replacement product further comprises about 5 wt. % to about 10 wt. % of dolomitic lime and about 5 wt. % to about 10 wt. % of calcium oxide. In some embodiments, the furnace addition replacement product further comprises about 5 wt. % about 10 wt. % of dolomite, about 5 wt. % to about 10 wt. % of dolomitic lime and about 5 wt. % to about 10 wt. % calcium oxide. In some embodiments, the furnace addition replacement product has a minimum dimension of about ¾ inches. In some the furnace addition replacement product has a maximum dimension of about 2 inches, some embodiments, the furnace addition has a minimum dimension of about ¾ inches a maximum dimension of about 2 inches. In some embodiments, the furnace addition replacement product is substantially free of fossil fuel In some embodiments, a high-carbon biogenic reagent according to the present invention is useful as a furnace addition carbon additive at, for example, basic oxygen furnace or electric arc furnace facilities wherever furnace addition carbon would be used. For example, furnace addition carbon may be added to scrap steel during steel manufacturing at electric-arc furnace facilities). For electric-arc furnace applications, high-purity carbon is desired so that impurities are not introduced back into the process following earlier removal of impurities.

In some embodiments, a furnace addition carbon additive is a high-carbon biogenic reagent according to the present invention comprising at least about 80 wt % carbon, not more than about 0.5 wt % sulfur, not more than about 8 wt % non-combustible material, and a heat value of at least about 11,000 Btu per pound. In some embodiments, the furnace addition carbon additive further comprises up to about 5 wt % manganese, up to about 5 wt % fluorospar, about 5 wt % to about 10 wt % dolomite, about 5 wt % to about 10 wt % dolomitic lime, and/or about 5 wt % to about 10 wt % calcium oxide.

Some variations of the invention utilize the high-carbon biogenic reagents as stoker furnace carbon-based products. In some embodiments, a high-carbon biogenic reagent according to the present invention is useful as a stoker coal replacement product for example, stoker furnace facilities wherever coal would be used (e.g., for process heat energy production) In some embodiments, an stoker carbon replacement product is a high-carbon biogenic replacement comprises at least about 55 wt % carbon, no more about 0.4% sulfur, no more than about 0.035 wt. % phosphorous, and a heat value of at about 11,000 BTU per pound. In some embodiments, the stoker carbon replacement product has a minimum dimension of about 1 inch. In some embodiments, the stoker carbon replacement product has a maximum dimension of about 3 inches. In some embodiments, the stoker carbon replacement product has a minimum dimension of about inch and a maximum dimension of about 3 inches. In some embodiments, the stoker carbon replacement product is substantially free of fossil fuel.

Some variations of the invention utilize the high-carbon biogenic reagents as injectable (e.g., pulverized) carbon-based materials. In some embodiments, a high-carbon biogenic reagent according to the present invention is useful as an injection-grade calcine pet coke replacement product. Injection-grade calcine pet coke is generally characterized as having at least about 66 wt % carbon, about 0.55 to about 3 wt % sulfur, up to about 5.5 wt % volatile matter, up to about 10 wt % ash, up to about 2 wt % moisture, and is sized at about 6 Mesh or less. In some embodiments, a calcine pet coke replacement product is a high-carbon biogenic reagent comprising at least about 66 wt % carbon, not more than about 3 wt % sulfur, not more than about 10 wt % ash, not more than about 2 wt % moisture, and is sized at about 6 Mesh or less. In various embodiments, the injectable carbon is also known as pulverized carbon, pulverized carbon for injection, or PCI. In various embodiments, the injectable carbon is used as a direct energy source, a reagent or both.

In some embodiments, a high-carbon biogenic reagent according to the present invention is useful as an injectable carbon replacement product at, for example, basic oxygen furnace or electric arc furnace facilities in any application where injectable carbon would be used (e.g., injected into slag or ladle during steel manufacturing). In embodiments, an injectable carbon replacement product is a high-carbon biogenic replacement comprises at least about 55 wt. % carbon, no more than about 0.4% sulfur, no more than about 0.035 wt. % phosphorous, and a heat value of at least about 11,000 BTU per pound. In some embodiments, the injectable carbon replacement product further comprises up to about 10 wt. % of dolomitic lime In some embodiments, the injectable carbon replacement product further comprises up to about 10 wt % of calcium oxide. In some embodiments, the injectable carbon replacement product further comprises up to about 10 wt. % of dolomitic lime and up to about 10 wt. % of calcium oxide. In some embodiments, the injectable carbon replacement product has a maximum dimension of about ⅛ inches. In some embodiments, the injectable carbon replacement product is substantially free of fossil fuel.

In some embodiments, a high-carbon biogenic reagent according to the present invention is useful as a pulverized carbon replacement product, for example, wherever pulverized coal would be used (e.g., for process heat or energy production). In some embodiments, the pulverized coal replacement product comprises up to about 10 percent calcium oxide. In some embodiments, pulverized coal replacement product is a high-carbon biogenic replacement comprises at least about 55 wt. % carbon, no more than about 0.4% sulfur, and a heat value of at least about 11,000 BTU per pound. In some embodiments, the pulverized coal replacement product has a maximum dimension of about ⅛ inches. In some embodiments, the pulverized coal replacement product is substantially free of fossil fuel.

Some variations of the invention utilize the high-carbon biogenic reagents as carbon addition product for metals production. In some embodiments, a high-carbon biogenic reagent according to the present invention is useful as a carbon addition product for production of carbon steel or another metal alloy comprising carbon. Coal-based late-stage carbon addition products are generally characterized as having high sulfur levels, high phosphorous levels, and high ash content, and high mercury levels which degrade metal quality and contribute to air pollution. In some embodiments of this invention, the carbon addition product comprises not more than about 0.5 wt % sulfur, not more than about 4 wt % ash, not more than about 0.03 wt % phosphorus, a minimum dimension of about 1 to 5 mm, and a maximum dimension of about 8 to 12 mm.

Some variations of the invention utilize the high-carbon biogenic reagents as carbon electrodes. In some embodiments, a high-carbon biogenic reagent according to the present invention is useful as an electrode (e.g. anode) material suitable for use, for example, in aluminum production In some embodiments, an electrode material a high-carbon biogenic reagent according to the present invention, in any embodiment. In some embodiments, a carbon electrode comprises a high-carbon biogenic reagent comprising at least about 55 wt. % carbon and no more than about 0.5 wt. % sulfur. In embodiments, the carbon electrode is substantially free of fossil fuel.

Other uses of the high-carbon biogenic reagent in carbon electrodes include applications in batteries, fuel cells, capacitors, and other energy-storage or energy-delivery devices. For example, in a lithium-ion battery, the high-carbon biogenic reagent may be used on the anode side to intercalate lithium. In these applications, carbon purity and low ash can be very important. In some embodiments, a method of manufacturing a metal comprises a step wherein a carbon electrode is consumed. In some embodiments, the carbon electrode comprises a high-carbon biogenic reagent comprising at least about 55 wt. % carbon and no more than about 0.5 wt. % sulfur. In some embodiments, the carbon electrode is substantially free of fossil fuel.

Some variations of the invention utilize the high-carbon biogenic reagents as catalyst supports. Carbon is a known catalyst support in a wide range of catalyzed chemical reactions, such as mixed-alcohol synthesis from syngas using sulfided cobalt-molybdenum metal catalysts supported on a carbon phase, or iron-based catalysts supported on carbon for Fischer-Tropsch synthesis of higher hydrocarbons from syngas.

Some variations of the invention utilize the high-carbon biogenic reagents as activated carbon products. Activated carbon is used in a wide variety of liquid and gas-phase applications, including water treatment, air purification, solvent vapor recovery, food and beverage processing, and pharmaceuticals. For activated carbon, the porosity and surface area of the material are generally important. The high-carbon biogenic reagent provided herein may provide a superior activated carbon product, in various embodiments, due to (i) greater surface area than fossil-fuel based activated carbon; (ii) carbon renewability; (iii) vascular nature of biomass feedstock in conjunction with additives better allows penetration/distribution of additives that enhance pollutant control; and (iv) less inert material (ash) leads to greater reactivity.

In some embodiments, the amounts of various components of high-carbon biogenic reagent compositions disclosed herein are determined on a dry basis. In some embodiments, the amounts of various components of high-carbon biogenic reagent compositions disclosed herein are determined on an ash-free basis. In some the amounts of various components of high-carbon biogenic reagent compositions disclosed herein are determined on a dry, ash-free basis.

It should be recognized that in the above description of market applications of high-carbon biogenic reagents, the described applications are not exclusive, nor are they exhaustive. Thus a high-carbon biogenic reagent that is described as being suitable for one type of carbon product may be suitable for any other application described, in various embodiments. These applications are exemplary only, and there are other applications of high-carbon biogenic reagents. In various embodiments, the injectable carbon is used as a direct energy source, as a reagent, or both.

In addition, in some embodiments, the same physical material may be used in multiple market processes, either in an integrated way or in sequence. Thus, for example, a high-carbon biogenic reagent that is used as a carbon electrode or an activated carbon may, at the end of its useful life as a performance material, then be introduced to a combustion process for energy value or to a metal process, etc.

Some embodiments may employ an activated carbon both for its reactive/adsorptive properties and also as a fuel. For example, an activated carbon injected into an emissions stream may be suitable to remove contaminants, followed by combustion of the activated carbon particles and possibly the contaminants, to produce energy and thermally destroy or chemically oxidize the contaminants.

Significant environmental and product use advantages may be associated with high-carbon biogenic reagents, compared to conventional fossil-fuel-based products. The high-carbon biogenic reagents may be not only environmentally superior, but also functionally superior from a processing standpoint because of greater purity, for example.

With regard to metals production, production of biogenic reagents with the disclosed process can result in significantly lower emissions of CO, $CO_2$, $NO_x$, $SO_2$, and hazardous air pollutants compared to the coking of coal-based products necessary to prepare them for use in metals production.

Use of high-carbon biogenic reagents in place of coal or coke also significantly reduces environmental emissions of $SO_2$, hazardous air pollutants, and mercury.

Also, because of the purity of these high-carbon biogenic reagents (including low ash content), the biogenic reagents have the potential to reduce slag and increase production capacity in batch metal-making processes.

EXAMPLES

Example 1 Preparation of Biogenic Reagent-General Method

Wood substrate red pine large chips, Douglas fir cylinders (1.25-inch diameter pieces) and Douglas fir pieces (approximately 2 inches by 2 inches), were loaded into a loading hopper having an optionally heated nitrogen gas flow. Optionally, a 1% aqueous solution of an additive (e.g., NaOH and/or KOH) was applied by spray to the wood substrate while in the hopper or by soaking the biomass in the aqueous additive solution. Regardless of the application method, the additive solution was allowed to penetrate the biomass for 30 minutes before the biomass was dried. Once the reactor had reached the desired temperature, rotation of the reactor was initiated and the wood substrate was fed slowly by activating the material feed system. Average residence times in the heated portion of the reactor for each batch are indicated in Table 1. After exiting the heated portion of the reactor, the pyrolyzed material collected in a discharge hopper. A conveyor removed the biogenic reagent from the discharge hopper for further analysis.

Biogenic reagent was prepared according to the General Method above using various feedstock sizes, varying reactor temperatures, heated or ambient nitrogen, additive, and residence times. Table 1 summarizes the pyrolysis parameters for each batch.

TABLE 1

Preparation of Biogenic Reagent.

| Sample | Substrate Size | Reactor Temp. | Nitrogen Temp. | Additive | Residence Time |
|---|---|---|---|---|---|
| A | Large chips | 371° C. | Ambient (20-25° C.) | None | 0.5 hours |
| B | Large chips | 350° C. | Ambient | None | 0.5 hours |
| C | Large chips | 350° C. | 300° C. | None | 0.5 hours |
| D | 1.25-inch cylinders | 600° C. | 300° C. | None | 2 hours |
| E | 2 × 2 inches | 600° C. | 300° C. | None | 2 hours |
| F | Large chips | 480° C. | Ambient | None | 4 hours |
| G | Large chips | 480° C. | Ambient | KOH | 4 hours |
| H | Large chips | 370° C. | Ambient | KOH | 2.5 hours |
| I | Large chips | 370° C. | Ambient | KOH | 2 hours |
| J1 | Treated Input | N/A | N/A | NaOH | N/A |
| J2 | J1 Output | 370° C. | Ambient | NaOH | 2 hours |

Example 2. Analysis of Biogenic Reagent

Parameters of the biogenic reagents prepared according to the General Method of Example 1 were analyzed according to Table 2 below.

TABLE 2

Methods Used to Analyze Biogenic Reagents.

| Parameter | Method |
|---|---|
| Moisture (total) | ASTM D3173 |
| Ash content | ASTM D3174 |
| Volatile Matter content | ASTM D3175 |
| Fixed Carbon content (by calculation) | ASTM D3172 |
| Sulfur content | ASTM D3177 |
| Heating Value (BTU per pound) | ASTM D5865 |
| Carbon content | ASTM D5373 |
| Hydrogen content | ASTM D5373 |
| Nitrogen content | ASTM D5373 |
| Oxygen content (by calculation) | ASTM D3176 |

Results for Samples A through F, which were prepared without the use of additives, are shown in Table 3 below.

TABLE 3

Characteristics of Biogenic Reagents A Through F.

| | Sample | | | | | |
|---|---|---|---|---|---|---|
| | A | B | C | D | E | F |
| Moisture (wt. %) | 2.42 | 3.02 | 3.51 | 0.478 | 0.864 | 4.25 |
| Ash (wt. %) | 1.16 | 0.917 | 0.839 | 1.03 | 1.06 | 1.43 |
| Volatile Matter (wt. %) | 38.7 | 46.4 | 42.8 | 2.8 | 17.0 | 18.4 |
| Fixed Carbon (wt. %) | 57.7 | 49.4 | 52.9 | 95.7 | 81.0 | 76.0 |
| Sulfur (wt. %) | ND[†] | ND | ND | ND | ND | ND |
| Heat Value (BTU/lb.) | 12,807 | 12,452 | 12,346 | 14,700 | 13,983 | 13,313 |
| Carbon (wt. %) | 73.3 | 71.2 | 71.0 | NT[‡] | NT | 84.1 |
| Hydrogen (wt. %) | 4.47 | 4.85 | 4.63 | NT | NT | 2.78 |
| Nitrogen (wt. %) | 0.251 | 0.227 | 0.353 | NT | NT | 0.259 |
| Oxygen (wt. %) | 18.3 | 19.7 | 19.6 | NT | NT | 7.13 |

[†]ND: less than 0.05 wt. % sulfur content.
[‡]NT: Not Tested.

Results for Samples G through J2, which were prepared with the use of additives, are shown in Table 4 below.

TABLE 4

Characteristics of Biogenic Reagents G Through J2.

| Sample | G | H | I | J1 | J2 |
|---|---|---|---|---|---|
| Moisture (wt. %) | 3.78 | 5.43 | 1.71 | 15.2 | 4.05 |
| Ash (wt. %) | 5.97 | 12.6 | 15.8 | 7.9 | 20.2 |

TABLE 4-continued

Characteristics of Biogenic Reagents G Through J2.

| Sample | G | H | I | J1 | J2 |
|---|---|---|---|---|---|
| Volatile Matter (wt. %) | 17.8 | 30.2 | 19.7 | 59.1 | 25.3 |
| Fixed Carbon (wt. %) | 72.5 | 51.7 | 62.8 | 17.8 | 50.5 |
| Sulfur (wt. %) | ND[†] | ND | ND | ND | ND |
| Heat Value (BTU/lb.) | 12,936 | 10,530 | 11,997 | 6,968 | 9,639 |
| Carbon (wt. %) | 81.1 | 64.4 | 69.6 | 41.9 | 67.2 |
| Hydrogen (wt. %) | 2.6 | 3.73 | 3.82 | 4.64 | 3.78 |
| Nitrogen (wt. %) | 0.20 | 0.144 | 0.155 | 0.145 | 0.110 |
| Oxygen (wt. %) | 6.31 | 13.6 | 8.91 | 30.2 | 4.6 |

[†]ND: less than 0.05 wt. % sulfur content.

Example 3. Production of a High Heat Value Biogenic Reagent

This example demonstrates production of a biogenic reagent having a high heat value.

A feedstock comprising Douglas fir cylindrical pieces (1⅛" diameter, approx. 1.5-inch lengths) was pyrolyzed according to the General Method of Example 1. The reactor was heated to 600° C. and the feedstock was pyrolyzed with a residence time of 30 minutes. After cooling, the resulting biogenic reagent was analyzed according to the methods described in Example 2. Results are shown in Table 5.

TABLE 5

Analysis of High Heat Value Biogenic Reagent.

| Parameter | ASTM Method | As-Received | Moisture Free | Ash & Moisture Free |
|---|---|---|---|---|
| Proximate Analysis | | | | |
| Moisture (total) | D3173 | 1.45 wt. % | — | — |
| Ash | D3174 | 0.829 wt. % | 0.841 wt. % | — |
| Volatile Matter | D3175 | 7.15 wt. % | 7.26 wt. % | 7.32 wt. % |
| Fixed Carbon | D3172 | 90.6 wt. % | 91.9 wt. % | 92.7 wt % |
| Sulfur | D3177 | ND[†] | ND | ND |
| Heat Value | D5865 | 14,942 BTU/lb | 15,162 BTU/lb | 15,291 BTU/lb |
| Ultimate Analysis | | | | |
| Moisture (total) | D3173 | 1.45 wt. % | — | — |
| Ash | D3174 | 0.829 wt. % | 0.841 wt. % | — |
| Sulfur | D3177 | ND | ND | ND |
| Carbon | D5373 | 88.3 wt. % | 89.6 wt. % | 90.4 wt. % |
| Hydrogen[‡] | D5373 | 1.97 wt. % | 2.00 wt. % | 2.01 wt. % |
| Nitrogen | D5373 | 0.209 wt. % | 0.212 wt. % | 0.214 wt. % |
| Oxygen[‡] | D3176 | 7.19 wt. % | 7.30 wt. % | 7.36 wt. % |

[†]ND: Sulfur content was less than 0.050 wt. % (as-received), less than 0.051 wt. % (moisture-free), or less than 0.052 wt. % (ash and moisture-free).
[‡]Excluding water.

Example 4. Production of a High Heat Value Biogenic Reagent

This example demonstrates production of a biogenic reagent having a high heat value.

A feedstock comprising red pine chips having an average particle size of approximately 1-inch by ½ inches by ⅛ inches was pyrolyzed according to the General Method of Example 1. The reactor was heated to 550° C. and the feedstock was pyrolyzed with a residence time of 30 minutes. After cooling, the resulting biogenic reagent was analyzed according to the methods described in Example 2. Results are shown in Table 6.

TABLE 6

Analysis of High Heat Value Biogenic Reagent.

| Parameter | ASTM Method | As-Received | Moisture Free | Ash & Moisture Free |
|---|---|---|---|---|
| Proximate Analysis | | | | |
| Moisture (total) | D3173 | 2.55 wt. % | — | — |
| Ash | D3174 | 1.52 wt. % | 1.56 wt. % | — |
| Volatile Matter | D3175 | 10.1 wt. % | 10.4 wt. % | 10.5 wt. % |
| Fixed Carbon | D3172 | 85.8 wt. % | 88.1 wt. % | 89.5 wt. % |
| Sulfur | D3177 | ND[†] | ND | ND |
| Heat Value | D5865 | 14,792 BTU/lb | 15,179 BTU/lb | 15,420 BTU/lb |
| Ultimate Analysis | | | | |
| Moisture (total) | D3173 | 2.55 wt. % | — | — |
| Ash | D3174 | 1.52 wt. % | 1.56 wt. % | — |
| Sulfur | D3177 | ND | ND | ND |
| Carbon | D5373 | 88.9 wt. % | 91.2 wt. % | 92.7 wt. % |
| Hydrogen[‡] | D5373 | 2.36 wt. % | 2.42 wt. % | 2.45 wt. % |
| Nitrogen | D5373 | 0.400 wt. % | 0.410 wt. % | 0.417 wt. % |
| Oxygen[‡] | D3176 | 4.22 wt. % | 4.33 wt. % | 4.40 wt. % |

[†]: Sulfur content was less than 0.050 wt. % (as-received), less than 0.051 wt. % (moisture- free), or less than 0.052 wt. % (ash and moisture-free).
[‡]Excluding water.

Example 5. Production of a Biogenic Coke Replacement Product for Blending with Met Coke Biogenic reagent was prepared from milled kiln-dried wood doweling substantially according to the General Method of Example 1.

Blends of met coke (Sample ID No. SGS/427-1104014-001) with 2% and 5% of the biogenic reagent were prepared by mixing the met coke with the appropriate amount of biogenic coke replacement product. Strength and reactivity values were measured according to ASTM D5341 for the blends compared to met coke alone are shown in Table 7 (values are the average of a minimum of two tests per sample).

TABLE 7

CSR and CRI of Biogenic Reagent-Met Coke Blends.

| Amount of Biogenic Reagent | CRI | CSR |
|---|---|---|
| 0 wt. % (baseline) | 24.5% | 62.8% |
| 2 wt. % | 25.7% (+1.2%) | 62.3% (−0.5%) |
| 5 wt. % | 28.0% (+3.5%) | 61.2% (−1.6%) |

This example demonstrates that a biogenic reagent prepared according to the General Method of Example 1, when blended with met coke at 2 wt. % and 5 wt. %, is capable of achieving CRI values below 30% and CSR values above 60%, corresponding with typical specifications for met coke use in large blast furnaces.

Example 6. Production of an Enhanced Hot-Strength Biogenic Coke Replacement Product Red pine wood chips approximately sized 1"×½"×⅛" were pyrolyzed according to the General Method of Example 1 at 600° C. with a residence time of 30 minutes. The resulting biogenic reagent is referred to as "Sample A."

Milled, kiln-dried wood doweling having a 1⅛" diameter was cut into segments having a length of about 1.5 inches each. The segments were pyrolyzed according to the General Method of Example 1 at 600° C. with a residence time of 2 hours. The resulting biogenic reagent is referred to as "Sample B."

Samples A and B were each placed separately into quartz tubes and heated at 1,100° C. in the presence of CO2 gas for one hour. After one hour, Sample A had a CSR value of about 0%. After one hour, Sample B had a CSR value of 64.6%. These results indicate that potential for increasing hot strength of a biogenic coke replacement product and suitability for use as a replacement for met coke in various metal production applications.

Example 7. Preparation of Particularly Dimensioned Biogenic Reagent

As shown in Table 8 below, Biogenic Reagent having a particular shape and average dimension was produced according to the General Method of Example 1.

TABLE 8

Properties of Particularly Dimensioned Biogenic Reagent.

| Sample | Fixed Carbon | Initial Volume | Final Volume | Volume Change | Initial Mass | Final Mass | Mass Change |
|---|---|---|---|---|---|---|---|
| Blocks | 90 wt. % | 3.15 in³ | 1.51 in³ | −52% | 22.77 g | 4.91 g | −78% |
| Cylinders-1 | 80 wt. % | 1.46 in³ | 0.64 in³ | −56% | 14.47 g | 3.61 g | −75% |
| Cylinders-2 | 90 wt. % | 1.46 in³ | 0.58 in³ | −60% | 14.47 g | 3.60 g | −75% |

Example 8. Effect of Residence Time on Fixed Carbon Levels

Figure 14:
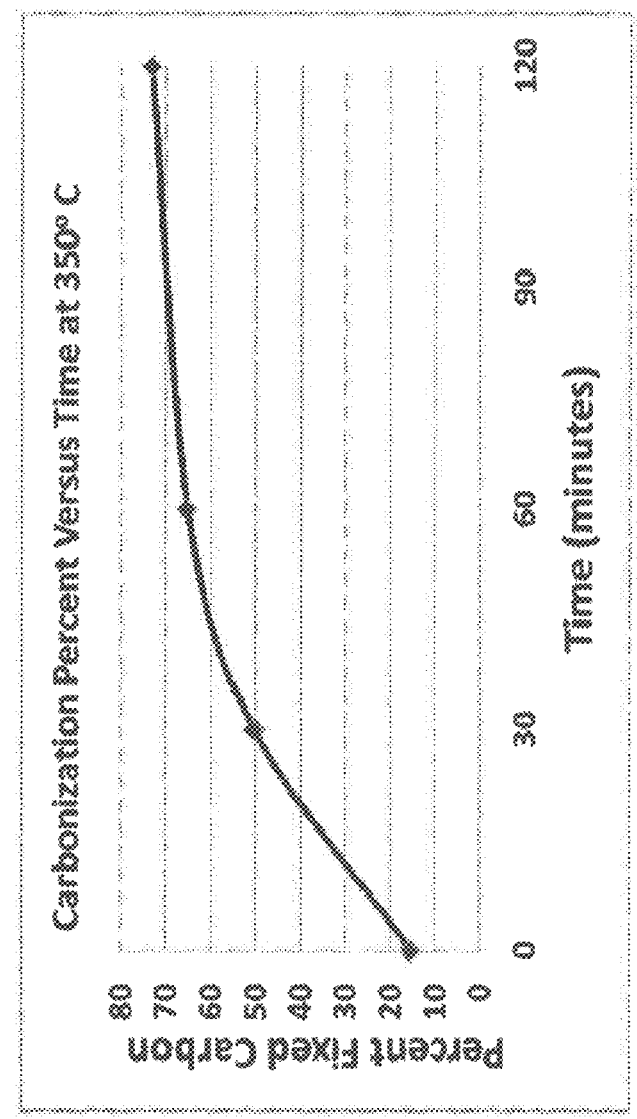
FIG. 14 depicts a graph illustrating the effect of retention time on fixed carbon content of a biogenic reagent produced according to one embodiment of the present disclosure.

The effect of residence time on fixed carbon levels in the biogenic reagent was investigated by dividing one batch of feedstock into four groups of approximately equal mass composed of pieces of feedstock of approximately equal particle size. Each of the four groups was subjected to pyrolysis according to the General Method of Example 1 at 350° C. with residence times of 0 minutes, 30 minutes, 60 minutes, and 120 minutes, respectively. Fixed carbon content of each sample was determined by ASTM D3172. Results are shown in Table 9 and corresponding FIG. 14.

TABLE 9

Effect of Residence Time on Fixed Carbon Levels.

| Sample | Residence Time | Fixed Carbon |
|---|---|---|
| Residence-1 | 0 minutes | 17 wt. % |
| Residence-2 | 30 minutes | 50 wt. % |
| Residence-3 | 60 minutes | 66 wt. % |
| Residence-4 | 120 minutes | 72 wt. % |

Example 9. Effect of Pyrolysis Temperature on Fixed Carbon Levels

Figure 15:
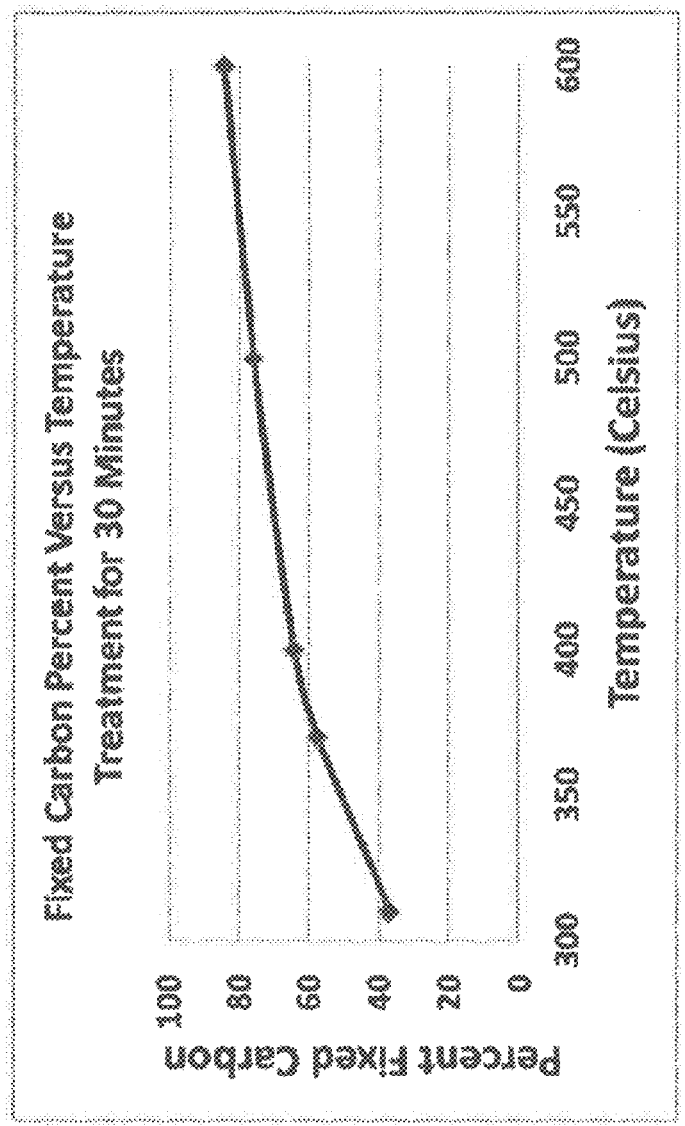
FIG. 15 depicts a graph illustrating the effect of pyrolysis temperature on fixed carbon content of a biogenic reagent produced according to one embodiment of the present disclosure.

The effect of pyrolysis temperature on fixed carbon levels in the biogenic reagent was investigated by dividing one batch of feedstock into five groups of approximately equal mass composed of pieces of feedstock of approximately equal particle size. Each of the five groups was subjected to pyrolysis according to the General Method of Example 1 with a 30 minute residence time. Fixed carbon content of each sample was determined by ASTM D3172. Results are shown in Table 10 and corresponding FIG. 15

TABLE 10

Effect of Residence Time on Fixed Carbon Levels.

| Sample | Pyrolysis Temp. | Fixed Carbon |
|---|---|---|
| Temperature-1 | 310° C. | 38 wt. % |
| Temperature-2 | 370° C. | 58 wt. % |
| Temperature-3 | 400° C. | 64 wt. % |
| Temperature-4 | 500° C. | 77 wt. % |
| Temperature-5 | 600° C. | 83 wt. % |

Example 10. Effect of Feedstock Particle Size on Fixed Carbon Levels

Figure 16:
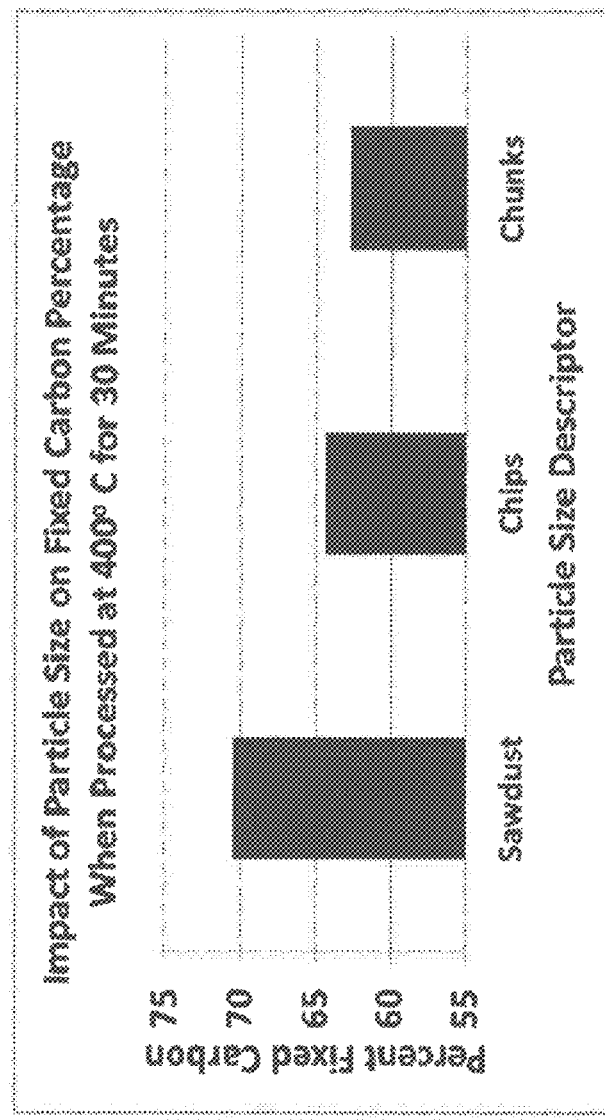
FIG. 16 depicts a graph illustrating the effect of biomass particle size on fixed carbon content of a biogenic reagent produced according to one embodiment of the present disclosure.

The effect of feedstock particle size on fixed carbon levels in the biogenic reagent was investigated by pyrolyzing three groups of red pine biomass: sawdust (average particle size of approximately 0.0625 inches), chips (average particle size of approximately 1 inch by ½ inch by ⅛ inches), and chunks (cylinders having a 1⅛" diameter and a length of approximately 1.5 inches). Each of the three groups was subjected to pyrolysis according to the General Method of Example 1 at 400° C. for 30 minutes. Fixed carbon content of each sample was determined by ASTM D3172. Results are shown in Table 11 and corresponding FIG. 16.

TABLE 11

Effect of Residence Time on Fixed Carbon Levels.

| Sample | Average Particle Size | Fixed Carbon |
|---|---|---|
| Sawdust | ~0.0625 inches | 71 wt. % |
| Chips | ~1 inch × ½ inch × ⅛ inch | 64 wt. % |
| Chunks | ~1.5" lengths of 1⅛" diameter cylinders | 62 wt. % |

Example 11. Effect of Oxygen Level During Pyrolysis on Mass Yield of Biogenic Reagent This example demonstrates the effect of oxygen levels on the mass yield of biogenic reagent.

Two samples of hardwood sawdust (4.0 g) were each placed in a quartz tube. The quartz tube was then placed into a tube furnace (Lindberg Model 55035). The gas flow was set to 2,000 ccm. One sample was exposed to 100% nitrogen atmosphere, while the other sample was subjected to a gas flow comprising 96% nitrogen and 4% oxygen. The furnace temperature was set to 290° C. Upon reaching 290° C. (approximately 20 minutes), the temperature was held at 290° C. for 10 minutes, at which time the heat source was shut off, and the tube and furnace allowed to cool for 10 minutes. The tubes were removed from the furnace (gas still flowing at 2,000 ccm). Once the tubes and samples were cool enough to process, the gases were shut off, and the pyrolyzed material removed and weighed (Table 12).

TABLE 12

Effect of Oxygen Levels During Pyrolysis on Mass Yield.

| Sample | Atmosphere | Mass Yield |
| --- | --- | --- |
| Atmosphere-1(a) | 100% Nitrogen | 87.5% |
| Atmosphere-2(a) | 96% Nitrogen, 4% Oxygen | 50.0% |

Example 12. Effect of Oxygen Level During Pyrolysis on Fixed Content Level and Heat Value of Biogenic Reagent The increase in fixed carbon content and heat value from the use of a Carbon Recovery Unit ("CRU") is demonstrated.

Pyrolysis of hardwood sawdust according to Example 10 was performed. A standard coconut shell charcoal ("CSC") tube (SKC Cat. No. 226-09) was placed in the off-gas stream following a standard midget impinger containing 10 mL of HPLC-grade water. Increases in fixed carbon levels and heat value were compared to a CSC tube that had not been exposed to any off-gases (Table 13, ash and moisture-free data).

TABLE 13

Increase in Fixed Carbon Content and Heat Value as a Function of Oxygen Content During Pyrolysis.

| Sample | Atmosphere | Increase in Carbon Content | Increase in Heat Value |
| --- | --- | --- | --- |
| Atmosphere-1(b) | 100% Nitrogen | +3.2% | +567 BTU/lb (+4.0%) |
| Atmosphere-2(b) | 96% Nitrogen, 4% Oxygen | +1.6% | +928 BTU/lb (+6.5%) |

The results of Examples 11 and 12 demonstrate the benefits of maintaining a near-zero oxygen atmosphere to on mass yield and commercial value of the disclosed pyrolyzation process. Using the off-gases from these two experiments it was also possible to demonstrate that the BTU-laden gases exiting the process can be captured for the purpose of enhancing the BTU content and/or carbon content, of a carbon substrate (coal, coke, activated carbon, carbon).

Example 13. Effect of Heated Nitrogen on Fixed Carbon Content of a Biogenic Reagent This example demonstrates the effect of introducing heated nitrogen gas to the biomass processing unit.

Production of biogenic reagent using a biomass consisting of red pine wood chips having a typical dimension of 1 inch by ½ inches by ⅛ inches was performed according to the General Method of Example 1 with a four-zone heat pilot-scale reactor at 350° C. In the first run, nitrogen was introduced at ambient temperature. In a second run, which was performed immediately after the first run in order to minimize variation in other parameters, nitrogen was pre-heated to 300° C. before injection into the pyrolysis zone. In each case, the nitrogen flow rate was 1.2 cubic feet per minute, and the biomass was processed for 30 minutes.

Fixed carbon content was measured on a dry, ash-free basis according to ASTM D3172 for each run (Table 14).

TABLE 14

Effect of Nitrogen Temperature on Fixed Carbon Content of a Biogenic Reagent.

| Sample | Nitrogen Temperature | Fixed Carbon Content |
| --- | --- | --- |
| Atmosphere-1(c) | Ambient | 51.7% |
| Atmosphere-2(c) | 300° C. | 55.3% |

These test results demonstrate a 7.0% increase [(100× 55.3%−51.7%)/55.3%] in the fixed carbon content of the biogenic reagent carbonized product by utilizing pre-heated nitrogen.

Example 14. Improvement of Mass Yield by Pretreatment of Biomass

This example demonstrates the production of a biogenic activated carbon product having an additive, namely iron(II) bromide.

An aqueous solution of iron(II) bromide hydrate was created by mixing 72.6 grams of iron(II) bromide hydrate into 1 gallon of water (e.g., 1.0% bromine aqueous solution). This solution was added to 5.23 pounds (2.37 kg) of air-dried (12% moisture content) red pine wood chips. Each wood chip was approximately 1"×½"×⅛". The container of wood chips and solution was sealed with a water tight lid. The contents were mixed periodically over the course of approximately four hours by tipping and rolling the container and contents. The wood chips and solution were kept sealed overnight to allow for saturation of the wood chips with the solution.

Thereafter, the contents were transferred to an open water-proof tub and allowed to air dry for several hours, with periodic mixing until all free liquid had been absorbed by the wood chips or evaporated. The contents were transferred to an air-dryer and allowed to dry overnight.

The pretreated, air-dried wood chips were verified to have 12% moisture content. The mass of the pretreated, air dried wood chips was determined to be 5.25 lbs (2.38 kg). The contents were transferred to a pyrolysis reactor with nitrogen gas preheated to 300° C. with a gas flow rate of 0.4 cubic feet per minute. Pyrolysis occurred at 370° C. for 30 minutes.

The finished product was removed from the reactor at a temperature of than 100° C. Upon reaching room temperature (approximately 23° C.), the finished product had a mass of 2.5 pounds (1.14 kg), indicating a mass yield of 47.6% based upon feedstock mass (e.g., the mass contribution of the pretreatment additive was subtracted) 12% moisture content. On a dry basis (correcting out the 12% moisture and the mass contribution of the pretreatment additive), the mass yield was 54.1%. As shown in Table 15 below, this represents an increase of 8-15% in mass yield over untreated wood chips processed under the same conditions.

TABLE 15

Pretreatment of Biomass with 1.0% Aqueous Iron(II) Bromide Increases Mass Yield.

| Pretreatment | Mass Yield (12% Moisture) | Mass Yield (Dry Basis) |
|---|---|---|
| None | 34.3% | 39.0% |
| None | 35.4% | 40.2% |
| None | 37.2% | 42.2% |
| Average (No Pretreatment) | 35.6% | 40.5% |
| Iron(II) Bromide | 47.6% | 54.1% |
| DIFFERENCE | 12.0% | 13.6% |

These data indicate a significant improvement in the mass yield for wood chips treated with an iron (II) bromide solution prior to pyrolytic processing.

In this detailed description, reference has been made to multiple embodiments of the invention and non-limiting examples relating to how the invention can be understood and practiced. Other embodiments that do not provide all of the features and advantages set forth herein may be utilized, without departing from the spirit and scope of the present invention. This invention incorporates routine experimentation and optimization of the methods and systems described herein. Such modifications and variations are considered to be within the scope of the invention defined by the claims.

All publications, patents, and patent applications cited in this specification are herein incorporated by reference in their entirety as if each publication, patent, or patent application were specifically and individually put forth herein.

Where methods and steps described above indicate certain events occurring in certain order, those of ordinary skill in the art will recognize that the ordering of certain steps may be modified and that such modifications are in accordance with the variations of the invention. Additionally, certain of the steps may be performed concurrently in a parallel process when possible, as well as performed sequentially.

Therefore, to the extent there are variations of the invention, which are within the spirit of the disclosure or equivalent to the inventions found in the appended claims, it is the intent that this patent will cover those variations as well. The present invention shall only be limited by what is claimed.

What is claimed is:

1. A high-carbon biogenic reagent production system, the system comprising:
   (a) a material feed system configured to introduce a carbon-containing feedstock;
   (b) an optional dryer, disposed in operable communication with the material feed system, configured to remove moisture contained within a carbon-containing feedstock;
   (c) a multiple-zone reactor, disposed in operable communication with the material feed system or the option dryer, wherein the multiple-zone reactor comprises at least one pyrolysis zone disposed in operable communication with a spatially separated cooling zone, and wherein the multiple-zone reactor comprises an outlet to remove condensable vapors and non-condensable gases from solids;
   (d) a cooler, disposed in operable communication with the multiple-zone reactor; and
   (e) a carbon recovery unit, disposed in operable communication with the cooler.

2. The system of claim 1, the system further comprising a preheating zone, disposed in operable communication with the at least one pyrolysis zone.

3. The system of claim 2, wherein the multiple-zone reactor comprises the at least one pyrolysis zone, the cooling zone, and the preheating zone.

4. The system of claim 2, wherein the multiple-zone reactor comprises the at least one pyrolysis zone, and further comprising a second multiple-zone reactor comprising the cooling zone, and a third multiple-zone reactor comprising the preheating zone.

5. The system of claim 1, wherein the multiple-zone reactor comprises the optional dryer.

6. The system of claim 1, the system further comprising a purging means for removing oxygen from the system.

7. The system of claim 6, wherein the purging means comprises one or more inlets to introduce a substantially inert gas, and one or more outlets to remove the substantially inert gas and displaced oxygen from the system.

8. The system of claim 1, wherein the multiple-zone reactor comprises the cooler.

9. The system of claim 1, the system further comprising an additive feeder for introducing an additive into the system.

10. The system of claim 9, wherein the additive feeder is configured to combine the additive with the carbon-containing feedstock.

11. The system of claim 9, wherein the additive feeder is interposed between the material feed system and the multiple-zone reactor.

12. The system of claim 9, wherein the additive feeder is disposed in operable communication with the multiple-zone reactor and the cooler.

13. The system of claim 9, wherein the additive feeder is interposed between the cooler and the carbon recovery unit and is disposed in operable communication with the carbon recovery unit.

14. The system of claim 1, wherein the multiple-zone reactor is configured with a first gas inlet and a first gas outlet.

15. The system of claim 14, wherein the first gas inlet and the first gas outlet are disposed in operable communication with the same or different zones.

16. The system of claim 14, wherein the multiple-zone reactor is configured with a second gas inlet and a second gas outlet.

17. The system of claim 2, wherein the cooling zone is configured with a gas inlet, wherein the pyrolysis zone is configured with a gas outlet, to generate substantially countercurrent flow of the gas phase relative to the solid phase, and the preheating zone is configured with a gas outlet, to generate substantially countercurrent flow of the gas phase relative to the solid phase.

18. The system of claim 2, wherein the cooling zone is configured with a gas inlet, and wherein the preheating zone is configured with a gas outlet, to generate substantially countercurrent flow of the gas phase relative to the solid phase.

19. The system of claim 1, the system further comprising a first reaction gas probe disposed in operable communication with the pyrolysis zone and with a gas-monitoring device.

20. The system of claim 19, the system further comprising a second reaction gas probe disposed in operable communication with the cooling zone and with the gas-monitoring device or a second gas-monitoring device.

21. The system of claim 19, the system further comprising additional reaction gas probes disposed in operable communication with the optional drying zone, and with the gas-monitoring device.

* * * * *